United States Patent
Aoki et al.

(10) Patent No.: US 8,841,057 B2
(45) Date of Patent: Sep. 23, 2014

(54) ELECTROPHOTOGRAPHIC TONER

(75) Inventors: Katsutoshi Aoki, Wakayama (JP); Norihiro Fukuri, Wakayama (JP); Takashi Kubo, Wakayama (JP); Yoshitomo Kimura, Wakayama (JP); Yasunori Inagaki, Wakayama (JP); Yoshihiro Ueno, Wakayama (JP); Hidenori Tachi, Wakayama (JP)

(73) Assignee: Kao Corporation, Tokyo (JP)

( * ) Notice: Subject to any disclaimer, the term of this patent is extended or adjusted under 35 U.S.C. 154(b) by 114 days.

(21) Appl. No.: 13/126,936

(22) PCT Filed: Oct. 29, 2008

(86) PCT No.: PCT/JP2008/069692
§ 371 (c)(1),
(2), (4) Date: Apr. 29, 2011

(87) PCT Pub. No.: WO2010/050023
PCT Pub. Date: May 6, 2010

(65) Prior Publication Data
US 2011/0212395 A1  Sep. 1, 2011

(51) Int. Cl.
*G03G 9/087* (2006.01)
(52) U.S. Cl.
USPC .............. 430/109.4; 430/108.1; 430/137.15
(58) Field of Classification Search
USPC ................................ 430/109.4, 108.1, 137.15
See application file for complete search history.

(56) References Cited

U.S. PATENT DOCUMENTS

| | | | |
|---|---|---|---|
| 5,483,016 A | 1/1996 | Aoki et al. | |
| 5,804,347 A | 9/1998 | Inoue et al. | |
| 2003/0022088 A1 | 1/2003 | Semura et al. | |
| 2005/0170275 A1 | 8/2005 | Semura et al. | |
| 2005/0227157 A1 | 10/2005 | Shirai | |
| 2007/0135615 A1 | 6/2007 | Shirai et al. | |
| 2007/0219313 A1 | 9/2007 | Mizuhata et al. | |
| 2007/0281235 A1 | 12/2007 | Ono et al. | |
| 2008/0118855 A1* | 5/2008 | Nakayama et al. | 430/109.4 |
| 2008/0131802 A1 | 6/2008 | Mizutani et al. | |
| 2008/0248414 A1 | 10/2008 | Mizuhata et al. | |
| 2008/0261131 A1* | 10/2008 | Nakayama et al. | 430/48 |
| 2008/0280219 A1* | 11/2008 | Nakayama et al. | 430/48 |
| 2010/0015545 A1* | 1/2010 | Ueno et al. | 430/109.4 |

FOREIGN PATENT DOCUMENTS

| | | |
|---|---|---|
| JP | 5-119522 | 5/1993 |
| JP | 6-332235 | 12/1994 |
| JP | 7-98517 | 4/1995 |
| JP | 7-209908 | 8/1995 |
| JP | 9-62035 | 3/1997 |
| JP | 2002-148867 | 5/2002 |
| JP | 2002-169331 | 6/2002 |
| JP | 2002-287427 | 10/2002 |
| JP | 2004-198598 | 7/2004 |
| JP | 2005-300867 | 10/2005 |
| JP | 2006/154528 | 6/2006 |
| JP | 2006-154686 | 6/2006 |
| JP | 2007-47607 | 2/2007 |
| JP | 2007-163682 | 6/2007 |
| JP | 2007-206540 | 8/2007 |
| JP | 2007-248582 | 9/2007 |
| JP | 2008-122540 | 5/2008 |
| JP | 2008-139647 | 6/2008 |
| JP | 2008-145652 | 6/2008 |
| JP | 2008-224961 | 9/2008 |
| JP | 2008-256845 | 10/2008 |

OTHER PUBLICATIONS

Japanese Office Action issued Feb. 7, 2012, in Japan Patent Application No. 2007-119905 (with English translation).
Japanese Office Action issued Oct. 31, 2011, in Patent Application No. 2007-119905 (with English-language translation).
International Search Report issued Jan. 27, 2009, in Patent Application No. PCT/JP2008/069692.
Chinese Office Action Issued Jun. 20, 2012 in Patent Application No. 200880131806.7 (with English translation).

* cited by examiner

*Primary Examiner* — Hoa V Le
(74) *Attorney, Agent, or Firm* — Oblon, Spivak, McClelland, Maier & Neustadt, L.L.P.

(57) ABSTRACT

A resin binder for use in a toner for electrophotography, containing a polycondensation resin obtainable by polycondensing an alcohol component containing an aliphatic polyhydric alcohol having two or more secondary carbon atoms with a hydroxyl group bound thereto (an alcohol A), and a carboxylic acid component, wherein the alcohol A is contained in an amount of from 10 to 100% by mol, of the alcohol component; and a toner for electrophotography containing the resin binder. The toner for electrophotography of the present invention is suitably used in developing latent images formed in electrophotography, electrostatic recording method, electrostatic printing method or the like.

17 Claims, No Drawings

ELECTROPHOTOGRAPHIC TONER

CROSS REFERENCE TO RELATED APPLICATION

This application is a 371 of PCT/JP2008/069692, filed on Oct. 29, 2008.

TECHNICAL FIELD

The present invention relates to a toner for electrophotography usable in, for example, developing latent images formed in electrophotography, electrostatic recording method, electrostatic printing method or the like, and a resin binder for use in such a toner.

BACKGROUND ART

In the recent years, with the advancement of speeding up of the machines and energy conservation, a toner having excellent low-temperature fixing ability is required. In view of the above, as a resin binder for use in a toner, a polycondensation resin in which an aliphatic polyhydric alcohol is used is proposed, in place of a conventionally used polycondensation resin obtainable from an aromatic polyhydric alcohol.

Patent Publication 1 discloses a toner for electrostatic image development, in which as a resin binder a polyester resin obtainable by reacting an alcohol component containing 1,3-propanediol and a specified other polyhydric alcohol as essential constituents, and a polybasic acid component is used, the toner having excellent fixing ability and offset resistance, showing stable charging behavior even when subjected to continuous printing, and having excellent durability so that an excellent high-quality image is obtained.

Patent Publication 2 discloses a polyester resin for a toner, in which a polyester resin obtainable from a polyol component containing 30 to 100% by mol of an aliphatic diol having 2 to 6 carbon atoms, at least a part of the aliphatic diol being 1,2-propylene glycol, is used, wherein a tetrahydrofuran-soluble component has a number-average molecular weight of from 1,000 to 9,500, for the purpose of providing a toner having excellent balance between low-temperature fixing ability and pulverizability, and excellent gloss after fusing.

For example, Patent Publication 3 discloses a toner for electrostatic image development wherein the polyester contains a high-softening point polyester having a softening point of from 120° to 160° C., and a low-softening point polyester having a softening point of from 75° to 120° C., each obtained by polycondensing an alcohol component consisting essentially of an aliphatic alcohol, and a carboxylic acid component, wherein a difference in the softening points between the high-softening point polyester and the low-softening point polyester is 10° C. or more.

Patent Publication 4 discloses a method for producing a resin binder having excellent triboelectric charges and environmental stability of the image quality, favorable pulverizability and transparency, and being fixable at low temperatures, characterized by previously mixing (a) raw material monomer mixtures of two polymerization system each having independent reaction paths in a single reaction vessel, (b) a compound capable of reacting with the raw materials of both the two polymerization systems, and (c) a tricarboxylic or higher polycarboxylic acid or a derivative thereof, and concurrently carrying out the two polymerization reactions in the same reaction vessel.

In addition, Patent Publication 5 discloses a resin binder for a toner having excellent low-temperature fixing ability, environmental stability, and blocking resistance, the resin binder for a toner containing crystalline polyester and amorphous polyester resins, wherein the crystalline polyester is obtainable by polycondensing an alcohol component containing 70% by mol or more of an aliphatic diol having 2 to 8 carbon atoms, and a carboxylic acid component containing 70% by mol or more of an aromatic dicarboxylic acid compound.

As resin binders for a toner, styrene-acrylic resins, polyesters, epoxy resins and the like have been used, and polycondensation resins such as polyesters are beginning to be widely used because of their excellent low-temperature fixing ability. Patent Publication 6 makes various studies on catalyst usable in the production of a polyester.

Patent Publications 7 and 8 disclose the techniques of adding as a charge control agent a charge control resin (CCR) having excellent triboelectric property.

Patent Publication 9 discloses a toner for electrophotography containing toner particles and at least two kinds of external additives having specified average particle sizes, for the purpose of simultaneous improving transfer efficiency while maintaining high resolution and optical density, and stabilizing fluidity of the toner.

Conventionally, a styrene-acrylic resin or a polyester is known as a resin binder for a toner, and a toner containing a polyester is widely used because of its excellent durability and fixing ability. As the toner as described above, Patent Publication 10 discloses a polyester containing, as a carboxylic acid component, an alkylsuccinic acid and/or alkenylsuccinic acid, having 10 or more carbon atoms, especially from the viewpoint of fixing ability, and a toner obtained by a melt-kneading pulverization method using the polyester as a resin binder. In addition, Patent Publication 11 discloses a toner for electrophotography, containing a resin binder containing a composite resin having a polycondensation resin unit and an addition polymerization resin unit, the toner being obtained by melt-pulverization method, wherein the polycondensation resin unit has a constituting unit derived from a carboxylic acid component containing at least two kinds of alkylsuccinic acid, of which alkyl group is branched and has 9 to 14 carbon atoms.

On the other hand, in the recent years, with the pursuit of formation of high quality images, the development of a toner having a small particle size, the toner having excellent fixing ability is desired. However, in a case where a toner having a small particle size, the toner containing a resin binder containing a polyester as a main component, is produced by a melt-kneading and pulverization method, it is difficult to control the pulverization. In view of the above, for example, Patent Publication 12 discloses a method for producing a toner according to an emulsification-aggregation method, which is a wet production method, using a resin binder having a carboxyl group.

Patent Publication 13 discloses a polyester having excellent hydrolytic resistance usable in the production of a toner including the step of forming particles from raw material components containing a resin binder containing at least a polyester in an aqueous medium or a solution, the polyester being obtainable by polycondensing an alcohol component and a carboxylic acid component containing at least one member selected from alkylsuccinic acids and alkenylsuccinic acids, and a polyester for use in a toner for electrophotography having excellent storage property and fixing ability, containing the above polyester.

Patent Publication 14 discloses, as an objective of providing a toner for electrophotography having excellent storage property and durability, a toner for electrophotography obtainable by a method including the step of forming particles from raw materials containing a resin binder and a polyolefin wax and/or a paraffin wax, wherein the resin binder contains a resin obtainable from at least raw material monomers for a polycondensation resin and raw material monomers for an addition polymerization resin.

Patent Publication 1: JP-A-2002-169331
Patent Publication 2: JP-A-2006-154686
Patent Publication 3: JP-A-2002-287427
Patent Publication 4: JP-A-Hei-7-98517
Patent Publication 5: JP-A-2005-300867
Patent Publication 6: JP-A-2002-148867
Patent Publication 7: JP-A-Hei-9-62035
Patent Publication 8: JP-A-2007-47607
Patent Publication 9: JP-A-Hei-6-332235
Patent Publication 10: JP-A-2007-163682
Patent Publication 11: JP-A-2008-224961
Patent Publication 12: JP-A-2004-198598
Patent Publication 13: JP-A-2007-248582
Patent Publication 14: JP-A-2007-206540

SUMMARY OF THE INVENTION

The present invention relates to:

[1] a resin binder for use in a toner for electrophotography, containing a polycondensation resin obtainable by polycondensing
an alcohol component containing an aliphatic polyhydric alcohol having two or more secondary carbon atoms with a hydroxyl group bound thereto (an alcohol A), and
a carboxylic acid component,
wherein the alcohol A is contained in an amount of from 10 to 100% by mol, of the alcohol component;

[2] the resin binder according to the above [1], wherein the carboxylic acid component comprises at least one succinic acid derivative selected from alkyl(9 to 14 carbon atoms) succinic acids and alkenyl(9 to 14 carbon atoms)succinic acids;

[3] a resin binder for use in a toner for electrophotography, containing a composite resin containing a polycondensation resin and a styrenic resin, wherein the polycondensation resin is a resin obtainable by polycondensing
an alcohol component containing an aliphatic polyhydric alcohol having two or more secondary carbon atoms with a hydroxyl group bound thereto (an alcohol A),
and a carboxylic acid component;

[4] the resin binder according to any one of the above [1] to [3], wherein the alcohol A upon the polycondensation of the alcohol component and the carboxylic acid component is used in an amount of from 6 to 100 parts by weight, based on 100 parts by weight of a total amount of the alcohol component other than the alcohol A and the carboxylic acid component;

[5] a resin binder for use in a toner for electrophotography, containing an amorphous resin and a crystalline resin, wherein at least one of the resins of the amorphous resin and the crystalline resin is a resin obtainable by polycondensing
an alcohol component containing an aliphatic polyhydric alcohol having two or more secondary carbon atoms with a hydroxyl group bound thereto (an alcohol A), and
a carboxylic acid component;

[6] the resin binder according to the above [5], wherein the amorphous resin is one or more resins selected from the group consisting of
(a) a polycondensation resin obtainable by polycondensing a carboxylic acid component containing at least one succinic acid derivative selected from alkyl(9 to 14 carbon atoms) succinic acids and alkenyl(9 to 14 carbon atoms)succinic acids, and an alcohol component; and
(b) a composite resin containing a polycondensation resin and a styrenic resin;

[7] the resin binder according to any one of the above [1] to [6], wherein the alcohol A is an aliphatic polyhydric alcohol having 4 to 8 carbon atoms, which has one or more pairs of a pair of secondary carbon atoms in which the secondary carbon atoms with a hydroxyl group bound thereto are adjacent to each other;

[8] the resin binder according to any one of the above [1] to [7], wherein the alcohol component containing the alcohol A further contains an aliphatic diol having 2 to 8 carbon atoms other than the alcohol A;

[9] the resin binder according to any one of the above [1] to [8], wherein the alcohol component and the carboxylic acid component are polycondensed in the presence of
an esterification catalyst and
a pyrogallol compound having a benzene ring of which three hydrogen atoms adjacent to each other are substituted with hydroxyl groups;

[10] a toner for electrophotography, containing the resin binder as defined in any one of the above [1] to [9];

[11] the toner for electrophotography according to the above [10], further containing a charge control resin comprising a styrenic resin;

[12] the toner for electrophotography according to the above [10] or [11], further containing an external additive having an average particle size of from 20 to 250 nm;

[13] a toner for electrophotography obtainable by a method including the step of forming raw materials containing a resin binder into particles in an aqueous medium, wherein the resin binder contains a polycondensation resin obtainable by polycondensing
an alcohol component containing an aliphatic polyhydric alcohol having two or more secondary carbon atoms with a hydroxyl group bound thereto (an alcohol A), and
a carboxylic acid component;

[14] a toner for electrophotography obtainable by a method including the step of forming raw materials containing a resin binder into particles in an aqueous medium, wherein the resin binder contains a composite resin containing a polycondensation resin and a styrenic resin, wherein the resin binder contains a polycondensation resin obtainable by polycondensing
an alcohol component containing an aliphatic polyhydric alcohol having two or more secondary carbon atoms with a hydroxyl group bound thereto (an alcohol A), and
a carboxylic acid component;

[15] the toner for electrophotography according to the above [13] or [14], wherein the carboxylic acid component contains at least one succinic acid derivative selected from alkyl(9 to 14 carbon atoms)succinic acids and alkenyl(9 to 14 carbon atoms)succinic acids;

[16] the toner for electrophotography according to any one of the above [13] to [15], wherein the alcohol A upon the polycondensation of the alcohol component and the carboxylic acid component is used in an amount of from 6 to 100 parts by weight, based on 100 parts by weight of a total amount of the alcohol component other than the alcohol A and the carboxylic acid component; and

[17] the resin binder according to any one of the above [13] to [16], wherein the alcohol component further contains an aliphatic diol having 2 to 8 carbon atoms other than the alcohol A.

DETAILED DESCRIPTION OF THE INVENTION

The present invention relates to a toner for electrophotography having storage property, while satisfying excellent low-temperature fixing ability, and a resin binder for use in such a toner.

The toner for electrophotography of the present invention also exhibits an effect of showing excellent storage property, while satisfying excellent low-temperature fixing ability.

The polycondensation resin obtainable from an aliphatic alcohol has excellent low-temperature fixing ability but insufficient storage property. Especially, the toners are likely to suffer from not only heat generation in the machine but also temperature elevation in the container due to direct sunlight during the transportation, so that storage property is an essential property for toners. However, an increase in storage property would inevitably lead to the risk of low-temperature fixing ability, so that the development of a resin binder for use in a toner having excellent low-temperature fixing ability and storage property, which are counteractive properties.

A major feature of the resin binder for use in a toner for electrophotography of the present invention resides in that the resin binder contains a polycondensation resin obtainable by polycondensing, as raw material monomers, an alcohol component containing at least an aliphatic polyhydric alcohol having two or more secondary carbon atoms with a hydroxyl group bound thereto (an alcohol A); and a carboxylic acid component.

The polycondensation resin obtained from the aliphatic polyhydric alcohol is likely to have a higher ester value, as compared to the case where the polycondensation resin is obtained from an aromatic polyhydric alcohol such as a generally used alkylene oxide of bisphenol A, so that the polycondensation resin is effective in improving low-temperature fixing ability from the viewpoint of affinity with paper. On the other hand, in a state where a molecular backbone is flexible, and the molecular weight is not likely to noticeably increased, it is difficult to increase a glass transition temperature, whereby leading to the lowering in storage property. In the present invention, however, it is made possible to improve low-temperature fixing ability without impairing storage property, by using an aliphatic polyhydric alcohol having a specified structure mentioned above. One of the causes therefor is presumably due to the fact that an alkyl group bound to a secondary carbon with a hydroxyl group bound thereto leads to restrain a molecular motion, so that the resulting resin binder has a higher glass transition temperature, as compared to those resins having softening points of the same level.

The aliphatic polyhydric alcohol having two or more secondary carbon atoms with a hydroxyl group bound thereto (an alcohol A) includes 2,3-butanediol, 2,3-pentanediol, 2,4-pentanediol, 2,3-hexanediol, 3,4-hexanediol, 2,4-hexanediol, 2,5-hexanediol, and the like.

The alcohol A has preferably 4 to 8 carbon atoms, more preferably 4 to 5 carbon atoms, and even more preferably 4 carbon atoms, from the viewpoint of increasing an ester value and also increasing storage property as well as low-temperature fixing ability of the toner. In addition, an aliphatic polyhydric alcohol having one or more sets of secondary carbon atoms, the secondary carbon atoms with a hydroxyl group bound thereto being adjacent to each other, is more preferred, from the viewpoint of making the backbone of the main chain of the resin rigid, thereby increasing storage property. From these viewpoints, an aliphatic polyhydric alcohol having 4 to 8 carbon atoms, which has one or more sets of secondary carbon atoms, the secondary carbon atoms with a hydroxyl group bound thereto being adjacent to each other, such as 2,3-butanediol, 2,3-pentanediol, 2,3-hexanediol, or 3,4-hexanediol, is more preferred.

As the resin binder of the present invention, the following Embodiments I-1 to I-3 are provided.

Embodiment I-1: a resin binder for use in a toner for electrophotography comprising a polycondensation resin obtainable by polycondensing an alcohol component containing the alcohol A and a carboxylic acid component, wherein the alcohol A is contained in an amount of from 10 to 100% by mol of the alcohol component;

Embodiment I-2: a resin binder for use in a toner for electrophotography comprising a composite resin containing a polycondensation resin and a styrenic resin, obtainable by polymerizing raw material monomers for the polycondensation resin and raw material monomers for the styrenic resin, wherein the polycondensation resin is a resin obtained by polycondensing an alcohol component containing an aliphatic polyhydric alcohol having two or more secondary carbon atoms with a hydroxyl group bound thereto (an alcohol A) and a carboxylic acid component; and Embodiment I-3: a resin binder for use in a toner for electrophotography containing an amorphous resin and a crystalline resin, wherein at least either one of the amorphous resin and the crystalline resin is a resin obtained by polycondensing an alcohol component containing the alcohol A and a carboxylic acid component.

Embodiment I-1

The alcohol A is contained in an amount of from 10 to 100% by mol, preferably from 12 to 80% by mol, and more preferably from 25 to 75% by mol, of the alcohol component, from the viewpoint of low-temperature fixing ability and storage property of the toner.

In addition, the amount of the alcohol A used upon the polycondensation of the alcohol component and the carboxylic acid component is preferably from 6 to 100 parts by weight, more preferably from 10 to 90 parts by weight, and even more preferably from 15 to 80 parts by weight, based on 100 parts by weight of a total amount of the alcohol component other than the alcohol A and the carboxylic acid component, which are the raw material monomers for the polycondensation resin, from the viewpoint of low-temperature fixing ability, storage property and optical density under high-temperature, high-humidity conditions of the toner.

In Embodiment I-1, it is preferable that the alcohol component further contains, other than the alcohol A, an aliphatic diol having 2 to 8 carbons atoms, and preferably 2 to 6 carbons atoms (an alcohol B), from the viewpoint of low-temperature fixing ability of the toner. The alcohol B includes ethylene glycol, 1,2-propanediol, 1,3-propanediol, 1,4-butanediol, 1,5-pentanediol, 1,6-hexanediol, 1,4-butenediol, 1,3-butanediol, neopentyl glycol, and the like. Among them, ethylene glycol, 1,2-propanediol and 1,3-propanediol are preferred, from the viewpoint of storage property of the toner.

The alcohol B is contained in an amount of preferably from 0 to 90% by mol, more preferably from 0.5 to 90% by mol, even more preferably from 20 to 88% by mol, and still even more preferably from 25 to 75% by mol, of the alcohol component, from the viewpoint of increasing low-temperature fixing ability of the toner.

In addition, the alcohol B is contained in an amount of preferably 10 mol or less, preferably from 0.1 to 5 mol, and more preferably from 0.3 to 3 mol, per one mol of the alcohol A, from the viewpoint of low-temperature fixing ability and storage property of the toner.

The alcohol component other than the alcohol A and the alcohol B includes aromatic diols such as an alkylene oxide adduct of bisphenol represented by the formula (I):

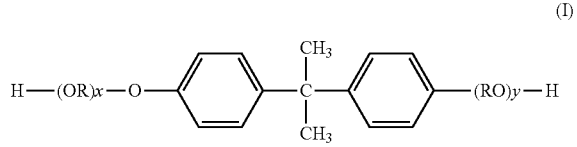

wherein RO and OR are an oxyalkylene group, wherein R is an ethylene group and/or a propylene group; and each of x and y is a positive number showing an average number of moles of alkylene oxide added, wherein an average number of the sum of x and y is preferably from 1 to 16, more preferably from 1 to 8, and even more preferably from 1.5 to 4, such as polyoxypropylene-2,2-bis(4-hydroxyphenyl)propane and polyoxyethylene-2,2-bis(4-hydroxyphenyl)propane; trihydric or higher polyhydric alcohols such as glycerol; and the like.

The aromatic diol is contained in an amount of preferably 10% by mol or less, and more preferably 5% by mol or less, of the alcohol component, from the viewpoint of low-temperature fixing ability of the toner, and it is preferable that substantially no aromatic diol is used. Here, substantially no aromatic diol is used refers to an aromatic diol that is contained in an amount of 0% by mol, or if any, 1% by mol or less of the alcohol component.

In addition, it is preferable that the carboxylic acid component contains at least one succinic acid derivative selected from alkyl(9 to 14 carbon atoms)succinic acids and alkenyl(9 to 14 carbon atoms)succinic acids, from the viewpoint of increasing low-temperature fixing ability and optical density under high-temperature, high-humidity conditions. Here, the succinic acid derivative may be an anhydride or a lower alkyl ester having 1 to 3 carbon atoms of an alkyl(9 to 14 carbon atoms)succinic acid or an alkenyl(9 to 14 carbon atoms) succinic acid.

Since a polycondensation resin obtained from an aliphatic polyhydric alcohol has high hygroscopicity, the polycondensation resin is insufficient in optical density under high-temperature, high-humidity conditions; meanwhile, by further using a succinic acid derivative having a long-chain hydrocarbon group, the succinic acid derivative having high hydrophobicity, together therewith as the carboxylic acid component, the lowering of optical density under high-temperature, high-humidity conditions is also improved, while maintaining low-temperature fixing ability and storage property. The reason why the lowering of optical density under high-temperature, high-humidity conditions is improved is presumably due to the fact that an aliphatic polyhydric alcohol having a specified mentioned structure above has an alkyl group at a terminal, so that hydrophilicity near the ester groups is suppressed, and that at the same time a succinic acid derivative having a long-chain hydrocarbon group, the succinic acid derivative having high hydrophobicity is used, so that hygroscopicity is lowered.

The number of carbon atoms in the alkyl group or the alkenyl group in the alkylsuccinic acid and the alkenylsuccinic acid is from 9 to 14, and preferably from 10 to 12, from the viewpoint of increasing low-temperature fixing ability, storage property and optical density under high-temperature, high-humidity conditions of the toner. Those alkyl group and alkenyl group may be linear or branched, and those groups are preferably branched, from the viewpoint of increasing optical density under high-temperature, high-humidity conditions.

Further, it is preferable that the succinic acid derivative is one comprising two or more members selected from the group consisting of alkylsuccinic acids having a branched alkyl group of 9 to 14 carbon atoms and alkenylsuccinic acids having a branched alkenyl group of 9 to 14 carbon atoms, from the viewpoint of increasing low-temperature fixing ability and optical density under high-temperature, high-humidity conditions of the toner. Therefore, the succinic acid derivative is preferably one comprising two or more alkylsuccinic acids having a branched alkyl group of 9 to 14 carbon atoms, or one comprising two or more alkenylsuccinic acids having a branched alkenyl group of 9 to 14 carbon atoms, or one comprising one or more of each of the above-mentioned alkylsuccinic acids and the above-mentioned alkenylsuccinic acids.

By using succinic acid derivatives having branched alkyl groups and/or alkenyl groups with different numbers of carbon atoms in combination, the resulting resins have a broad endothermic peak near a glass transition temperature in accordance with the differential scanning calorimetry (DSC), so that the resins have very wide fixing temperature regions as a resin binder for use in a toner.

In the present invention, the "member" is originated from the alkyl group or the alkenyl group, and those having alkyl groups or alkenyl groups having different lengths of carbon chain and structural isomers are treated as different members of alkylsuccinic acids or alkenylsuccinic acids.

Specific examples of the branched alkyl group and alkenyl group having 9 to 14 carbon atoms include an isododecenyl group, an isododecyl group and the like.

It is preferable that the alkylsuccinic acid and alkenylsuccinic acid are those obtained from a compound having an alkylene group (alkylene compound), and at least one member selected from maleic acid, fumaric acid, and acid anhydrides thereof, from the viewpoint of improving storage property and low-temperature fixing ability, and optical density under high-temperature, high-humidity conditions of the toner.

The alkylene compound preferably has 9 to 14 carbon atoms, and specifically, those obtained from ethylene, propylene, isobutylene, normal butylene or the like, for example, a trimer thereof, a tetramer thereof or the like are preferably used. As a preferred raw material usable for the synthesis of the alkylene compound, propylene having a low molecular weight is preferable, from the viewpoint of increasing the number of structural isomers. In addition, the alkylene compound has preferably 2 or more, more preferably 10 or more, even more preferably 20 or more, and still even more preferably 30 or more, peaks ascribed to an alkylene compound having 9 to 14 carbon atoms in accordance with gas chromatography mass spectrometry under the measurement conditions described later, from the viewpoint that the polycondensation resin obtained from a succinic acid derivative has a very wide fixing temperature region as a resin binder for use in a toner.

Preferred catalysts usable in the synthesis of alkylene compound include liquid phosphoric acid, solid phosphoric acid, tungsten, boron trifluoride complex, and the like. Here, a method of carrying out random polymerization, and subjecting a reaction mixture to distillation to adjust the number is preferred, from the viewpoint of easiness in control of the number of structural isomers.

Meanwhile, among maleic acid, fumaric acid and acid anhydrides thereof, maleic anhydride is preferred from the viewpoint of reactivity.

The alkylsuccinic acid and alkenylsuccinic acid can be obtained by a known manufacturing method; for example, the alkylsuccinic acid and alkenylsuccinic acid can be obtained by mixing an alkylene compound and at least one member selected from maleic acid, fumaric acid and acid anhydrides thereof while heating, thereby utilizing of an ene reaction (see, JP-A-Sho-48-23405, JP-A-Sho-48-23404, U.S. Pat. No. 3,374,285, or the like).

The succinic acid derivative is contained in an amount of preferably from 3 to 50% by mol, more preferably from 4 to 45% by mol, and even more preferably from 5 to 40% by mol, of the carboxylic acid component, from the viewpoint of low-temperature fixing ability, storage property and optical density under high-temperature, high-humidity conditions of the toner.

The carboxylic acid component may contain, in addition to the succinic acid derivative, a dicarboxylic acid compound or a tricarboxylic or higher polycarboxylic acid compound.

The dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, and azelaic acid; aromatic dicarboxylic acids such as phthalic acid, isophthalic acid, and terephthalic acid; alicyclic dicarboxylic acids such as cyclohexanedicarboxylic acid; anhydrides and alkyl(1 to 3 carbon atoms) esters of these acids; and the like. In the present invention, the acids, anhydrides of these acids, and alkyl esters of the acids as mentioned above are collectively referred to herein as the carboxylic acid compound.

The tricarboxylic or higher polycarboxylic acid compound includes aromatic carboxylic acids, such as 1,2,4-benzenetricarboxylic acid (trimellitic acid), 2,5,7-naphthalenetricarboxylic acid, and pyromellitic acid; and derivatives such as acid anhydrides and alkyl(1 to 3 carbon atoms) esters thereof.

Other carboxylic acid compounds include rosins; rosins modified with fumaric acid, maleic acid, or acrylic acid; and the like.

It is desirable that the carboxylic acid component contains a tricarboxylic or higher polycarboxylic acid compound, preferably a trimellitic acid compound, and more preferably trimellitic anhydride, from the viewpoint of elevating molecular weight of the resin and increasing low-temperature fixing ability and storage property of the toner. The tricarboxylic or higher polycarboxylic acid compound is contained in an amount of preferably from 0.1 to 30% by mol, more preferably from 1 to 25% by mol, and even more preferably from 5 to 25% by mol, of the carboxylic acid component.

Here, the alcohol component may properly contain a monohydric alcohol, and the carboxylic acid component may properly contain a monocarboxylic acid compound, from the viewpoint of adjusting molecular weight of the resin and improving offset resistance of the toner.

The polycondensation reaction of the alcohol component and the carboxylic acid component can be carried out, for example, in an inert gas atmosphere in the presence of an esterification catalyst such as a tin compound or a titanium compound, a polymerization inhibitor, or the like, and the temperature conditions are preferably from 180° to 250° C.

As the tin compound, for example, dibutyltin oxide is known; however, in the present invention, tin(II) compounds without containing a Sn—C bond are preferred from the viewpoint of excellent dispersibility in the polycondensation resin.

As the tin(II) compound without containing a Sn—C bond, a tin(II) compound having a Sn—O bond, a tin(II) compound having a Sn—X bond, wherein X is a halogen atom, or the like is preferable, and the tin(II) compound having a Sn—O bond is more preferable.

The tin(II) compound having a Sn—O bond includes tin (II) carboxylates having a carboxylate group having 2 to 28 carbon atoms, such as tin(II) oxalate, tin(II) acetate, tin(II) octanoate, tin(II) 2-ethylhexanoate, tin(II) laurate, tin(II) stearate, and tin(II) oleate; alkoxy tin(II) compound having an alkoxy group having 2 to 28 carbon atoms, such as octyloxy tin(II), lauroxy tin(II), stearoxy tin(II), and oleyloxy tin(II); tin(II) oxide; tin(II) sulfate; and the like. The tin(II) having a Sn—X bond, wherein X is a halogen atom, includes tin(II) halides, such as tin(II) chloride and tin(II) bromide, and the like. Among them, a fatty acid tin(II) represented by $(R^1COO)_2Sn$, wherein $R^1$ is an alkyl group or an alkenyl group having 5 to 19 carbon atoms, an alkoxy tin(II) represented by $(R^2O)_2Sn$, wherein $R^2$ is an alkyl group or alkenyl group having 6 to 20 carbon atoms, and tin(II) oxide represented by SnO are preferable; the fatty acid tin(II) represented by $(R^1COO)_2Sn$ and tin oxide (II) are more preferable; tin(II) octanoate, tin(II) 2-ethylhexanoate, tin(II) stearate, and tin (II) oxide are even more preferable, from the viewpoint of catalytic ability.

The titanium compound is preferably a titanium compound having a Ti—O bond, and a titanium compound having an alkoxy group having a total of 1 to 28 carbon atoms, an alkenyloxy group having a total of 2 to 28 carbon atoms, or an acyloxy group having a total of 1 to 28 carbon atoms.

Specific examples of the titanium compound include titanium diisopropylate bis(triethanolaminate) $[Ti(C_6H_{14}O_3N)_2(C_3H_7O)_2]$, titanium diisopropylate bis(diethanolaminate) $[Ti(C_4H_{10}O_2N)_2(C_3H_7O)_2]$, titanium dipentylate bis(triethanolaminate) $[Ti(C_6H_{14}O_3N)_2(C_5H_{11}O)_2]$, titanium diethylate bis(triethanolaminate) $[Ti(C_6H_{14}O_3N)_2(C_2H_5O)_2]$, titanium dihydroxyoctylate bis(triethanolaminate) $[Ti(C_6H_{14}O_3N)_2(OHC_8H_{16}O)_2]$, titanium distearate bis(triethanolaminate) $[Ti(C_6H_{14}O_3N)_2(C_{18}H_{37}O)_2]$, titanium triisopropylate triethanolaminate $[Ti(C_6H_{14}O_3N)(C_3H_7O)_3]$, titanium monopropylate tris(triethanolaminate) $[Ti(C_6H_{14}O_3N)_3(C_3H_7O)_1]$, and the like. Among them, titanium diisopropylate bis(triethanolaminate), titanium diisopropylate bis(diethanolaminate) and titanium dipentylate bis(triethanolaminate) are preferable, which are available as marketed products, for example, of Matsumoto Trading Co., Ltd.

Specific examples of other titanium compounds include tetra-n-butyl titanate $[Ti(C_4H_9O)_4]$, tetrapropyl titanate $[Ti(C_3H_7O)_4]$, tetrastearyl titanate $[Ti(C_{18}H_{37}O)_4]$, tetramyristyl titanate $[Ti(C_{14}H_{29}O)_4]$, tetraoctyl titanate $[Ti(C_8H_{17}O)_4]$, dioctyl dihydroxyoctyl titanate $[Ti(C_8H_{17}O)_2(OHC_8H_{16}O)_2]$, dimyristyl dioctyl titanate $[Ti(C_{14}H_{29}O)_2(C_8H_{17}O)_2]$, and the like. Among them, tetrastearyl titanate, tetramyristyl titanate, tetraoctyl titanate and dioctyl dihydroxyoctyl titanate are preferable. These titanium compounds can be obtained by, for example, reacting a titanium halide with a corresponding alcohol, or are also available as marketed products of Nisso, or the like.

The above tin (II) compounds and titanium compounds may be used alone or in combination with two or more members.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the alcohol component and the carboxylic acid component.

In the present invention, it is preferable that the alcohol component containing an alcohol A and the carboxylic acid component are polycondensed in the presence of an esterification catalyst and a pyrogallol compound having a benzene ring of which three hydrogen atoms adjacent to each other are substituted by hydroxyl groups. The polycondensation resin obtained from the alcohol A is more likely to cause deposition of the toner on a developer roller, thereby lowering durability. The reasons therefor are considered to be as follows: a resin binder obtained from the aliphatic polyhydric alcohol having two or more secondary carbon atoms has low reactivity, as compared to those resin binders obtained from the other aliphatic polyhydric alcohols or aromatic polyhydric alcohols, so that the resin binder contains a large amount of low molecular weight components, which is likely to deposit on the developer roller. However, in the present invention, the polycondensation reaction of the alcohol component and the carboxylic acid component is carried out in the presence of an esterification catalyst and a pyrogallol compound, so that the reactivity of the raw material monomers is improved, and the low molecular weight components in the resulting resin are reduced, thereby improving the durability.

In the present invention, a pyrogallol compound having a benzene ring of which three hydrogen atoms adjacent to each other are substituted by hydroxyl groups includes pyrogallol, pyrogallic acid, pyrogallic acid esters, benzophenone derivatives such as 2,3,4-trihydroxybenzophenone and 2,2',3,4-tetrahydroxybenzophenone, catechin derivatives such as epigallocatechin and epigallocatechin gallate, and the like. Among them, a compound represented by the formula (II):

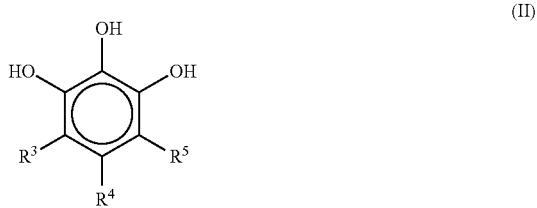

(II)

wherein each of $R^3$ to $R^5$ is independently a hydrogen atom or —$COOR^6$, wherein $R^6$ is a hydrogen atom or a hydrocarbon group having 1 to 12 carbon atoms, preferably an alkyl group having 1 to 12 carbon atoms or an alkenyl group having 2 to 12 carbon atoms,
is preferable, from the viewpoint of durability of the resin obtained. In the formula, the hydrocarbon group of $R^6$ has preferably 1 to 8 carbon atoms, and more preferably 1 to 4 carbon atoms, from the viewpoint of reaction activity. Among the compounds represented by the formula (II), a compound where each of $R^3$ and $R^5$ is a hydrogen atom, and $R^4$ is a hydrogen atom or —$COOR^6$ is more preferable. Specific examples include pyrogallol ($R^3$ to $R^5$: hydrogen atoms), pyrogallic acid ($R^3$ and $R^5$: hydrogen atoms, $R^4$: —COOH), pyrogallic acid esters, such as ethyl pyrogallate ($R^3$ and $R^5$: hydrogen atoms, $R^4$: —$COOC_2H_5$), propyl pyrogallate ($R^3$ and $R^5$: hydrogen atoms, $R^4$: —$COOC_3H_7$), butyl pyrogallate ($R^3$ and $R^5$: hydrogen atoms, $R^4$: —$COOC_4H_9$), octyl pyrogallate ($R^3$ and $R^5$: hydrogen atoms, $R^4$: —$COOC_8H_{17}$), and lauryl pyrogallate ($R^3$ and $R^5$: hydrogen atoms, $R^4$: —$COOC_{12}H_{25}$), and the like. Pyrogallic acid and the pyrogallic acid esters are preferred from the viewpoint of durability of the resin.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of the raw material monomers subjected to the polycondensation reaction. The amount of pyrogallol-based compound present as referred to herein means an entire formulation amount of pyrogallol-based compounds used in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

Among the metal catalysts mentioned above, the tin compounds are preferred, from the viewpoint of having high reactivity, thereby producing a resin having excellent durability.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the alcohol component and the carboxylic acid component. Here, the amount of the esterification catalyst present as referred to herein means an entire formulation amount of the catalysts used in the polycondensation reaction.

The weight ratio of the pyrogallol compound to the esterification catalyst (pyrogallol compound/esterification catalyst) is preferably from 0.01 to 0.5, more preferably from 0.03 to 0.3, and even more preferably from 0.05 to 0.2, from the viewpoint of durability of the resin.

It is preferable that the polycondensation reaction of the alcohol component and the carboxylic acid component using the pyrogallol compound is carried out at a temperature of from 180° to 250° C. in an inert gas atmosphere in the presence of an esterification catalyst and a pyrogallol compound, and, as occasion demands, a polymerization inhibitor or the like. The esterification catalyst and the pyrogallol compound may be previously mixed and added to a reaction system, or they may be separately added. Alternatively, the esterification catalyst and the pyrogallol compound may be added by previously mixing with a carboxylic acid component or an alcohol component. The timing of adding the esterification catalyst and the pyrogallol compound to a reaction system may be either before the initiation of reaction or during the course of the reaction. It is preferable that the esterification catalyst and the pyrogallol compound are added at a time point before the reaction temperature is reached, from the viewpoint of obtaining an even more enhanced effect in the promotion of the polycondensation reaction, and it is more preferable that these components are added before the initiation of the reaction. In the present invention, before the initiation of the reaction as referred to herein means a state in which water accompanying the polycondensation reaction is not yet generated.

The polycondensation resin of Embodiment I-1 includes polyesters, polyester-polyamides, and the like. Among them, the polyesters are preferred from the viewpoint of durability and triboelectric chargeability of the toner.

Here, the polyester may contain a polyester modified to an extent that the properties are substantially not impaired. For example, a modified polyester refers to a polyester grafted or blocked with phenol, urethane, epoxy, or the like according to a method described in JP-A-Hei-11-133668, JP-A-Hei-10-239903, JP-A-Hei-8-20636 or the like.

Using raw material monomers for forming an amide component in addition to the alcohol component the carboxylic acid component mentioned above, the polyester-polyamide is obtained by polycondensing these raw material monomers.

The raw material monomers for forming an amide component include various polyamines, aminocarboxylic acids, amino alcohols, and the like that are known in the art.

Embodiment I-2

Since the polycondensation resin obtained from an aliphatic polyhydric alcohol has a high ester value, the polycondensation resin is more likely to absorb water under high-temperature, high-humidity conditions, which in turn lead to insufficient triboelectric stability under high-temperature, high-humidity conditions. In Embodiment I-2, however, it is presumed that the aliphatic polyhydric alcohol having a specified structure mentioned above has an alkyl group at a terminal, so that hydrophilicity near the ester group is suppressed, and at the same time a hydrophobic styrenic resin is contained, so that hygroscopicity is lowered, thereby maintaining excellent triboelectric stability.

As the raw material monomers for the polycondensation resin, at least an alcohol component containing an alcohol A and a carboxylic acid component are used.

The alcohol A is contained in an amount of preferably from 10 to 100% by mol, more preferably from 12 to 80% by mol, and even more preferably from 25 to 75% by mol, of the alcohol component of the polycondensation resin, from the viewpoint of low-temperature fixing ability and storage property of the toner.

In addition, the amount of the alcohol A used upon the polycondensation of the alcohol component and the carboxylic acid component is preferably from 6 to 100 parts by weight, more preferably from 10 to 90 parts by weight, and even more preferably from 15 to 80 parts by weight, based on 100 parts by weight of a total amount of the alcohol component other than the alcohol A and the carboxylic acid component, which are the raw material monomers for the polycondensation resin, from the viewpoint of low-temperature fixing ability, storage property, and optical density under high-temperature, high-humidity conditions of the toner.

It is preferable that the alcohol component of the polycondensation resin contains the alcohol B mentioned above, from the viewpoint of low-temperature fixing ability of the toner, in the same manner as in Embodiment I-1.

The alcohol B is contained in an amount of preferably from 0 to 90% by mol, more preferably from 0.5 to 90% by mol, even more preferably from 20 to 88% by mol, and still even more preferably from 25 to 75% by mol, of the alcohol component, from the viewpoint of increasing low-temperature fixing ability of the toner.

In addition, the alcohol B is contained in an amount of preferably 10 mol or less, preferably from 0.1 to 5 mol, and more preferably from 0.3 to 3 mol per one mol of the alcohol A, from the viewpoint of low-temperature fixing ability and storage property of the toner.

The alcohol component other than the alcohol A and the alcohol B includes the same alcohols as those in Embodiment I-1 (paragraphs 0028 to 0030, and the like).

The aromatic diol is contained in an amount of preferably 10% by mol or less, and more preferably 5% by mol or less, of the alcohol component, from the viewpoint of low-temperature fixing ability of the toner, and it is preferable that substantially no aromatic diol is used. Here, substantially no aromatic diol is used refers to an aromatic diol that is contained in an amount of 0% by mol, or if any, 1% by mol or less of the alcohol component.

In addition, as the carboxylic acid component of the polycondensation resin, a dicarboxylic acid compound or a tricarboxylic or higher polycarboxylic acid compound can be used.

The dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, an alkylsuccinic acid, and an alkenylsuccinic acid; and aromatic dicarboxylic acids such as phthalic acid, isophthalic acid, and terephthalic acid; and alicyclic dicarboxylic acids such as cyclohexanedicarboxylic acid.

The tricarboxylic or higher polycarboxylic acid compound includes aromatic carboxylic acids, such as 1,2,4-benzenetricarboxylic acid (trimellitic acid), 2,5,7-naphthalenetricarboxylic acid, and pyromellitic acid; and derivatives such as acid anhydrides thereof, lower alkyl(1 to 3 carbon atoms) esters of these acids thereof, and the like.

Other acids includes rosins; rosins modified with fumaric acid, maleic acid, or acrylic acid; and the like.

It is desirable that the carboxylic acid component contains a tricarboxylic or higher polycarboxylic acid compound, preferably a trimellitic acid compound, and more preferably trimellitic anhydride, from the viewpoint of elevating molecular weight of the resin and increasing low-temperature fixing ability and storage property of the toner. The tricarboxylic or higher polycarboxylic acid compound is contained in an amount of preferably from 0.1 to 30% by mol, more preferably from 1 to 25% by mol, and even more preferably from 5 to 25% by mol, of the carboxylic acid component of the polycondensation resin.

Here, the alcohol component may properly contain a monohydric alcohol, and the carboxylic acid component may properly contain a monocarboxylic acid compound, from the viewpoint of adjusting molecular weight of the resin and improving offset resistance of the toner.

The polycondensation reaction of the alcohol component and the carboxylic acid component can be carried out in the presence of an esterification catalyst, in the same manner as in Embodiment I-1.

The polycondensation resin includes polyesters, polyesterpolyamides, and the like, in the same manner as in Embodiment I-1, from the viewpoint of low-temperature fixing ability of the toner. Among them, polyesters are preferred from the viewpoint of the durability and triboelectric chargeability. The polyester may be a polyester modified to an extent that the properties are substantially not impaired.

Meanwhile, as the raw material monomers for a styrenic resin, a styrenic derivative such as styrene, α-methylstyrene or vinyltoluene is used.

The styrenic derivative is contained in an amount of preferably 50% by weight or more, more preferably 70% by weight or more, and even more preferably 80% by weight or more, of the raw material monomers for a styrenic resin.

The raw material monomers for a styrenic resin that are usable other than the styrenic derivative include alkyl (meth) acrylate esters; ethylenically unsaturated monoolefins, such as ethylene and propylene; diolefins such as butadiene; halovinyls such as vinyl chloride; vinyl esters such as vinyl acetate and vinyl propionate; ethylenically monocarboxylate esters such as dimethylaminoethyl (meth)acrylate; vinyl ethers such as vinyl methyl ether; vinylidene halides such as vinylidene chloride; N-vinyl compounds such as N-vinylpyrrolidone; and the like. The term "(meth)acrylic acid" as used herein means acrylic acid and/or methacrylic acid.

Among them, the alkyl (meth)acrylate ester is preferred, from the viewpoint of low-temperature fixing ability and triboelectric stability of the toner. The alkyl group in the alkyl (meth)acrylate ester has preferably 1 to 22 carbon atoms, and more preferably 8 to 18 carbon atoms, from the viewpoint mentioned above. Here, the number of carbon atoms of the alkyl ester refers to the number of carbon atoms derived from the alcohol component moiety constituting the ester. Specifically, the alkyl (meth)acrylate ester includes methyl (meth)acrylate, ethyl (meth)acrylate, (iso)propyl (meth)acrylate, 2-hydroxyethyl (meth)acrylate, (iso or tert)butyl (meth)acrylate, 2-ethylhexyl (meth)acrylate, (iso)octyl (meth)acrylate, (iso)decyl (meth)acrylate, (iso)stearyl (meth)acrylate, and the like. The expression "(iso or tert)" or "(iso)" embrace both a case where these groups are present and a case where the groups are absent, and the case where the groups are absent means normal. Also, the expression "(meth)acrylate" means that both cases of acrylate and methacrylate are included.

The alkyl (meth)acrylate ester is contained in an amount of preferably 50% by weight or less, more preferably 30% by weight or less, and even more preferably 20% by weight or less, of the raw material monomers for a styrenic resin, from the viewpoint of low-temperature fixing ability, storage property, and triboelectric stability of the toner.

Here, a resin obtained by addition polymerization of raw material monomers containing a styrenic derivative and an alkyl (meth)acrylate ester is also referred to as a styrene-(meth)acrylate resin.

The addition polymerization reaction of the raw material monomers for a styrenic resin can be carried out by a conventional method, for example, in the presence of a polymerization initiator, a crosslinking agent, and the like in an organic solvent or without any solvents. The temperature conditions are preferably from 110° to 200° C., and more preferably from 140° to 170° C.

The organic solvent that is usable in the addition polymerization reaction includes xylene, toluene, methyl ethyl ketone, acetone, and the like. It is preferable that the organic solvent is used in an amount of from 10 to 50 parts by weight or so, based on 100 parts by weight of the raw material monomers for a styrenic resin.

The composite resin may be any resin that contains a polycondensation resin and a styrenic resin, which may be a mixture of a polycondensation resin and a styrenic resin. It is preferable that a composite resin is a resin obtainable by polymerizing raw material monomers for a polycondensation resin and raw material monomers for a styrenic resin. The composite resin can be obtained, for example, by concurrently or sequentially carrying out a polycondensation reaction of raw material monomers for a polycondensation resin and an addition polymerization reaction of raw material monomers for a styrenic resin in the same reaction vessel. The progress and the termination of the polycondensation reaction and the addition polymerization reaction are not necessarily concurrent with respect to time, and the reaction temperature and time may be appropriately selected depending upon each of the reaction mechanisms for progressing and terminating the reaction.

Further, it is preferable that the composite resin is a hybrid resin obtainable by using, in addition to the raw material monomers for a polycondensation resin and the raw material monomers for a styrenic resin, a compound capable of reacting with both of the raw material monomers (dually reactive monomer), from the viewpoint of improving low-temperature fixing ability and triboelectric stability of the toner. Therefore, when a composite resin is obtained by polymerizing the raw material monomers for a polycondensation resin and the raw material monomers for a styrenic resin, it is preferable that the polycondensation reaction and the addition polymerization reaction are carried out in the presence of a dually reactive monomer, whereby the composite resin would be a hybrid resin in which the polycondensation resin and the styrenic resin are partly bonded via the dually reactive monomer, thereby allowing the styrenic resin component to be more finely and homogeneously dispersed in the polycondensation resin component.

It is preferable that the dually reactive monomer is a compound having in its molecule an ethylenically unsaturated bond, and at least one functional group selected from the group consisting of a hydroxyl group, a carboxyl group, an epoxy group, a primary amino group and a secondary amino group, preferably a hydroxyl group and/or a carboxyl group, and more preferably a carboxyl group. By using the dually reactive monomer as described above, dispersibility of the resin forming a dispersed phase can be even more improved. It is preferable that the dually reactive monomer is at least one member selected from the group consisting of acrylic acid, methacrylic acid, fumaric acid, maleic acid, and maleic anhydride, and acrylic acid, methacrylic acid, and fumaric acid are more preferred, from the viewpoint of the reactivity.

The dually reactive monomer is contained in an amount of preferably from 1 to 20% by mol, and more preferably from 2 to 15% by mol of a total amount of the alcohol component and the carboxylic acid component of the polycondensation resin. Here, in the present invention, when calculating the amount of the dually reactive monomer contained or the amount of the alcohol A contained based on a total amount of the alcohol component other than the alcohol A and the carboxylic acid component, or the like, the amount of the dually reactive monomer is included in a total amount of the alcohol component and the carboxylic acid component as raw material monomers for the polycondensation resin.

Specific methods for producing a composite resin include:
(i) a method including the steps of (A) carrying out of a polycondensation reaction, and thereafter (B) carrying out an addition polymerization reaction;
(ii) a method including the steps of (A) carrying out of a polycondensation reaction, thereafter (B) carrying out an addition polymerization reaction, again raising a reaction temperature after the step (B), and, as occasion demands, adding to the polymerization systems a trivalent or higher polyvalent raw material monomer for a polycondensation resin which serves as a crosslinking agent to further progress with the polycondensation reaction of the step (A);
(iii) a method including the steps of carrying out concurrently the steps of (A) carrying out a polycondensation reaction and (B) carrying out an addition polymerization reaction, under the temperature conditions appropriate for the addition polymerization reaction, keeping a reaction temperature under the conditions mentioned above to complete the step (B), raising the reaction temperature, and, as occasion demands, adding to the polymerization system a trivalent or higher polyvalent raw material monomer for the polycondensation resin which serves as a crosslinking agent to further progress with the polycondensation reaction of the step (A); and the like.
In the methods (i) and (ii), a polycondensation resin that is previously polymerized may be used in place of carrying out the step of (A) carrying out a polycondensation reaction. In the method of (iii), when the step (A) and the step (B) are concurrently carried out, the reaction can be also carried out by adding a mixture containing raw material monomers for a styrenic resin dropwise to a mixture containing raw material monomers for a polycondensation resin.

In addition, in a case where a composite resin is a hybrid resin obtainable from a dually reactive monomer, it is preferable that the dually reactive monomer is used together with raw material monomers for a styrenic resin.

The weight ratio of the polycondensation resin to the styrenic resin, in other words, a weight ratio of the raw material monomers for a polycondensation resin to the raw material monomers for a styrenic resin, i.e. raw material monomers for a polycondensation resin/raw material monomers for a styrenic resin, is preferably from 55/45 to 95/5, more preferably from 60/40 to 95/5, and even more preferably from 70/30 to 90/10, because it is preferable that a continuous phase comprises the polycondensation resin, and a dispersed phase comprises the styrenic resin.

In both of Embodiment I-1 and Embodiment I-2, the resin binder has a softening point of preferably from 90° to 160° C., more preferably from 95° to 155° C., and even more preferably from 115° to 150° C., from the viewpoint of low-temperature fixing ability, storage property and durability of the toner.

In general, a softening point and a glass transition temperature of a resin are correlated. However, the resin binder in Embodiment I-1 and Embodiment I-2 can have a higher glass transition temperature, as compared to resins having the same level of softening points, so that even a single kind of a resin can satisfy low-temperature fixing ability, storage property, and the like of the toner. By using a resin having a higher softening point and a resin having a lower softening point in combination, the resulting toner has more excellent properties from the viewpoint mentioned above. Specifically, from the viewpoint mentioned above, it is preferable that the resin binder comprises a high-softening point resin and a low-softening point resin, the softening points of which have a difference of preferably 10° C. or more, and more preferably from 20° to 60° C. The high-softening point resin has a softening point of preferably from 125° to 160° C., and more preferably from 130° to 150° C., and the low-softening point resin has a softening point of preferably from 90° to 120° C., and more preferably from 90° to 110° C. The weight ratio of the high-softening point resin to the low-softening point resin, i.e. high-softening point resin/low-softening point resin, is preferably from 1/3 to 3/1, and more preferably from 1/2 to 2/1.

In addition, the resin binder in Embodiment I-1 and Embodiment I-2 has a glass transition temperature of preferably from 45° to 85° C., more preferably from 50° to 80° C., and even more preferably from 58° to 75° C., from the viewpoint of low-temperature fixing ability, storage property and durability of the toner. The resin binder has an acid value of preferably from 1 to 90 mgKOH/g, more preferably from 5 to 90 mgKOH/g, and even more preferably from 5 to 88 mgKOH/g, from the viewpoint of triboelectric chargeability and environmental stability of the toner.

Embodiment I-3

A feature of the resin binder of Embodiment I-3 is that the resin binder contains an amorphous resin and a crystalline resin, and that an alcohol A is used as an alcohol component at least in either one of the resins. In general, a crystalline resin is effective for improving low-temperature fixing ability; meanwhile, when a crystalline resin is used together with an amorphous resin, storage property is likely to be lowered due to the compatibility therebetween. In Embodiment I-3, however, excellent low-temperature fixing ability is exhibited without impairing storage property of the toner. One of the factors therefor is presumably due to the fact that an alkyl group bound to the secondary carbon with a hydroxyl group bound thereto constrains molecular motion, so that excessive compatibility between the crystalline resin and the amorphous resin is controlled.

The crystallinity of the resin is expressed by a ratio of a softening point to a temperature of the maximum endothermic peak determined with a differential scanning calorimeter, i.e., a ratio expressed by softening point/temperature of the maximum endothermic peak. Generally, when this value exceeds 1.4, the resin is amorphous; and when the value is less than 0.6, the resin is low in crystallinity and mostly amorphous. The crystallinity of the resin can be adjusted by the kinds of the raw material monomers and a ratio thereof, production conditions (for example, reaction temperature, reaction time, and cooling rate), and the like. In the present invention, the term "crystalline resin" refers to a resin having a value of softening point/temperature of the maximum endothermic peak temperature of the maximum endothermic peak of from 0.6 to 1.4, and preferably from 0.8 to 1.2, and the term "amorphous resin" refers to a resin having a value of softening point/temperature of the maximum endothermic peak of more than 1.4, or less than 0.6, and preferably more than 1.4. Here, the temperature of the maximum endothermic peak refers to a temperature of the peak on the higher temperature side among endothermic peaks observed. When a difference between the temperature of the maximum endothermic peak and the softening point is within 20° C., the temperature of the maximum endothermic peak is defined as a melting point. When the difference between the temperature of the maximum endothermic peak and the softening point exceeds 20° C., the peak is ascribed to a glass transition. Here, in Embodiment I-3, when simply referred to as a "resin," it is intended to mean both the crystalline resin and the amorphous resin. Similarly, in Embodiment I-3, when simply referred to as a "polycondensation resin," it is intended to mean both the crystalline polycondensation resin and the amorphous polycondensation resin.

In Embodiment I-3, as mentioned above, at least either one of the amorphous resin and the crystalline resin is a resin obtained from the alcohol A. It is preferable that both of the crystalline resin and the amorphous resin are a resin that contains a polycondensation resin obtained from the alcohol A, from the viewpoint of storage property of the toner. Here, the amorphous resin may be a composite resin containing a polycondensation resin and an addition polymerization resin, as described later.

The alcohol A may be used at least in either one of the amorphous resin and the crystalline resin as mentioned above. It is preferable that the alcohol A is used in the amorphous resin, from the viewpoint of storage property of the toner, and it is more preferable that the alcohol A is used in both of the amorphous resin and the crystalline resin, from the viewpoint of storage property and low-temperature fixing ability of the toner.

A resin obtained from an aliphatic polyhydric alcohol has a high ester value, so that the resin is likely to absorb water under high-temperature, high-humidity conditions, which in turn leads to insufficient triboelectric stability under high-temperature, high-humidity conditions. Therefore, it is preferable that the amorphous resin is one or more resins selected from the group consisting of (a) a polycondensation resin obtainable by polycondensing a carboxylic acid component containing at least one succinic acid derivative selected from alkyl(9 to 14 carbon atoms) succinic acids and alkenyl(9 to 14 carbon atoms)succinic acids, and an alcohol component, and (b) a composite resin containing a polycondensation resin and a styrenic resin, from the viewpoint of also having excellent triboelectric stability under high-temperature, high-humidity conditions. This is presumably due to the fact that the aliphatic polyhydric alcohol having a specified structure mentioned above has an alkyl group at a terminal, hydrophilicity near the ester groups is suppressed, and that at the same time the resin binder contains at least either one of a polycondensation resin obtained from a succinic acid derivative having hydrophobicity, or a composite resin containing the polycondensation resin and a styrenic resin having high hydrophobicity, so that the toner does not become hygroscopic even under high-temperature, high-humidity conditions, whereby excellent triboelectric stability can be maintained.

In Embodiment I-3, it is preferable that the crystalline resin is a polycondensation resin, and it is more preferable that the crystalline resin is a polycondensation resin obtainable by polycondensing an alcohol component containing an alcohol A, and a carboxylic acid component. In addition, the amorphous resin is preferably one or more members selected from the group consisting of
(a) a polycondensation resin obtainable by polycondensing an alcohol component containing an alcohol A, and a carboxylic acid component containing at least one succinic acid derivative selected from alkyl(9 to 14 carbon atoms)succinic acids and alkenyl(9 to 14 carbon atoms)succinic acids, and
(b) a composite resin containing a polycondensation resin obtainable by polycondensing an alcohol component containing an alcohol A, and a carboxylic acid component, and a styrenic resin.

In addition, in Embodiment I-3, the amorphous resin is one or more members selected from the group consisting of
(a) a polycondensation resin obtainable by polycondensing a carboxylic acid component containing at least one succinic acid derivative selected from alkyl(9 to 14 carbon atoms) succinic acids and alkenyl(9 to 14 carbon atoms)succinic acids, and an alcohol component, and
(b) a composite resin containing a polycondensation resin and a styrenic resin.
Here, as raw material monomers for a polycondensation resin usable in the composite resin, a carboxylic acid component containing at least one succinic acid derivative selected from alkylsuccinic acids and alkenylsuccinic acids may be used.

In addition, the amorphous resin may comprise two kinds (a) and (b) mentioned above. Here, the succinic acid derivative may be an anhydride or a lower alkyl ester having 1 to 3 carbon atoms of an alkyl(9 to 14 carbon atoms)succinic acid and an alkenyl(9 to 14 carbon atoms)succinic acid.

Preferred embodiments of the resin binder usable in Embodiment I-3 of the present invention include the following 1 to 3:

Embodiment 1: An embodiment where
a crystalline resin is a polycondensation resin obtainable by polycondensing an alcohol component containing an alcohol A, and a carboxylic acid component, and
an amorphous resin is one or more resins selected from the group consisting of
(a) a polycondensation resin obtainable by polycondensing a carboxylic acid component containing at least one succinic acid derivative selected from alkyl(9 to 14 carbon atoms) succinic acids and alkenyl(9 to 14 carbon atoms)succinic acids, and an alcohol component, and
(b) a composite resin containing a polycondensation resin and a styrenic resin.

Embodiment 2: An embodiment where
a crystalline resin is a polycondensation resin, and
an amorphous resin contains
(a) a polycondensation resin obtainable by polycondensing an alcohol component containing an alcohol A, and a carboxylic acid component containing at least one succinic acid derivative selected from alkyl(9 to 14 carbon atoms)succinic acids and alkenyl(9 to 14 carbon atoms)succinic acids, and
(b) a composite resin containing a polycondensation resin obtainable by polycondensing an alcohol component containing an alcohol A, and a carboxylic acid component, and a styrenic resin.

Embodiment 3: An embodiment where
a crystalline resin is a polycondensation resin obtainable by polycondensing an alcohol component containing an alcohol A, and a carboxylic acid component, and
an amorphous resin contains
(a) a polycondensation resin obtainable by polycondensing an alcohol component containing an alcohol A, and a carboxylic acid component containing at least one succinic acid derivative selected from alkyl(9 to 14 carbon atoms)succinic acids and alkenyl(9 to 14 carbon atoms)succinic acids, and
(b) a composite resin containing a polycondensation resin obtainable by polycondensing an alcohol component containing an alcohol A, and a carboxylic acid component, and a styrenic resin.
Here, Embodiment 3 is preferred.

Preferred embodiments where the alcohol component of the amorphous resin contains an alcohol A are as follows.

The alcohol A is contained in an amount of preferably from 10 to 100% by mol, more preferably from 12 to 80% by mol, and even more preferably from 25 to 75% by mol, of the alcohol component of the raw material monomers for the amorphous resin, from the viewpoint of low-temperature fixing ability and storage property of the toner.

The amount of the alcohol A used upon the polycondensation of the alcohol component and the carboxylic acid component of the amorphous resin is preferably from 6 to 100 parts by weight, more preferably from 10 to 90 parts by weight, and even more preferably from 15 to 80 parts by weight, based on 100 parts by weight of a total amount of the alcohol component other than the alcohol A and the carboxylic acid component, which are the raw material monomers for the amorphous resin, from the viewpoint of low-temperature fixing ability and storage property of the toner.

In the amorphous resin, it is preferable that the alcohol component contains an alcohol B mentioned above, from the viewpoint of low-temperature fixing ability of the toner, in the same manner as in Embodiment I-1.

The alcohol B is contained in an amount of preferably from 0 to 90% by mol, more preferably from 0.5 to 90% by mol, even more preferably from 20 to 88% by mol, and still even more preferably from 25 to 75% by mol, of the alcohol component of the raw material monomers for the amorphous resin, from the viewpoint of increasing low-temperature fixing ability of the toner.

The alcohol B is contained in an amount of preferably 10 mol or less, preferably from 0.1 to 5 mol, and more preferably from 0.3 to 3 mol per one mol of the alcohol A, from the viewpoint of storage property and low-temperature fixing ability of the toner.

In addition, preferred embodiments where the alcohol component of the crystalline resin contains an alcohol A are as follows.

The alcohol A is contained in an amount of preferably from 5 to 50% by mol, preferably from 5 to 30% by mol, and more preferably from 7 to 25% by mol, of the alcohol component of the raw material monomers for the crystalline resin, from the viewpoint of crystallinity of the resin and low-temperature fixing ability and storage property of the toner.

The amount of the alcohol A used upon the polycondensation of the alcohol component and the carboxylic acid component of the crystalline resin is preferably from 2 to 30 parts by weight, and more preferably from 3 to 20 parts by weight, based on 100 parts by weight of a total amount of the alcohol component other than the alcohol A and the carboxylic acid component, which are the raw material monomers for the crystalline resin, from the viewpoint of low-temperature fixing ability and storage property of the toner.

It is preferable that the alcohol component of the crystalline resin further contains an alcohol B mentioned above, from the viewpoint of easiness in increasing crystallinity of the resin.

The alcohol B is contained in an amount of preferably from 50 to 95% by mol, more preferably from 70 to 95% by mol, and even more preferably from 75 to 93% by mol, of the alcohol component of the raw material monomers for the crystalline resin, from the viewpoint of increasing crystallinity of the resin and low-temperature fixing ability of the toner.

In addition, the alcohol B is contained in an amount of preferably from 1 to 20 mol, preferably from 2 to 15 mol, and more preferably from 5 to 10 mol per one mol of the alcohol A, from the viewpoint of crystallinity of the resin, and storage stability and low-temperature fixing ability of the toner.

The alcohol component other than the alcohol A and the alcohol B, which are common between the amorphous resin and the crystalline resin, includes the same alcohols as those in Embodiment I-1 (paragraphs 0028 to 0030, and the like).

In the alcohol component containing an alcohol A, the aromatic diol is contained in an amount of preferably 10% by mol or less, and more preferably 5% by mol or less, of the alcohol component, from the viewpoint of low-temperature fixing ability of the toner, and it is preferable that substantially no aromatic diol is used. Here, substantially no aromatic diol is used refers to an aromatic diol that is contained in an amount of 0% by mol, or if any, 1% by mol or less of the alcohol component.

Here, in a case where the alcohol component and the carboxylic acid component are polycondensed, common between the amorphous resin and the crystalline resin, an alcohol B can be used even when an alcohol A is not contained.

In addition, it is preferable that the alcohol component of the crystalline resin contains an α,ω-linear alkanediol, from the viewpoint of crystallinity of the resin.

The α,ω-linear alkanediol includes ethylene glycol, 1,3-propylene glycol, 1,4-butanediol, 1,5-pentanediol, 1,6-hexanediol, and the like. Among them, diols having 2 to 8 carbons are preferred, and 1,4-butanediol and 1,6-hexanediol are more preferred.

In addition, it is preferable that the alcohol component of the amorphous resin contains an alcohol B other than the aromatic alcohol and the α,ω-linear alkanediol.

In a case where an amorphous resin is the (a) mentioned above, a polycondensation resin obtainable by polycondensing a carboxylic acid component containing at least one succinic acid derivative selected from alkyl(9 to 14 carbon atoms)succinic acids and alkenyl(9 to 14 carbon atoms)succinic acids, and an alcohol component is used. The number of carbon atoms of the alkyl group or the alkenyl group in the alkylsuccinic acid and the alkenylsuccinic acid is from 9 to 14, and preferably from 10 to 12, from the viewpoint of increasing low-temperature fixing ability, storage property and triboelectric stability under high-temperature, high-humidity conditions of the toner. In addition, those alkyl group and alkenyl group may be linear or branched, and those groups are preferably branched, from the viewpoint of increasing triboelectric stability under high-temperature, high-humidity conditions.

Further, it is preferable that the succinic acid derivative is one comprising two or more members selected from the group consisting of alkylsuccinic acids having a branched alkyl group of 9 to 14 carbon atoms and alkenylsuccinic acids having a branched alkenyl group of 9 to 14 carbon atoms, from the viewpoint of increasing low-temperature fixing ability and triboelectric stability under high-temperature, high-humidity conditions of the toner. Therefore, the succinic acid derivative is preferably one comprising two or more alkylsuccinic acids having a branched alkyl group of 9 to 14 carbon atoms, or one comprising two or more alkenylsuccinic acids having a branched alkenyl group of 9 to 14 carbon atoms, or one comprising one or more of each of the above-mentioned alkylsuccinic acids and the above-mentioned alkenylsuccinic acids.

By using succinic acid derivatives having branched alkyl groups and/or alkenyl groups with different numbers of carbon atoms in combination, the resulting resins have a broad endothermic peak near a glass transition temperature in accordance with the differential scanning calorimetry (DSC), so that the resins have very wide fixing temperature regions as a resin binder for use in a toner.

Specific examples of the branched alkyl group and alkenyl group having 9 to 14 carbon atoms include an isododecenyl group, an isododecyl group and the like.

It is preferable that the alkylsuccinic acid and alkenylsuccinic acid are those obtained from a compound having an alkylene group (alkylene compound) and at least one member selected from maleic acid, fumaric acid and acid anhydrides thereof, from the viewpoint of improving the storage property and low-temperature fixing ability, and triboelectric stability under high-temperature, high-humidity conditions of the toner, which are the same as those in Embodiment I-1.

The succinic acid derivative is contained in an amount of preferably from 3 to 50% by mol, more preferably from 4 to 45% by mol, and even more preferably from 5 to 40% by mol, of the carboxylic acid component, from the viewpoint of low-temperature fixing ability, storage property and optical density under high-temperature, high-humidity conditions of the toner.

In addition, in both of the amorphous resin and the crystalline resin, the carboxylic acid component is the same as those in Embodiment I-1 (paragraphs 0045 to 0049, and the like).

Among those mentioned above, it is preferable that the carboxylic acid component of the crystalline resin is an aliphatic dicarboxylic acid compound, from the viewpoint of low-temperature fixing ability of the toner.

The aliphatic dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, and azelaic acid; anhydrides and alkyl(1 to 3 carbon atoms) esters of these acids; and the like. Among them, aliphatic dicarboxylic acid compounds having 2 to 8 carbon atoms are preferred, and fumaric acid compounds are more preferred. Here, the aliphatic dicarboxylic acid compounds refer to aliphatic dicarboxylic acids, anhydrides thereof, and alkyl(1 to 3 carbon atoms) esters thereof, as mentioned above. Among them, the aliphatic dicarboxylic acids are preferred.

The aliphatic dicarboxylic acid compound is contained in an amount of preferably from 90 to 100% by mol, and more preferably from 95 to 100% by mol, of the carboxylic acid component of the raw material monomers for the crystalline resin.

In addition, the carboxylic acid of the amorphous resin is preferably an aromatic dicarboxylic acid compound.

Here, the alcohol component may properly contain a monohydric alcohol, and the carboxylic acid component may properly contain a monocarboxylic acid compound, from the viewpoint of adjusting molecular weight of the resin and improving offset resistance of the toner.

The polycondensation reaction of the alcohol component and the carboxylic acid component can be carried out in the presence of an esterification catalyst, in the same manner as in Embodiment I-1, provided that the temperature conditions are preferably from 180° to 250° C. for the case of the amorphous resin, and 120° to 230° C. for the case of the crystalline resin.

The polycondensation resin includes polyesters, polyester-polyamides, and the like, in the same manner as in Embodiment I-1, from the viewpoint of low-temperature fixing ability of the toner. Among them, polyesters are preferred from the viewpoint of the durability and triboelectric chargeability. The polyester may be a polyester modified to an extent that the properties are substantially not impaired.

Meanwhile, in a case where an amorphous resin is a composite resin containing a polycondensation resin and a styrenic resin of the (b) mentioned above, raw material monomers for the amorphous resin mentioned above can be used as the raw material monomers for a polycondensation resin, and preferred raw material monomers and preferred amounts thereof are the same as above. It is preferable that a succinic acid derivative is used as a carboxylic acid component.

The raw material monomers for the styrenic resin and addition polymerization conditions therefor, and the method for producing a composite resin are the same as those in Embodiment I-2.

The composite resin may be, in the same manner as in Embodiment I-2, a mixture of a polycondensation resin and a styrenic resin, and it is preferable that the composite resin is a hybrid resin obtainable from a dually reactive monomer, in addition to the raw material monomers for a polycondensation resin and the raw material monomers for a styrenic resin, from the viewpoint of improving low-temperature fixing ability and triboelectric stability under high-temperature, high-humidity conditions.

The weight ratio of the polycondensation resin to the styrenic resin, in other words, a weight ratio of the raw material monomers for a polycondensation resin to the raw material monomers for a styrenic resin, i.e. raw material monomers for the polycondensation resin/raw material monomers for the styrenic resin, is preferably from 55/45 to 95/5, more preferably from 60/40 to 95/5, and even more preferably from 70/30 to 90/10, because it is preferable that a continuous phase comprises the polycondensation resin, and that the dispersed phase comprises the styrenic resin.

The crystalline resin has a melting point of preferably from 70° to 140° C., more preferably from 80° to 120° C., and even more preferably from 90° to 115° C., from the viewpoint of low-temperature fixing ability of the toner. The melting point of the crystalline resin can be determined as the temperature of the maximum endothermic peak of the resin as described later.

The crystalline resin has a softening point of preferably from 60° to 130° C., more preferably from 70° to 125° C., and even more preferably 85° to 120° C., from the viewpoint of low-temperature fixing ability of the toner. The melting point and softening point of the crystalline resin can be easily adjusted by the adjustment of the composition of raw material monomers, polymerization initiator, molecular weight, amount of catalyst, and the like, or the selection of the reaction conditions.

The amorphous resin has a softening point of preferably from 90° to 160° C., more preferably from 95° to 155° C., and even more preferably from 115° to 150° C., from the viewpoint of low-temperature fixing ability and storage property of the toner. The amorphous resin has a glass transition temperature of preferably from 45° to 85° C., more preferably from 50° to 80° C., and even more preferably from 58° to 75° C., from the viewpoint of low-temperature fixing ability and storage property of the toner. Here, the glass transition temperature is a property intrinsically owned by an amorphous resin, and is distinguished from the temperature of the maximum endothermic peak.

The amorphous resin has an acid value of preferably from 1 to 90 mgKOH/g, more preferably from 5 to 90 mgKOH/g, and even more preferably from 5 to 88 mgKOH/g, from the viewpoint of triboelectric chargeability and environmental stability of the toner.

In the resin binder of Embodiment I-3, the weight ratio of the crystalline resin to the amorphous resin, i.e. crystalline resin/amorphous resin, is preferably from 10/90 to 40/60, and more preferably from 20/80 to 30/70.

By using the resin binder of the present invention as represented by Embodiments I-1 to I-3, the toner for electrophotography of the present invention excellent in both low-temperature fixing ability and storage property, which are counteractive properties, is obtained.

In the toner, a known resin binder other than the resin binder of the present invention, for example, a resin including a polyester, a vinyl resin such as styrene-acrylic resin, an epoxy resin, a polycarbonate, or a polyurethane may be used together within the range that would not impair the effects of the present invention. The resin binder of the present invention is contained in an amount of preferably 30% by weight or more, more preferably 50% by weight or more, even more preferably 70% by weight or more, even more preferably 80% by weight or more, even more preferably 90% by weight or more, and even more preferably essentially 100% by weight, of the entire resin binder.

The toner may further properly contain an additive such as a colorant, a releasing agent, a charge control agent, a magnetic powder, a fluidity improver, an electric conductivity modifier, an extender pigment, a reinforcing filler such as a fibrous material, an antioxidant, an anti-aging agent, or a cleanability improver.

As the colorant, all of the dyes, pigments and the like which are used as colorants for toners can be used. The colorant includes carbon blacks, black pigments, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, isoindoline, disazoyellow, and the like. These colorants can be used alone or in admixture of two or more members. The toner of the present invention may be any of black toner and color toner.

The colorant is contained in an amount of preferably from 1 to 40 parts by weight, and more preferably from 2 to 10 parts by weight, based on 100 parts by weight of the resin binder.

The charge control agent includes a chromium-based azo dye, an iron-based azo dye, an aluminum-based azo dye, a metal complex of salicylic acid, and the like. These charge control agents may be used alone or in admixture of two or more members.

The charge control agent is contained in an amount of preferably from 0.1 to 8 parts by weight, and more preferably from 0.5 to 7 parts by weight, based on 100 parts by weight of the resin binder.

Here, when a toner contains a charge control resin comprising a styrenic resin, triboelectric chargeability of the toner is further increased. In general, a styrenic resin is mainly used as a charge control resin. When used together with a polycondensation resin, the styrenic resin has poor compatibility with a polycondensation resin such as a polyester, so that triboelectric chargeability of the toner is likely to be worsened due to dispersion failure. This is presumably due to the fact that since the alcohol A has an alkyl group adjacent to secondary carbon atoms with a hydroxyl group bound thereto, hydrophilicity near the ester groups is suppressed, thereby resulting in high hydrophobicity, so that compatibility between a polycondensation resin and with a charge control resin comprising a styrenic resin is improved, thereby sufficiently exhibiting triboelectric chargeability of the charge control resin.

In the present invention, a styrenic resin to be contained as a charge control resin is preferably a quaternary ammonium salt group-containing styrenic resin, from the viewpoint of exhibiting positive chargeability of the toner, or a styrenic resin is preferably a sulfonic acid group-containing styrenic resin, from the viewpoint of exhibiting negative chargeability of the toner.

The quaternary ammonium salt group-containing styrenic resin is more preferably a quaternary ammonium salt group-containing styrene-acrylic resin obtained by the polymerization of a monomer mixture containing a monomer represented by the formula (IIIa):

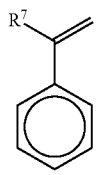
(IIIa)

wherein $R^7$ is a hydrogen atom or a methyl group;
a monomer represented by the formula (IIIb):

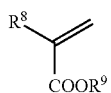
(IIIb)

wherein $R^8$ is a hydrogen atom or a methyl group, and $R^9$ is an alkyl group having 1 to 12 carbon atoms;
a monomer represented by the formula (IIIc):

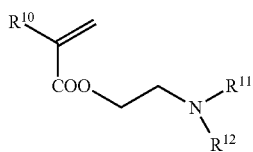
(IIIc)

wherein $R^{10}$ is a hydrogen atom or a methyl group, and each of $R^{11}$ and $R^{12}$ is an alkyl group having 1 to 4 carbon atoms,
or a quaternary compound thereof. The monomers may be previously subjected to formation of quaternary compounds, or the formation of quaternary compounds may be carried out after the polymerization. A quaternary compound-forming agent includes alkyl halides such as methyl chloride and methyl iodide, diethyl sulfate, di-n-propyl sulfate, and the like.

The monomer represented by the formula (IIIa) is preferably a styrene in which $R^7$ is a hydrogen atom, and the monomer represented by the formula (IIIb) is a monomer in which $R^8$ is preferably a hydrogen atom and $R^9$ is an alkyl group having preferably from 1 to 6 carbon atoms, and more preferably from 1 to 4 carbon atoms. Specific examples of the monomer represented by the formula (IIIb) include butyl acrylate, 2-ethylhexyl acrylate, and the like. The monomer represented by the formula (IIIc) is preferably a monomer in which $R^{10}$ is a methyl group, and $R^{11}$ and $R^{12}$ are a methyl group or an ethyl group, and the monomer is more preferably dimethylaminoethyl methacrylate in which $R^{10}$, $R^{11}$ and $R^{12}$ are a methyl group, each being desirable.

In the quaternary ammonium salt group-containing styrenic resin, it is desirable that the monomer represented by the formula (IIIa) is contained in an amount of preferably from 60 to 97% by weight, and more preferably from 70 to 90% by weight, of the monomer mixture; the monomer represented by the formula (IIIb) is contained in an amount of preferably from 1 to 33% by weight, and more preferably from 5 to 20% by weight, of the monomer mixture; and the monomer represented by the formula (IIIc) or a quaternary compound thereof is contained in an amount of preferably from 2 to 35% by weight, and more preferably from 5 to 20% by weight, of the monomer mixture.

Specific examples of the quaternary ammonium salt group-containing styrenic resin obtained from the monomers represented by the formulae (IIIa) to (IIIc) include butyl acrylate/N,N-diethyl-N-methyl-2-(methacryloyloxy)ethyl ammonium/styrene copolymers, and the like.

It is preferable that the sulfonic acid group-containing styrenic resin is a sulfonic acid group-containing styrenic resin obtained by polymerizing a monomer mixture containing a monomer represented by the formula (IIIa), a monomer represented by the formula (IIIb), and a sulfonic acid group-containing monomer, as mentioned above.

The sulfonic acid group-containing monomer includes (meth)allylsulfonic acid, 2-(meth)acrylamide-2-methylpropanesulfonic acid, and styrenesulfonic acid. Specific examples of the sulfonic acid group-containing monomer include 2-ethylhexyl acrylate/2-acrylamide-2-methyl-1-propanesulfonic acid/styrene copolymers, and the like.

In the sulfonic acid group-containing styrenic resin, it is desirable that the monomer represented by the formula (IIIc) is contained in an amount of preferably from 60 to 97% by weight, and more preferably from 70 to 90% by weight, that the monomer represented by the formula (IIIb) is contained in an amount of preferably from 1 to 33% by weight, and more preferably from 5 to 20% by weight, and that the sulfonic acid group-containing monomer is contained in an amount of preferably from 2 to 35% by weight, and more preferably from 5 to 20% by weight, of the monomer mixture.

In both of the quaternary ammonium salt group-containing styrenic resin and the sulfonic acid group-containing styrenic resin, the polymerization of the monomer mixture can be carried out by, for example, heating a monomer mixture to 50° to 100° C. in an inert gas atmosphere in the presence of a polymerization initiator such as azobisdimethylvaleronitrile. Here, the polymerization method may be any of solution polymerization, suspension polymerization, or bulk polymerization, and preferably solution polymerization.

The styrenic resin has a softening point of preferably from 100° to 140° C., and more preferably from 110° to 130° C., from the viewpoint of low-temperature fixing ability of the toner.

The styrenic resin contained as the charge control resin is used in an amount of preferably from 3 to 40 parts by weight, preferably from 4 to 30 parts by weight, and even more preferably from 5 to 20 parts by weight, based on 100 parts by weight of the resin binder, from the viewpoint of exhibiting triboelectric chargeability of the toner.

The styrenic resin is contained in an amount of preferably 70% by weight or more, more preferably 80% by weight or more, even more preferably 90% by weight or more, and still even more preferably substantially 100% by weight, of the charge control agent.

In addition, since a polyester obtained from an aliphatic polyhydric alcohol has a high ester value, the polyester has high hygroscopicity, which leads to an insufficient initial rise in triboelectric charging. By including a resin obtained by polycondensation of an alcohol component containing an alcohol A and a carboxylic acid component, and at least one charge control agent selected from a metal compound of salicylic acid compound and a metal compound of benzilic acid compound as a charge control agent, an initial rise in triboelectric charging can be improved. The improvement is presumably due to the fact that an aliphatic polyhydric alcohol having a specified structure mentioned above has an alkyl group at a terminal, so that hydrophilicity near the ester group is suppressed, thereby resulting in an increase in hydrophobicity and improvement in dispersibility of a charge control agent, which is a metal compound of a salicylic acid compound and a benzilic acid compound.

Therefore, it is preferable that the charge control agent contains at least one of a metal compound of a salicylic acid compound represented by the formula (IV):

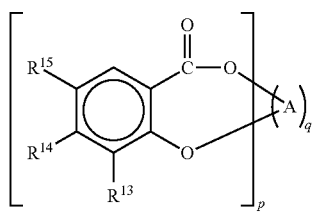

(IV)

wherein each of $R^{13}$, $R^{14}$, and $R^{15}$ is independently a hydrogen atom, a linear or branched, alkyl group having 1 to 10 carbon atoms or alkenyl group having 2 to 10 carbon atoms; A is chromium, zinc, calcium, zirconium or aluminum; p is an integer of 2 or more; and q is an integer of 1 or more; and
a metal compound of a benzilic acid compound, which is a compound represented by the formula (V):

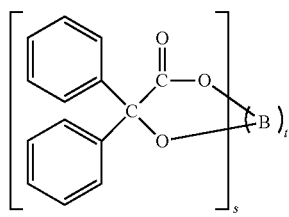

(V)

wherein B is boron or aluminum; s is an integer of 2 or more; and t is an integer of 1 or more,
from the viewpoint of an initial rise in triboelectric charging.

The metal compound of a salicylic acid compound represented by the formula (IV) may be either a metal salt or a metal complex. In the present invention, a chromium complex and a zinc complex of a salicylic acid compound wherein A is chromium or zinc are preferred, from the viewpoint of an initial rise in triboelectric charging of the toner. The metal compound of a salicylic acid compound can be also suitably used in a color toner.

In the formula (IV), $R^{14}$ is preferably a hydrogen atom, and each of $R^{13}$ and $R^{15}$ is preferably a branched alkyl group, and more preferably a tert-butyl group.

Commercially available products of the metal compound of a salicylic acid compound represented by the formula (IV) include "BONTRON E-81" ($R^{14}$: hydrogen atom, $R^{13}$ and $R^{15}$: tert-butyl group, A: chromium, manufactured by Orient Chemical Co., Ltd.); "BONTRON E-84" ($R^{14}$: hydrogen atom, $R^{13}$ and $R^{15}$: tert-butyl group, A: zinc, manufactured by Orient Chemical Co., Ltd.); "E-304" ($R^{14}$: hydrogen atom, $R^{13}$ and $R^{15}$: tert-butyl group, A: zinc, manufactured by from Orient Chemical Co., Ltd.); "TN-105" ($R^{14}$: hydrogen atom, $R^{13}$ and $R^{15}$: tert-butyl group, A: zirconium, manufactured by Hodogaya Chemical Industries); "BONTRON E-88" ($R^{14}$: hydrogen atom, $R^{13}$ and $R^{15}$: tert-butyl group, A: aluminum, manufactured by Orient Chemical Co., Ltd.), and the like.

Commercially available products of the metal compound of a benzilic acid compound represented by the formula (V) include "LR-147" (B: boron; manufactured by Japan Carlit), "LR-297" (B: aluminum; manufactured by Japan Carlit), and the like.

The metal compound of a salicylic acid compound represented by the formula (IV) or the metal compound of a benzilic acid compound represented by the formula (V) is contained in an amount, or these compounds when used together are contained in a total amount, of preferably from 0.01 to 10 parts by weight, more preferably from 0.01 to 5 parts by weight, even more preferably from 0.3 to 3 parts by weight, still even more preferably from 0.5 to 3 parts by weight, and still even more preferably from 1 to 2 parts by weight, based on 100 parts by weight of the resin binder, from the viewpoint of an initial rise in triboelectric charging of the toner.

The releasing agent includes waxes including polyolefin waxes, paraffin waxes, and silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; and mineral and petroleum waxes, such as montan wax, ozokerite, ceresin, microcrystalline wax, and Fischer-Tropsch wax. These releasing agents can be used alone, or in a mixture of two or more kinds.

The releasing agent has a melting point of preferably from 60° to 160° C., and more preferably from 60° to 150° C., from the viewpoint of low-temperature fixing ability and offset resistance of the toner.

The releasing agent is contained in an amount of preferably from 0.5 to 10 parts by weight, more preferably from 1 to 8 parts by weight, and even more preferably from 1.5 to 7 parts by weight, based on 100 parts by weight of the resin binder, from the viewpoint of dispersibility of the releasing agent in the resin binder.

The toner may be a toner obtained by any of conventionally known methods such as a melt-kneading method, an emulsion phase-inversion method, and a polymerization method, and a pulverized toner produced by the melt-kneading method is preferable, from the viewpoint of productivity and dispersibility of a colorant. In the case of a pulverized toner produced by a melt-kneading method, for example, a toner can be produced by homogeneously mixing raw materials such as a resin binder, a colorant, a charge control agent, and a releasing agent with a mixer such as a Henschel mixer, thereafter melt-kneading the mixture with a closed kneader, a single-screw or twin-screw extruder, an open roller-type kneader, or the like, cooling, pulverizing, and classifying the product. On the other hand, a toner produced by the polymerization method is preferable, from the viewpoint of forming a toner having a small particle size. An external additive such as hydrophobic silica may be added to the surface of the toner.

The toner of the present invention has a volume-median particle size ($D_{50}$) of preferably from 3 to 15 µm, and more preferably from 3 to 10 µm. Here, the volume-median particle size ($D_{50}$) as used herein means a particle size at 50% counting from smaller particle sizes in a cumulative volume frequency calculated in volume percentage.

It is preferable that an external additive is added to the surface of the toner of the present invention. The external additive includes fine inorganic particles of silica, alumina, titanium oxide, zirconia, tin oxide, zinc oxide, and the like, fine organic particles such as fine resin particles, and the like. The surface of these fine particles may be subjected to a hydrophobic treatment.

In general, a polycondensation resin obtained from an aliphatic polyhydric alcohol has insufficient transferability; however, in the present invention, an aliphatic polyhydric alcohol having a specified structure mentioned above and a specified external additive are used, whereby transferability can be improved. One of the reasons is presumably due to the fact that the resin obtained from an alcohol A has a higher glass transition temperature, as compared to resins having similar softening points. Specifically, it is presumed that the embodiment of an external additive in the resin caused by a mechanical stress is reduced because of a high glass transition temperature owned by the resin, thereby improving transferability. Further, an external additive having an average particle size of 20 to 250 nm is used, so that transferability is markedly improved. It is considered that this is because a suitable spacer effect is exhibited between the toner and the machine.

The external additive has an average particle size of preferably from 20 to 250 nm, more preferably from 30 to 200 nm, and even more preferably from 35 to 90 nm, from the viewpoint of triboelectric chargeability, flowability, and transferability of the toner.

The external additive is preferably silica, and more preferably one which contains silica having a small specific gravity, from the viewpoint of preventing embedment.

The silica is preferably a hydrophobic silica that is hydrophobically treated, from the viewpoint of transferability of the toner.

It is preferable that the method of subjecting silica to a hydrophobic treatment includes the step of modifying of a silanol group on the surface of the silica particles with a hydrophobic group such as an alkylsilyl group having 1 to 12 carbon atoms, for example, a methylsilyl group, a hexylsilyl group, or the like, or coating the surface with a hydrophobic resin.

The hydrophobically treating agent for hydrophobically treating the surface of silica particles is exemplified by organochlorosilane, organoalkoxysilane, organodisilazane, cyclic organopolysilazane, linear organopolysiloxane and the like, and specifically include hexamethyldisilazane (HMDS), dimethyldichlorosilane (DMDS), a silicone oil, octyltriethoxysilane (OTES), methyltriethoxysilane, and the like. Among them, hexamethyldisilazane is preferred.

A method of substituting a silanol group on the surface of silica particles with a hydrophobic group such as an alkylsilyl group includes, for example, a method of reacting a water-dispersed silica colloid with an alkali metal salt of an alkylsilanol (see, JP-B-Hei-7-33250 or the like); a method of adding an organic solvent, a cationic surfactant and an alkyltrialkoxysilane to a water-dispersed silica colloid, thereafter subjecting the mixture to an azeotropic dehydration, and then further heating the residue under reflux (see, JP-A-Hei-6-73389); a method of treating a wet silica or dry silica with an alkyltrialkoxysilane, an organohalogenated silicon compound, or the like (see, JP-A-Hei-6-206720, JP-A-Hei-7-187647, or the like), and the like.

In the silica that is hydrophobically treated, at least a part of silanol groups on the surface of silica particles of which is substituted with a hydrophobic group, it is desirable that the silanol groups on the surface of silica particles are substituted with hydrophobic groups in a ratio of preferably 5% by mol or more, more preferably 10% by mol or more, and even more preferably 20% by mol or more.

Here, since the silanol group on the surface of silica particles is capable of ionically adsorbing an amino group or imino group, the percentage of the silanol groups modified by the above-mentioned hydrophobic groups can be known by, for example, measuring amounts of di-n-butylamine adsorbed to the silica before and after the modification reaction, respectively. It is preferable that the treatment amount of the hydrophobically treating agent is from 1 to 7 mg/m$^2$ per surface area of the silica.

The external additive is contained in an amount of preferably from 0.05 to 5 parts by weight, more preferably from 0.1 to 3 parts by weight, and even more preferably from 0.3 to 3 parts by weight, based on 100 parts by weight of the toner particles before the treatment with the external additive.

Further, the present invention provides the following Embodiments II-1 and II-2 as embodiments for toners obtainable from an alcohol A mentioned above of the present invention:

Embodiment II-1: a toner for electrophotography obtainable by a method including the step of forming raw materials containing a resin binder into fine particles in an aqueous medium, wherein the resin binder containing a polycondensation resin obtainable by polycondensing an alcohol component containing an alcohol A and a carboxylic acid component; and Embodiment II-2: a toner for electrophotography obtainable by a method including the step of forming raw materials containing a resin binder into fine particles in an aqueous medium, wherein the resin binder contains a composite resin containing a polycondensation resin and a styrenic resin, obtainable by polymerizing raw material monomers for a polycondensation resin and raw material monomers for a styrenic resin, wherein the polycondensation resin is a resin obtainable by polycondensing an alcohol component containing an aliphatic polyhydric alcohol having two or more secondary carbon atoms with a hydroxyl group bound thereto (an alcohol A) and a carboxylic acid component.

In a case where a toner is produced by forming raw materials containing a polycondensation resin obtained from an aliphatic polyhydric alcohol into fine particles in an aqueous medium, hydrolysis is likely to take place, thereby making it likely to lower storage property and hot offset resistance. However, in the present invention, since an alcohol A is used, even when toner particles are formed in an aqueous medium, the lowering in molecular weights is suppressed, so that excellent storage property and hot offset resistance can be maintained. This is presumably due to the fact that an aliphatic polyhydric alcohol having a specified structure mentioned above has an alkyl group at a terminal, so that the ester groups are protected, thereby improving hydrolytic resistance of the polycondensation resin and suppressing the lowering of molecular weights.

Embodiment II-1

In Embodiment II-1, the resin binder contains a polycondensation resin obtainable by polycondensing an alcohol component containing an alcohol A and a carboxylic acid component.

The alcohol A is contained in an amount of preferably from 10 to 100% by mol, more preferably from 12 to 80% by mol, and even more preferably from 25 to 75% by mol, of the alcohol component, from the viewpoint of low-temperature fixing ability and storage property of the toner.

In addition, the amount of the alcohol A used upon the polycondensation of the alcohol component and the carboxylic acid component is preferably from 6 to 100 parts by weight, more preferably from 10 to 90 parts by weight, and even more preferably from 15 to 80 parts by weight, based on 100 parts by weight of a total amount of the alcohol component other than the alcohol A and the carboxylic acid component, which are the raw material monomers for the polycondensation resin, from the viewpoint of low-temperature fixing ability, storage property, and optical density under high-temperature, high-humidity conditions of the toner.

It is preferable that the alcohol component contains an alcohol B mentioned above, from the viewpoint of low-temperature fixing ability of the toner, in the same manner as in Embodiment I-1 for the resin binder mentioned above.

The alcohol B is contained in an amount of preferably from 0 to 90% by mol, more preferably from 0.5 to 90% by mol, even more preferably from 20 to 88% by mol, and still even more preferably from 25 to 75% by mol, of the alcohol component, from the viewpoint of increasing the low-temperature fixing ability of the toner.

In addition, the alcohol B is contained in an amount of preferably 10 mol or less, preferably from 0.1 to 5 mol, and more preferably from 0.3 to 3 mol, per one mol of the alcohol A, from the viewpoint of storage property and low-temperature fixing ability of the toner.

The alcohol component other than the alcohol A and the alcohol B includes the same alcohols as those in Embodiment I-1 for the resin binder mentioned above (paragraphs 0028 to 0030, and the like).

The aromatic diol is contained in an amount of preferably 10% by mol or less, and more preferably 5% by mol or less, of the alcohol component, from the viewpoint of low-temperature fixing ability of the toner, and it is preferable that substantially no aromatic diol is used. Here, substantially no aromatic diol is used refers to an aromatic diol that is contained in an amount of 0% by mol, or if any, 1% by mol or less of the alcohol component.

It is preferable that the carboxylic acid component contains at least one succinic acid derivative selected from alkyl(9 to 14 carbon atoms)succinic acids and alkenyl(9 to 14 carbon atoms)succinic acids. An aliphatic polyhydric alcohol having a specified structure mentioned above has an alkyl group at a terminal, and at the same time a succinic acid derivative having a long-chain hydrocarbon group having high hydrophobicity is used together, so that the ester groups are protected, whereby hydrolytic resistance of the resulting polycondensation resin is even further improved, and that the generation of background fogging under high-temperature, high-humidity conditions is suppressed, while maintaining low-temperature fixing ability and storage property. The reason why the generation of background fogging is suppressed under high-temperature, high-humidity conditions is presumably due to the fact that an aliphatic polyhydric alcohol having a specified structure mentioned above has an alkyl group at a terminal, so that hydrophilicity near the ester groups is suppressed, and that at the same time a succinic acid derivative having a long-chain hydrocarbon group having high hydrophobicity is used as a carboxylic acid component, so that hygroscopicity is lowered.

The number of carbon atoms in the alkyl group or the alkenyl group in the alkylsuccinic acid and the alkenylsuccinic acid is from 9 to 14, and preferably from 10 to 12, from the viewpoint of increasing low-temperature fixing ability, storage property, and suppression of background fogging under high-temperature, high-humidity conditions of the toner. In addition, those alkyl group and alkenyl group may be linear or branched, and those groups are preferably branched, from the viewpoint of increasing suppression of background fogging under high-temperature, high-humidity conditions.

Further, it is preferable that the succinic acid derivative is one comprising two or more members selected from the group consisting of alkylsuccinic acids having a branched alkyl group of 9 to 14 carbon atoms and alkenylsuccinic acids having a branched alkenyl group of 9 to 14 carbon atoms, from the viewpoint of increasing low-temperature fixing ability and suppression of background fogging under high-temperature, high-humidity conditions of the toner. Therefore, the succinic acid derivative is preferably one comprising two or more alkylsuccinic acids having a branched alkyl group of 9 to 14 carbon atoms, or one comprising two or more alkenylsuccinic acids having a branched alkenyl group of 9 to 14 carbon atoms, or one comprising one or more of each of the above-mentioned alkylsuccinic acids and the above-mentioned alkenylsuccinic acids.

By using succinic acid derivatives having branched alkyl groups and/or alkenyl groups with different numbers of carbon atoms in combination, the resulting resins have a broad endothermic peak near a glass transition temperature in accordance with the differential scanning calorimetry (DSC), so that the resins have very wide fixing temperature regions as a resin binder for use in a toner.

Specific examples of the branched alkyl group and alkenyl group having 9 to 14 carbon atoms include an isododecenyl group, an isododecyl group and the like.

It is preferable that the alkylsuccinic acid and alkenylsuccinic acid are those obtained from a compound having an alkylene group (alkylene compound), and at least one member selected from maleic acid, fumaric acid, and acid anhydrides thereof, in the same manner as in Embodiment I-1, from the viewpoint of improving storage property and low-temperature fixing ability, and suppression of background fogging under high-temperature, high-humidity conditions of the toner.

The succinic acid derivative is contained in an amount of preferably from 3 to 50% by mol, more preferably from 4 to 45% by mol, and even more preferably from 5 to 40% by mol, of the carboxylic acid component, from the viewpoint of low-temperature fixing ability, storage property and optical density under high-temperature, high-humidity conditions of the toner.

The carboxylic acid component other than the succinic acid derivative is the same as those in Embodiment I-1 (paragraphs 0045 to 0050, and the like).

The polycondensation reaction of the alcohol component and the carboxylic acid component can be carried out in the presence of an esterification catalyst, in the same manner as in Embodiment I-1.

The polycondensation resin includes polyesters, polyester-polyamides, and the like. Among them, polyesters are preferred from the viewpoint of durability and triboelectric chargeability.

Here, the polyester may contain a polyester modified to an extent that the properties are substantially not impaired. For example, a modified polyester refers to a polyester grafted or blocked with phenol, urethane, epoxy, or the like according to a method described in JP-A-Hei-11-133668, JP-A-Hei-10-239903, JP-A-Hei-8-20636 or the like.

Using raw material monomers for forming an amide component in addition to the alcohol component and the carboxylic acid component mentioned above, the polyester-polyamide is obtained by polycondensing these raw material monomers. The raw material monomers for forming an amide component include various polyamines, aminocarboxylic acids, amino alcohols, and the like that are known in the art.

The polycondensation resin has a softening point of preferably from 90° to 160° C., more preferably from 95° to 155° C., and even more preferably from 115° to 150° C., from the viewpoint of low-temperature fixing ability, storage property, and durability. The polycondensation resin has a glass transition temperature of preferably from 45° to 85° C., more preferably from 50° to 80° C., and even more preferably from 58° to 75° C., from the viewpoint of low-temperature fixing ability, storage property, and durability. The polycondensation resin has an acid value of preferably from 1 to 90 mg KOH/g, more preferably from 5 to 90 mg KOH/g, and even more preferably from 5 to 88 mg KOH/g, from the viewpoint of triboelectric chargeability and environmental stability.

According to a method including the step of forming raw materials containing a polycondensation resin mentioned above as a resin binder into fine particles in an aqueous medium, a toner for electrophotography that is excellent in both low-temperature fixing ability and storage property, which are counteractive properties to each other, and further having excellent hot offset resistance and resistance to background fogging under high-temperature, high-humidity conditions is obtained.

In the toner, a known resin binder other than the above-mentioned polycondensation resin, for example, a resin including a polyester, a vinyl resin such as styrene-acrylic resin, an epoxy resin, a polycarbonate, or a polyurethane may be used together within the range that would not impair the effects of the present invention. The above-mentioned polycondensation resin is contained in an amount of preferably 30% by weight or more, more preferably 50% by weight or more, even more preferably 70% by weight or more, even more preferably 80% by weight or more, even more preferably 90% by weight or more, and even more preferably essentially 100% by weight, of the entire resin binder.

The toner may further properly contain an additive such as a colorant, a releasing agent, a charge control agent, a magnetic powder, a fluidity improver, an electric conductivity modifier, an extender pigment, a reinforcing filler such as a fibrous material, an antioxidant, an anti-aging agent, or a cleanability improver.

As the colorant, all of the dyes, pigments and the like which are used as colorants for toners can be used. The colorant includes carbon blacks, black pigments, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, isoindoline, disazoyellow, and the like. These colorants can be used alone or in admixture of two or more members. The toner may be any of black toner and color toner.

The colorant is contained in an amount of preferably from 1 to 40 parts by weight, and more preferably from 2 to 10 parts by weight, based on 100 parts by weight of the resin binder.

The charge control agent includes a chromium-based azo dye, an iron-based azo dye, an aluminum-based azo dye, a metal complex of salicylic acid, and the like. These charge control agents can be used alone or in admixture of two or more members.

The charge control agent is contained in an amount of preferably from 0.1 to 8 parts by weight, and more preferably from 0.5 to 7 parts by weight, based on 100 parts by weight of the resin binder. In addition, the charge control agent such as a metal compound of a salicylic acid compound and a benzilic acid compound mentioned above, and a styrenic resin mentioned above as a charge control resin can also be used in the same manner.

The releasing agent includes waxes including polyolefin waxes, paraffin waxes, and silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; and mineral and petroleum waxes, such as montan wax, ozokerite, ceresin, microcrystalline wax, and Fischer-Tropsch wax. These releasing agents can be used alone, or in a mixture of two or more kinds.

The releasing agent has a melting point of preferably from 60° to 160° C., and more preferably from 60° to 150° C., from the viewpoint of low-temperature fixing ability and offset resistance of the toner.

The releasing agent is contained in an amount of preferably from 0.5 to 10 parts by weight, more preferably from 1 to 8 parts by weight, and even more preferably from 1 to 7 parts by weight, based on 100 parts by weight of the resin binder, from the viewpoint of dispersibility of the releasing agent in the resin binder.

The toner for electrophotography of Embodiment II-1 is not particularly limited in its production method, so long as the toner is obtained by a method including the step of forming raw materials containing a resin binder into fine particles in an aqueous medium, and the method includes, for example, (A) a method including the steps of previously forming primary particles containing a resin binder in an aqueous medium, and aggregating/unifying the primary particles;

(B) a method including the steps of previously forming primary particles containing a resin binder in an aqueous medium, and fusing the primary particles;

(C) a method including the steps of dispersing raw materials containing a resin binder in an aqueous medium, and forming the dispersion into fine particles, and the like.

In the present invention, the method (A) is preferred, and a method including the steps of (1) introducing an aqueous medium to a mixed solution prepared by dissolving or dispersing raw materials containing a resin binder in an organic solvent, and thereafter removing the organic solvent from the mixture, to provide an aqueous dispersion of primary particles containing a resin binder; and (2) aggregating or unifying the primary particles is preferred. Here, another specific example of the method (A) is a method including the steps of (1') forming primary particles containing a resin binder in an aqueous medium in the presence of a nonionic surfactant, and (2) aggregating or unifying the primary particles.

A specific method of the method (B) includes a method including the steps of subjecting a radical-polymerizable monomer solution in which a resin binder is dissolved to an emulsion polymerization to give fine resin particles, and fusing the resulting fine resin particles in an aqueous medium (see JP-A-2001-42568). A specific example of the method (C) includes a method including the steps of thermally melting raw materials containing a resin binder, dispersing the raw materials in an aqueous medium without containing an organic solvent, while maintaining a molten state of the resin binder, and thereafter drying the dispersion (see JP-A-2001-235904), and the like.

The step (1) is a step of introducing an aqueous medium to a mixed solution prepared by dissolving or dispersing raw materials containing a resin binder in an organic solvent, and thereafter removing the organic solvent from the mixture, to provide an aqueous dispersion of primary particles containing a resin binder.

It is preferable that the organic solvent is used in an amount of from 100 to 1,000 parts by weight, based on 100 parts by weight of the resin binder. Water and further a neutralizing agent, as occasion demands, are mixed with the mixed solution while stirring, and thereafter the organic solvent is removed from the resulting dispersion, whereby an aqueous dispersion of primary particles of a self-dispersible resin can be obtained.

The aqueous medium is used in an amount of preferably from 100 to 1,000 parts by weight, based on 100 parts by weight of the organic solvent. Here, the aqueous medium usable in the process (1) and a step (1') described later may contain a solvent such as an organic solvent, and contains water in an amount of preferably 50% by weight or more, preferably 70% by weight or more, more preferably from 90% by weight or more, and even more preferably 99% by weight or more.

Upon stirring the mixture, a generally employed mixing agitator such as an anchor blade can be used. The neutralizing agent includes an alkali metal of lithium hydroxide, sodium hydroxide, potassium hydroxide, or the like; organic bases such as ammonia, trimethylamine, ethylamine, diethylamine, triethylamine, triethanolamine, and tributylamine.

In addition, the dispersion of primary particles containing a resin binder can be made into a dispersion, without using an organic solvent, as in the step (1').

The step (1') is a step of forming primary particles containing a resin binder in an aqueous medium in the presence of a nonionic surfactant.

According to the process of the step (1'), a resin binder can be formed into fine particles even when water is used alone without using substantially any organic solvents.

In the step (1'), a resin binder containing a polycondensation resin and a nonionic surfactant are mixed, whereby a dispersion can also be prepared without using an organic solvent. In this step, a viscosity of the mixture is lowered, so that a resin binder can be formed into fine particles. This is due to the fact that a nonionic surfactant is compatible to a resin binder and a viscosity of the mixture is lowered, which results in an apparent lowering of a softening point of the resin. Utilizing this phenomenon, an apparent softening point of a resin binder that is compatible with a nonionic surfactant can be lowered to a temperature of a boiling point of water or lower, so that a dispersion prepared by dispersing a resin binder can be obtained by adding water dropwise under a normal pressure, even with a resin binder having a melting point or softening point of 100° C. or more for the resin alone. In this method, at least water and a nonionic surfactant would be needed, so that the method can be applied to a resin insoluble to an organic solvent, and that loads on the facilities for collecting an organic solvent and maintaining operating environments are unnecessary, and a specialized apparatus that is to be needed when utilizing a mechanical means is also unnecessary, thereby having an advantage that a resin dispersion can be produced economically.

The nonionic surfactant usable in the step (1') includes, for example, polyoxyethylene alkylaryl ethers or polyoxyethylene alkyl ethers such as polyoxyethylene nonylphenyl ether, polyoxyethylene oleyl ether, and polyoxyethylene lauryl ether; polyoxyethylene sorbitan esters such as polyoxyethylene sorbitan monolaurate and polyoxyethylene sorbitan monostearate; polyoxyethylene fatty esters such as polyethylene glycol monolaurate, polyethylene glycol monostearate, polyethylene glycol monooleate; oxyethylene/oxypropylene block copolymers, and the like. In addition, the nonionic surfactant may be used together with an anionic surfactant or a cationic surfactant.

It is preferable to select a nonionic surfactant which has excellent compatibility with a resin binder. In order to obtain a stable dispersion of a resin binder, the nonionic surfactant has an HLB of preferably from 12 to 20, and it is more preferable to use two or more members of nonionic surfactants having different HLB, depending on the members of the resin binders. For example, in a case where a resin has a high hydrophilicity, at least one member of a nonionic surfactant having an HLB of from 12 to 18 may be used. In a case of a resin having high hydrophobicity, it is preferable that a nonionic surfactant having a low HLB, for example, one having an HLB of 7 to 10 or so and a nonionic surfactant having a high HLB, for example, one having an HLB of 14 to 20, are used together, thereby adjusting a weighted average of HLB of both the nonionic surfactants to 12 to 20. In this case, it is presumed that primarily a nonionic surfactant having an HLB of 7 to 10 or so can be made compatible with the resin, and that a nonionic surfactant having a high HLB can serve to stabilize the dispersion of the resin in water.

In addition, in a case where a colorant is used, it is preferable that a nonionic surfactant is adsorbed to the colorant. By adjusting the HLB of the nonionic surfactant to the range mentioned above, the nonionic surfactant is likely to adsorb to the surface of the colorant, whereby the nonionic surfactant can be stably present in the resin binder.

When a resin binder is formed into fine particles in water under a normal pressure, the nonionic surfactant has a cloud point of preferably from 70° to 105° C., and more preferably from 80° to 105° C.

The nonionic surfactant is used in an amount of preferably 5 parts by weight or more, based on 100 parts by weight of the resin binder from the viewpoint of lowering a melting point of the resin binder, and the nonionic surfactant is used in an amount of preferably 80 parts by weight or less, from the viewpoint of controlling the nonionic surfactant remaining in the toner. Therefore, the nonionic surfactant is used in an amount of preferably from 5 to 80 parts by weight, more preferably from 10 to 70 parts by weight, and even more preferably from 20 to 60 parts by weight, based on 100 parts by weight of the resin binder, from the viewpoint of satisfying both of these.

In the step (1'), upon the formation of primary particles containing a resin binder in an aqueous medium in the presence of a nonionic surfactant, it is desirable that the temperature inside the system is kept within a temperature calculated from a cloud point of the nonionic surfactant plus or minus 10° C., preferably plus or minus 8° C., more preferably plus or minus 5° C., from the viewpoint of dispersibility of the nonionic surfactant and prevention of the lowering of dispersion efficiency.

In the step (1'), for example, it is preferable that an aqueous medium (preferably deionized water or distilled water) is added dropwise to a system in a state where a mixture of a resin binder and a nonionic surfactant is stirred and homogeneously mixed. In a case where a colorant is used, it is preferable that a resin binder containing a colorant being made compatible with a nonionic surfactant does not separate from water.

The aqueous medium in the step (1') is used in an amount of preferably from 100 to 3,000 parts by weight, more preferably from 400 to 3,000 parts by weight, and even more preferably from 800 to 3,000 parts by weight, based on 100 parts by weight of the resin binder, from the viewpoint of obtaining homogeneous aggregated particles in the subsequent steps.

The particle size of the primary particles containing a resin binder containing a polycondensation resin can be controlled by an amount of the nonionic surfactant, an extent of stirring, a rate of adding water, or the like. In the step (1'), the rate of adding an aqueous medium to a mixture containing at least a resin binder and a nonionic surfactant is preferably from 0.1 to 50 g/min, more preferably from 0.5 to 40 g/min, and even more preferably from 1 to 30 g/min, per 100 g of the mixture, from the viewpoint of obtaining homogenous primary particles.

In a case where a resin binder has an acidic group such as a carboxyl group or a sulfonate group, water may be added after a part or all of the resin binder is neutralized, or while neutralizing. In a case where a resin binder having an acidic group is used, in addition to the factors of the nonionic surfactant, self-emulsifiability would be a controlling factor for the particle size of the primary particles.

A dispersant can be used for the purposes of lowering a melt viscosity and a melting point of the resin binder, and improving dispersibility of the formed primary particles. The dispersant includes, for example, water-soluble polymers such as polyvinyl alcohol, methyl cellulose, ethyl cellulose, hydroxyethyl cellulose, carboxymethyl cellulose, sodium polyacrylate, and sodium polymethacrylate; anionic surfactants such as sodium dodecylbenzenesulfonate, sodium octadecyl sulfate, sodium oleate, sodium laurate, and potassium stearate; cationic surfactants such as laurylamine acetate, stearylamine acetate, and lauryl trimethylammonium chloride; amphoteric surfactants such as lauryl dimethylamine oxide; and inorganic salts such as tricalcium phosphate, aluminum hydroxide, calcium sulfate, calcium carbonate, and barium carbonate. The dispersant is used in an amount of preferably 20 parts by weight or less, more preferably 15 parts by weight or less, and even more preferably 10 parts by weight or less, based on 100 parts by weight of the resin binder, from the viewpoint of emulsion stability and detergency.

The solid content of the dispersion of the primary particles containing a resin binder obtained in the step (1) or the step (1') (hereinafter also simply referred to as primary particles) is preferably from 7 to 50% by weight, and more preferably from 7 to 40% by weight, from the viewpoint of stability of the dispersion and handling property of the dispersion in the aggregating step. The solid content includes non-volatile components such as a resin and a nonionic surfactant.

The primary particles have an average particle size of preferably from 0.05 to 3 μm, more preferably from 0.05 to 1 μm, and even more preferably from 0.05 to 0.8 μm, from the viewpoint of homogeneously aggregating the primary particles in the subsequent steps. In the present invention, the average particle size of the primary particles refers to a volume-median particle size ($D_{50}$), which can be measured with a laser diffraction particle size analyzer or the like.

Subsequently, the step of aggregating and unifying the primary particles obtained in the step (1) or the step (1') (step (2)) will be explained.

In the step (2), the solid content of the system in the aggregating step of aggregating the primary particles obtained in the step (1) or the step (1') can be adjusted by adding water to a dispersion of a resin binder, and the solid content is preferably from 5 to 50% by weight, more preferably from 5 to 30% by weight, and even more preferably from 5 to 20% by weight, in order to cause homogeneous aggregation.

The pH inside the system in the aggregating step is preferably from 2 to 10, more preferably from 2 to 9, and even more preferably from 3 to 8, from the viewpoint of satisfying both dispersion stability of a mixed solution and aggregating property of the fine particles made of a resin binder or the like.

It is preferable that the temperature inside the system in the aggregating step is a temperature equal to or higher than a temperature calculated from a softening point of a resin binder minus 70° C. or more and equal to or lower than a softening point, from the same viewpoint.

In addition, an additive such as a colorant or a charge control agent may be previously mixed with a resin binder upon the preparation of primary particles, or each additive may be separately dispersed in a dispersion medium such as water to prepare a dispersion, and the dispersion is mixed with primary particle s, and subjected to the aggregating step. In a case where an additive is previously mixed with a resin binder upon the preparation of primary particles, it is preferable that the resin binder and the additive are previously melt-kneaded. In the melt-kneading, it is preferable to use an open roller-type twin-screw kneader. The open-roller twin-screw kneader is a kneader containing two rollers arranged in parallel closely to each other, wherein a heating function or a cooling function can be provided by passing a heating medium through each roller. Therefore, the open-roller type twin-screw kneader contains a melt-kneading part that is open, and also is equipped with a heat roller and a cooling roller, so that the open-roller type twin-screw kneader can easily dissipate the kneading heat generated during the melt-kneading, which is different from twin-screw extruders conventionally used.

In the aggregating step, in order to effectively carry out the aggregation, an aggregating agent can be added. As the aggregating agent, a cationic surfactant in the form of a quaternary salt, polyethyleneimine, or the like may be used as an organic aggregating agent, and an inorganic metal salt, a divalent or higher polyvalent metal complex or the like may be used as an inorganic aggregating agent. The inorganic metal salt includes, for example, metal salts such as sodium sulfate, sodium chloride, calcium chloride, calcium nitrate, barium chloride, magnesium chloride, zinc chloride, aluminum chloride, and aluminum sulfate; and inorganic metal salt polymers such as poly(aluminum chloride), poly(aluminum hydroxide), and poly(calcium sulfide).

The amount of the aggregating agent used is preferably 30 parts by weight or less, more preferably 20 parts by weight or less, and even more preferably 10 parts by weight or less, based on 100 parts by weight of the resin binder, from the viewpoint of the environmental resistance of the toner.

Subsequently, the aggregated particles containing at least a resin binder obtained in the above-mentioned aggregating step are heated to unify (unifying step).

The temperature inside the system in the unifying step is preferably equal to or higher than a temperature calculated from the softening point of the resin binder −(minus) 50° C. and equal to or lower than a temperature calculated from the softening point of the resin binder +(plus) 10° C., more preferably equal to or higher than the softening point of the resin binder minus 45° C. and equal to or lower than a temperature calculated from the softening point plus 10° C., and even more preferably equal to or higher than the softening point of the resin binder minus 40° C. and equal to or lower than a temperature calculated from the softening point of the resin binder plus 10° C., from the viewpoint of controlling particle sizes, particle size distribution, and shapes of the intended toner, and fusibility of the aggregate particles. In addition, it is preferable that the stirring rate is a rate at which the aggregate particles are not precipitated. In the present invention, in a case where two or more kinds of resins are used as a resin binder, a softening point of a mixed resin is regarded as a softening point of the resin binder.

The unified particles obtained in the step (2) are subjected through the steps such as liquid-solid separation step such as filtration, washing step, and drying step, whereby a toner can be obtained.

In the washing step, it is preferable that an acid is used for removing metal ions on the toner surface, in order to secure satisfactory triboelectric charging properties and reliability as a toner. Also, it is preferable that the added nonionic surfactant is completely removed by washing, and it is preferable that the washing is carried out with an aqueous solution at a temperature equal to or lower than the cloud point of the nonionic surfactant. The washing is carried out preferably plural times.

In addition, in the drying step, any methods such as vibration-type fluidizing drying method, spray-drying method, freeze-drying method, or flash jet method can be employed.

The toner has a volume-median particle size ($D_{50}$) preferably from 1 to 10 μm, more preferably from 2 to 8 μm, and even more preferably from 3 to 7 μm. Here, the volume-median particle size ($D_{50}$) as used herein means a particle size at 50% counting from smaller particle sizes in a cumulative volume frequency calculated in volume percentage.

An external additive may be added to the surface of the toner. The external additive includes fine inorganic particles of silica, alumina, titanium oxide, zirconia, tin oxide, zinc oxide, and the like, fine organic particles such as fine resin particles, and the like. The surface of these fine particles may be subjected to a hydrophobic treatment. It is preferable that the external additive is added in an amount of from 0.05 to 5 parts by weight, based on 100 parts by weight of toner particles before subjection to a treatment with the external additive.

Embodiment II-2

In Embodiment II-2, the resin binder contains a composite resin containing a polycondensation resin and a styrenic resin, obtainable from the polymerization of raw material monomers for a polycondensation resin and raw material monomers for a styrenic resin.

An alcohol component containing an alcohol A and a carboxylic acid component are used as the raw material monomers for a polycondensation resin, and raw material monomers for a styrenic resin are used as the above-mentioned raw material monomers for the styrenic resin, whereby hydrolytic resistance of the polycondensation resin is even further improved. This is presumably due to the fact that an aliphatic polyhydric alcohol having a specified structure has an alkyl group at a terminal, and at the same time the styrenic resin has a high hydrophobicity, so the ester groups are protected, thereby improving hydrolytic resistance of the polycondensation resin and suppressing the lowering of molecular weight.

In addition, in a chemical toner for which an additive cannot be dispersed by applying a shearing force as in a kneading-pulverization method, durability is likely to be worsened due to dispersion failure of a releasing agent, or the like, but on the other hand durability is also improved. The reason why durability is improved is presumably due to the fact that alkyl groups are adjoined to the secondary carbon atoms with a hydroxyl group bound thereto, so that hydrophilicity near the ester group is suppressed, and that at the same time a hydrophobic styrenic resin is contained, so that dispersibility of an additive such as a releasing agent is improved.

The alcohol A is contained in an amount of preferably from 10 to 100% by mol, more preferably from 12 to 80% by mol, and even more preferably from 25 to 75% by mol, of the alcohol component of the polycondensation resin, from the viewpoint of low-temperature fixing ability and storage property of the toner.

In addition, the amount of the alcohol A used upon the polycondensation of the alcohol component and the carboxylic acid component is preferably from 6 to 100 parts by weight, more preferably from 10 to 90 parts by weight, and even more preferably from 15 to 80 parts by weight, based on 100 parts by weight of a total amount of the alcohol component other than the alcohol A and the carboxylic acid component, which are the raw material monomers for the polycondensation resin, from the viewpoint of low-temperature fixing ability and storage property of the toner.

It is preferable that the alcohol component contains the alcohol B mentioned above, from the viewpoint of low-temperature fixing ability of the toner, in the same manner as in Embodiment I-1 for the above-mentioned resin binder.

The alcohol B is contained in an amount of preferably from 0 to 90% by mol, more preferably from 0.5 to 90% by mol, even more preferably from 20 to 88% by mol, and still even more preferably from 25 to 75% by mol, of the alcohol component, from the viewpoint of increasing low-temperature fixing ability of the toner.

In addition, the alcohol B is contained in an amount of preferably 10 mol or less, preferably from 0.1 to 5 mol, and more preferably from 0.3 to 3 mol per one mol of the alcohol A, from the viewpoint of storage property and low-temperature fixing ability of the toner.

The alcohol component other than the alcohol A and the alcohol B includes the same alcohols as those in Embodiment I-1 for the above-mentioned resin binder (paragraphs 0028 to 0031, and the like).

The carboxylic acid component of the polycondensation resin, the polycondensation reaction of the alcohol component and the carboxylic acid component, the raw material monomers for the styrenic resin and addition polymerization conditions therefor, and the method for producing a composite resin are the same as those in Embodiment I-2 for the above-mentioned resin binder (paragraphs 0082 to 0104, and the like).

The composite resin may be a mixture of a polycondensation resin and a styrenic resin, preferably a resin obtainable by the polymerization raw materials for a polycondensation resin and raw materials for a styrenic resin, and it is more preferable that the composite resin is a hybrid resin obtainable from a dually reactive monomer, in addition to the raw material monomers for a polycondensation resin and the raw material monomers for a styrenic resin, in the same manner as in Embodiment I-1, from the viewpoint of improving storage property, hot offset resistance, and durability of the toner.

The composite resin may be a resin obtainable by polymerizing raw material monomers in the presence of a wax.

The weight ratio of the polycondensation resin to the styrenic resin, in other words, a weight ratio of the raw material monomers for a polycondensation resin to the raw material monomers for a styrenic resin, i.e. raw material monomers for a polycondensation resin/raw material monomers for a styrenic resin, is preferably from 55/45 to 95/5, more preferably from 60/40 to 95/5, and even more preferably from 70/30 to 90/10, because it is preferable that a continuous phase comprises the polycondensation resin, and a dispersed phase comprises the styrenic resin.

The composite resin has a softening point of preferably from 90° to 160° C., more preferably from 95° to 155° C., and even more preferably from 115° to 150° C., from the viewpoint of low-temperature fixing ability, storage property and durability of the toner. The composite resin has a glass transition temperature of preferably from 45° to 85° C., more preferably from 50° to 80° C., and even more preferably from 58° to 75° C., from the viewpoint of low-temperature fixing ability, storage property and durability of the toner. The composite resin has an acid value of preferably from 1 to 90 mg KOH/g, more preferably from 5 to 90 mg KOH/g, and even more preferably from 5 to 88 mg KOH/g, from the viewpoint of triboelectric chargeability and environmental stability of the toner.

According to a method including the step of forming raw materials containing the above-mentioned composite resin as a resin binder into fine particles, a toner for electrophotography which is excellent in both low-temperature fixing ability and storage property, which are counteractive properties to each other, and also having excellent hot offset resistance and durability is obtained.

In the toner, a known resin binder other than the above-mentioned composite resin, for example, a resin including a polyester, a vinyl resin such as styrene-acrylic resin, an epoxy resin, a polycarbonate, or a polyurethane may be used together within the range that would not impair the effects of the present invention. The above-mentioned composite resin is contained in an amount of preferably 30% by weight or more, more preferably 50% by weight or more, even more preferably 70% by weight or more, even more preferably 80% by weight or more, even more preferably 90% by weight or more, and even more preferably essentially 100% by weight, of the entire resin binder.

The toner may further properly contain an additive such as a colorant, a releasing agent, a charge control agent, a magnetic powder, a fluidity improver, an electric conductivity modifier, an extender pigment, a reinforcing filler such as a fibrous material, an antioxidant, an anti-aging agent, or a cleanability improver, in the same manner as in Embodiment II-1.

The toner for electrophotography of Embodiment II-2 is not particularly limited in its production method, so long as the toner is obtained by a method including the step of forming raw materials containing a resin binder in an aqueous medium into fine particles, and a specific production method thereof is the same as those in Embodiment II-1.

The toner has a volume-median particle size ($D_{50}$) preferably from 1 to 10 μm, more preferably from 2 to 8 μm, and even more preferably from 3 to 7 μm. Here, the volume-median particle size ($D_{50}$) as used herein means a particle size at 50% counting from smaller particle sizes in a cumulative volume frequency calculated in volume percentage.

An external additive may be added to the surface of the toner. The external additive includes fine inorganic particles of silica, alumina, titanium oxide, zirconia, tin oxide, zinc oxide, and the like, fine organic particles such as fine resin particles, and the like. The surface of these fine particles may be subjected to a hydrophobic treatment. It is preferable that the external additive is added in an amount of from 0.05 to 5 parts by weight, based on 100 parts by weight of toner particles before subjection to a treatment with the external additive.

The toner of the present invention can be used as a toner for monocomponent development, or a two-component developer prepared by mixing the toner with a carrier.

EXAMPLES

The present invention will be specifically described hereinbelow by the Examples, without intending to limit the scope of the present invention thereto. In addition, since the present invention is made up by various embodiments, an example of one embodiment may be a comparative example in another embodiment in certain cases, but these embodiments are common in the aspect of providing excellent low-temperature fixing ability and storage ability by using the alcohol A.

Analysis by Mass Spectroscopy-Gas Chromatography of Alkylene Compounds

CI ion source and the following analytical column were attached to a mass spectroscopy-gas chromatograph (GC/MS), and the gas chromatograph is started up. Here, a CI reactive gas (methane) is allowed to pass through the gas chromatograph, and tuning is carried out after 24 hours passed from the operation of vacuum-gas discharging of the MS section.

(1) GC

| | |
|---|---|
| Gas chromatograph: | Agilent, HP6890N |
| Analyzing column: | manufactured by HP, Ultra 1 (column length: 50 m, inner diameter: 0.2 mm, film thickness: 0.33 μm) |
| Heating Conditions for GC Oven: | |
| Initial Temperature | 100° C. (0 min) |
| First-Stage Heating Rate: | 1° C./min (up to 150° C.) |
| Second-Stage Heating Rate: | 10° C./min (up to 300° C.) |
| Final Temperature: | 300° C. (10 min) |
| Amount of Sample Injected: | 1 μL |
| Injection Inlet Conditions: | |
| Injection Mode | split method |
| Split Ratio: | 50:1 |
| Injection Inlet Temperature: | 300° C. |
| Carrier Gas: | |
| Gas: | Helium |
| Flow Rate: | 1 ml/min (Constant flow rate mode) |

(2) Detector

| | |
|---|---|
| Mass Spectrometer: | manufactured by Agilent, 5973N MSD |
| Ionization Method: | Chemical ionization method |
| Reactive Gas: | Isobutane |
| Temperature setting: | Quadripole 150° C. Ion Source 250° C. |
| Detection Conditions: | Scan |
| Scanning Range: | m/z 75-300 |
| Detector ON-Time: | 5 min |
| Calibration (Mass Calibration and Sensitivity Adjustment): | |
| Reactive Gas | methane Calibrant PFDTD (Perfluoro-5,8-dimethyl-3,6,9-trioxydodecane) |
| Tuning method | auto-tuning |

(3) Preparation of Sample

Propylene tetramer is dissolved in isopropyl alcohol at a concentration of 5% by weight.

(Data Processing Method)

Mass chromatograph that corresponds to each of the molecular ions is extracted for a certain alkene component having each of the carbon atoms of which number of carbon atoms is within the range of from 9 to 14, and integration is executed in accordance with the integration condition for each component under the conditions of S/N (signal/noise ratio)>3. From the detection results shown in each of Tables A to E5, a proportion of a particular alkyl chain component is calculated in accordance with the following formula.

Proportion of Particular Alkyl Chain Component =

$$\frac{\text{Total Sum of Integral of Particular Alkyl Chain}}{\text{Total Sum of Integral of All the C9-C14}} \times 100(\%)$$ [Math 1]

TABLE A

| | Molecular Weight Mw | Molecular Ion M/Z | Monitored Mass Range M/Z-M/Z |
|---|---|---|---|
| C9H18 | 126 | 127 | 126.70-127.70 |
| C10H20 | 140 | 141 | 140.70-141.70 |
| C11H22 | 154 | 155 | 154.70-155.70 |
| C12H24 | 168 | 169 | 168.70-169.70 |
| C13H26 | 182 | 183 | 182.70-183.70 |
| C14H28 | 196 | 197 | 196.70-197.70 |

(4) Integration Conditions $C_9H_{18}$

TABLE B

| Integration Conditions | Value (V) | Time (T) |
|---|---|---|
| Initial Area Reject | 0 | Initial |
| Initial Peak Width | 0.200 | Initial |
| Shoulder Detection | OFF | Initial |
| Initial Threshold | 5.0 | Initial |
| Peak Width | 2.000 | 5.000 |

$C_{10}H_{20}$

TABLE C

| Integration Conditions | Value (V) | Time (T) |
|---|---|---|
| Initial Area Reject | 0 | Initial |
| Initial Peak Width | 0.200 | Initial |
| Shoulder Detection | OFF | Initial |
| Initial Threshold | 7.0 | Initial |
| Peak Width | 2.000 | 5.000 |

$C_{11}H_{22}$, $C_{12}H_{24}$ and $C_{13}H_{26}$

TABLE D

| Integration Conditions | Value (V) | Time (T) |
|---|---|---|
| Initial Area Reject | 0 | Initial |
| Initial Peak Width | 0.200 | Initial |

TABLE D-continued

| Integration Conditions | Value (V) | Time (T) |
|---|---|---|
| Shoulder Detection | OFF | Initial |
| Initial Threshold | 7.0 | Initial |
| Peak Width | 2.000 | 5.000 |

$C_{14}H_{28}$

TABLE E

| Integration Conditions | Value (V) | Time (T) |
|---|---|---|
| Initial Area Reject | 0 | Initial |
| Initial Peak Width | 0.200 | Initial |
| Shoulder Detection | OFF | Initial |
| Initial Threshold | 5.0 | Initial |
| Peak Width | 2.000 | 11.000 |

In the present invention, the alkylene compound corresponding to 9 to 14 carbon atoms refers to peaks corresponding to the molecular ions according to gas chromatography mass spectroscopy.

Softening Point of Resins

The softening point refers to a temperature at which a half of the sample flows out, when plotting a downward movement of a plunger of a flow tester (Shimadzu Corporation, "CFT-500D"), against temperature, in which a sample is prepared by applying a load of 1.96 MPa thereto with the plunger using the flow tester and extruding a 1 g sample through a nozzle having a die pore size of 1 mm and a length of 1 mm, while heating the sample so as to raise the temperature at a rate of 6° C./min.

Temperature of Maximum Endothermic Peak of Resins

A temperature of maximum endothermic peak is obtained by raising the temperature of a sample at a rate of 10° C./min., the sample prepared by raising the temperature of a sample to 200° C. using a differential scanning calorimeter (manufactured by TA Instruments, Japan, "DSC Q20"), and cooling the heated sample from that temperature to 0° C. at a cooling rate of 10° C./min.

Glass Transition Temperatures of Resins

The glass transition temperature refers to a temperature of an intersection of the extension of the baseline of equal to or lower than the temperature of the maximum endothermic peak and the tangential line showing the maximum inclination between the kick-off of the peak and the top of the peak, which is determined using a differential scanning calorimeter (manufactured by Seiko Instruments, Inc., "DSC 210") of a sample of which temperature is raised at a rate of 10° C./min., the sample prepared by measuring out a sample in an amount of from 0.01 to 0.02 g on an aluminum pan, raising its temperature to 200° C., and cooling the sample from that temperature to 0° C. at a cooling rate of 10° C./min.

Acid Values of Resins

The acid value is measured based on a method of JIS K0070, provided that only a measurement solvent is changed from a mixed solvent of ethanol and ether as prescribed in JIS K0070 to a mixed solvent of acetone and toluene (acetone:toluene=1:1 (volume ratio)).

Hydroxyl Values of Resins

The hydroxyl values are measured based on a method of JIS K0070.

Melting Point of Releasing Agent

A temperature of maximum peak of heat of fusion obtained by raising the temperature of a sample at a rate of 10° C./min., the sample prepared by raising the temperature of a sample to 200° C. using a differential scanning calorimeter (manufactured by Seiko Instruments, Inc., "DSC 210"), and cooling the heated sample from that temperature to 0° C. at a cooling rate of 10° C./min., is referred to as a melting point.

Average Particle Size of Particles in Dispersion

Distill water was added to a cell for measurement, and a volume-median particle size ($D_{50}$) is measured at a concentration in which absorbance settles in an appropriate range, using a laser diffraction particle size analyzer (manufactured by Shimadzu Corporation, SALD-2000J).

Volume-Median Particle Size ($D_{50}$) of Toner

Measuring Apparatus: Coulter Multisizer II (manufactured by Beckman Coulter)
Aperture Diameter: 50 μm
Analyzing Software: Coulter Multisizer AccuComp Ver. 1.19 (manufactured by Beckman Coulter)
Electrolytic Solution: Isotone II (manufactured by Beckman Coulter)
Dispersion: A 5% electrolytic solution of EMULGEN 109P (manufactured by KAO Corporation, polyoxyethylene lauryl ether, HLB: 13.6).
Dispersion Conditions: Ten milligrams of a measurement sample is added to 5 ml of the above-mentioned dispersion, the mixture is dispersed for 1 minute with an ultrasonic disperser, and 25 ml of an electrolytic solution is added to the dispersion, and further dispersed with an ultrasonic disperser for 1 minute.
Measurement Conditions: The above-mentioned sample dispersion is added to 100 ml of the above-mentioned electrolytic solution in a beaker to adjust to a concentration at which particle sizes of 30,000 particles can be measured in 20 seconds, and thereafter the 30,000 particles are measured, and a volume-median particle size ($D_{50}$) is obtained from the particle size distribution.

Average Particle Size of External Additive

The average particle size refers to a number-average particle size, which is an average of particle sizes of 500 particles of the external additive, measured from a photograph taken with a scanning electron microscope (SEM). In a case where the particles have length and breath, it refers to the length.

Production Example of Alkylene Compound
Using a propylene tetramer manufactured by Nippon Oil Corporation (trade name: Light Tetramer), fractional distillation was carried out under the heating conditions of from 183° to 208° C., to provide an alkylene compound A. The resulting alkylene compound A had 40 peaks in gas chromatography mass spectroscopy. The distribution of the alkylene compound was as follows: C9: 0.5% by weight, C10: 4% by weight, C11: 20% by weight, C12: 66% by weight, C13:9% by weight, and C14: 0.5% by weight.

Production Example of Alkenylsuccinic Anhydride
A 1 L-autoclave manufactured by Nitto Kouatsu Co., Ltd. was charged with 542.4 g of the alkylene compound A, 157.2 g of maleic anhydride, 0.4 g of Chelex-O (manufactured by Sakai Chemical Co., Ltd.), 0.1 g of butylhydroquinone, pressurized nitrogen replacements (0.2 MPaG) were repeated 3 times. After starting to stir the contents at 60° C., the contents were heated over 1 hour up to 230° C., and subjected to a reaction for 6 hours. The pressure at the time of reaching the reaction temperature was 0.3 MPaG. After the termination of the reaction, the reaction mixture was cooled to 80° C., and allowed its pressure to return to a normal pressure (101.3 kPa), and transferred to a 1 L four-neck flask. The contents were heated to 180° C. while stirring, and the residual alkylene compound was distilled off at 1.3 kPa in 1 hour. Subsequently, the distillate was cooled to room temperature (25° C.), and allowed to return to a normal pressure (101.3 kPa), to provide 406.1 g of an intended product alkenylsuccinic anhydride A. The average molecular weight (Mw) of the alkenylsuccinic anhydride obtained from the acid value was 268. The alkenylsuccinic anhydride A used in the following Examples is obtained by the present production method.

Example 1

1.1 Production Example 1 of Resins

Examples A1 to A6, and Comparative Example A1

A 5-liter four-neck flask equipped with a nitrogen inlet tube, a dehydration tube equipped with a fractional distillation tube through which hot water at 100° C. was allowed to flow, a stirrer, and a thermocouple was charged with an alcohol component, a carboxylic acid component other than trimellitic anhydride, and an esterification catalyst, as listed in Table 1-1. The mixture was kept at 180° C. for 1 hour in a nitrogen atmosphere, and heated from 180° to 230° C. at a rate of 10° C./hour, and the heated mixture was then subjected to a polycondensation reaction at 230° C. for 10 hours, and further subjected to a reaction at 230° C. and 8.0 kPa for 1 hour. After cooling the reaction mixture to 210° C., trimellitic anhydride shown in Table 1-1 was supplied thereto, the mixture was subjected to a reaction at 210° C. for 2 hours, and subjected to a reaction at 210° C. and 10 kPa until a desired softening point was reached, to provide polyesters (Resins A-F, and H).
The purified rosin used in the production of Resin D was obtained from tall rosin in accordance with the following method.

1.2 Production Example of Purified Rosin

To a 2000-ml distillation flask equipped with a fractional distillation tube, a reflux condenser, and a receiver was added 1000 g of a tall rosin, the distillation was carried out under a reduced pressure of 1 kPa, and a fraction distilled at 195° to 250° C. as a main distillate fraction was collectel, to provide a purified rosin (molecular weight: 338).

1.3 Production Example 2 of Resin

Comparative Example 2

A 5-liter four-neck flask equipped with a nitrogen inlet tube, a dehydration tube, a stirrer and a thermocouple was charged with an alcohol component, a carboxylic acid component other than trimellitic anhydride, and an esterification catalyst, as listed in Table 1-1. The mixture was kept at 180° C. for 1 hour under a nitrogen atmosphere, and heated from 180° to 210° C. at a rate of 10° C./hour, and the heated mixture was then subjected to a polycondensation reaction at 210° C. for 2 hours, and further subjected to a reaction at 210° C. and 8.0 kPa for 1 hour. After cooling the reaction mixture to 205° C., trimellitic anhydride shown in Table 1-1 was supplied thereto, the mixture was subjected to a reaction at 205° C. for 1 hour, and subjected to a reaction at 205° C. and 10 kPa until a desired softening point was reached, to provide polyesters (Resin G).

sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a powder having a volume-median particle size ($D_{50}$) of 8.0 μm.

To 100 parts by weight of the resulting powder was added 1.0 part by weight of an external additive "Aerosil R-972" (manufactured by Nippon Aerosil Co., Ltd.), and the mixture was blended with a Henschel mixer, to provide each of the toners.

TABLE 1-1

| No. 1- | Ex. | | | | | | Comp. Ex. | |
|---|---|---|---|---|---|---|---|---|
| | A1 Resin A | A2 Resin B | A3 Resin C | A4 Resin D | A5 Resin E | A6 Resin H | A1 Resin F | A2 Resin G |
| Alcohol Component | | | | | | | | |
| 2,3-Butanediol (Alcohol A) | 811.1 g | 811.1 g | 228.8 g | 390.4 g | 1685.5 g | 1440.0 g | — | — |
| 2,4-Hexanediol (Alcohol A) | — | — | — | — | — | 472.0 g | — | — |
| 1,2-Propanediol | 684.9 g | 684.9 g | 1095.0 g | 770.3 g | — | — | — | — |
| 1,3-Propanediol | — | — | — | 260.2 g | — | — | — | — |
| Neopentyl Glycol | — | — | — | — | — | — | 855.6 g | — |
| Ethylene Glycol | — | — | — | — | — | — | 530.9 g | — |
| BPA-PO[1] | — | — | — | — | — | — | — | 3174.8 g |
| Glycerol | — | — | 92.0 g | — | — | — | — | — |
| Carboxylic Acid Component | | | | | | | | |
| Terephthalic Acid | 2092.9 g | 2092.9 g | 2182.0 g | 1476 g | 1552.7 g | 2656.0 g | 2620 g | — |
| Trimellitic Anhydride | 691.2 g | 691.2 g | 445.3 g | 426.8 g | 718.4 g | 576.0 g | 193.4 g | 142.4 g |
| Purified Rosin | — | — | — | 567.7 g | — | — | — | — |
| Itaconic Acid | — | — | — | 222.5 g | 243.4 g | — | — | — |
| Fumaric Acid | — | — | — | 86.7 g | — | — | — | 391.6 g |
| Esterification Catalyst | | | | | | | | |
| Tin(II) 2-Ethylhexanoate | 42.8 g | 42.8 g | — | — | — | 25.0 g | — | — |
| Dibutyltin Oxide | — | — | 8.4 g | — | 8.4 g | — | 8.4 g | 8.4 g |
| Tetra-n-butyl titanate | — | — | — | 25.2 g | — | — | — | — |
| Amount of Alcohol A Contained in Alcohol Component (% by mol) | 50.6 | 50.6 | 14.4 | 24.7 | 100 | 100 | 0 | 0 |
| Content of Tricarboxylic or Higher Polycarboxylic Acid Compound in Carboxylic Acid Component (% by mol) | 22.2 | 22.2 | 15.0 | 14.6 | 25.0 | 15.8 | 6.0 | 18.1 |
| Alcohol A/(Raw Material Monomers Other Than Alcohol A) × 100 (parts by weight) | 23.4 | 23.4 | 6 | 10.2 | 67.0 | 59.2 | 0 | 0 |
| Softening Point (° C.) | 128.4 | 100.2 | 138.4 | 99.2 | 118.0 | 116.4 | 99.3 | 122.2 |
| Glass Transition Temperature (° C.) | 79.8 | 61.1 | 69.4 | 53.2 | 73.6 | 65.8 | 53.1 | 63.6 |
| Acid Value (mgKOH/g) | 86.0 | 72.7 | 12.8 | 35.8 | 79.5 | 48.6 | 7.8 | 19.2 |
| Hydroxyl Value (mgKOH/g) | 53.7 | 40.8 | 34.6 | 34.9 | 56.1 | 40.2 | 49.2 | 32.8 |

[1] Polyoxypropylene(2.0)-2,2-bis(4-hydroxyphenyl)propane 1.4 Production Example of Toners Examples B1 to B5 and Comparative Examples B1 and B2

One hundred parts by weight of a resin binder as shown in Table 1-2, 4 parts by weight of a carbon black "MOGUL L" (manufactured by Cabot Corporation), 1 part by weight of a negatively chargeable charge control agent "BONTRON S-34" (manufactured by Orient Chemical Co., Ltd.), 1 part by weight of a polypropylene wax "NP-105" (manufactured by MITSUI CHEMICALS, INC.), and 1 part by weight of a paraffin wax "HNP-9" (manufactured by Nippon Seiro) were 1.5 Test Example 1

Low-Temperature Fixing Ability

The resulting toner was loaded on a copy machine "AR-505" (commercially available from Sharp Corporation), of which fixing device was modified so that fixing can be carried out outside the machine to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) of which total fixing pressure was adjusted to 40 kgf. "UNICEF Cellophane" tape (MITSUBISHI PENCIL CO., LTD., width: 18 mm, JIS Z-1522) was adhered to the fixed images, the resulting fixed images were allowed to pass through a fixing roller set at 30°

C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape×100) initially exceeds 90% is defined as the lowest fixing temperature. The low-temperature fixing ability was evaluated according to the following evaluation criteria. The results are shown in Table 1-2. Here, the paper used in the fixing test was CopyBond SF-70NA (75 g/m²), manufactured by Sharp Corporation.

Evaluation Criteria

A: Lowest fixing temperature being lower than 150° C.;
B: Lowest fixing temperature being 150° C. or higher and lower than 170° C.; and
C: Lowest fixing temperature being 170° C. or higher.

1.6 Test Example 2

Storage Ability

A 20-ml vessel (diameter: about 3 cm) was charged with 4 g of a toner, and allowed to stand for 72 hours under environmental conditions of a temperature of 55° C. and humidity of 60%. After allowing it to stand, the extent of generation of toner aggregation was visually observed, and the storage ability was evaluated in accordance with the standard criteria. The results are shown in Table 1-2.

Evaluation Criteria

A: The aggregation is not found at all even after 48 hours and after 72 hours.
B: Although the aggregation is not found after 48 hours, the aggregation is slightly found after 72 hours.
C: Although the aggregation is not found after 48 hours, the aggregation is evidently found after 72 hours.
D: The aggregation is found within 48 hours.

TABLE 1-2

| No. 1- | Resin Binder (Parts by Weight) | Low-Temp. Fixing Ability | Storage Ability |
|---|---|---|---|
| Ex. B1 | Resin A/Resin B (50/50) | A | A |
| Ex. B2 | Resin C/Resin D (50/50) | A | B |
| Ex. B3 | Resin E | B | A |
| Ex. B4 | Resin A/Resin F (50/50) | A | B |
| Ex. B5 | Resin H | B | B |
| Comp. Ex. B1 | Resin G | C | A |
| Comp. Ex. B2 | Resin F | A | D |

* Inside the parenthesis shows a weight ratio of the resins.

It can be seen from the above results that the toners of Examples 1-B1 to 1-B5 containing a polyester in which an aliphatic polyhydric alcohol having two or more secondary carbon atoms bound to hydroxyl groups is used in a proper amount have excellent storage ability and low-temperature fixing ability, as compared to those of the toners of Comparative Examples 1-B1 and 1-B2.

Example 2

2.1 Production Example 1 of Resins

Resins A to G, and I

A 5-liter four-neck flask equipped with a thermometer, a stainless steel stirring rod, a reflux condenser, and a nitrogen inlet tube was charged with raw material monomers other than trimellitic anhydride and an esterification catalyst, as listed in Table 2-1 or 2-2, and the contents were heated in a mantle heater to 180° C. in a nitrogen atmosphere, and thereafter heated to 230° C. over 10 hours. Thereafter, having confirmed that a conversion rate at 230° C. reached 95% or higher, the reaction mixture was cooled to 210° C., and trimellitic anhydride shown in Table 2-1 or 2-2 was supplied thereto. The mixture was subjected to a reaction at a normal pressure for 1 hour, and subjected to a reaction at 40 kPa until a desired softening point was reached, to provide a polyester. Here, the conversion rate as used herein means a value defined by a value calculated by:

[amount of generated water in reaction/theoretical amount of generated water]×100.

2.2 Production Example 2 of Resin

Resin H

A 5-liter four-neck flask equipped with a thermometer, a stainless steel stirring rod, a reflux condenser, and a nitrogen inlet tube was charged with raw material monomers other than trimellitic anhydride and an esterification catalyst, as listed in Table 2-2, and the contents were heated in a mantle heater to 235° C. in a nitrogen atmosphere, and thereafter subjected to a reaction at 235° C. for 10 hours. Thereafter, the contents were subjected to a reaction at 235° C. and 8 kPa for 1 hour, then cooled to 210° C., and trimellitic anhydride shown in Table 2-2 was supplied thereto. The mixture was subjected to a reaction at a normal pressure for 1 hour, and subjected to a reaction at 40 kPa until a desired softening point was reached, to provide a polyester.

TABLE 2-1

| | Resin A Amount Used | | Resin B Amount Used | | Resin C Amount Used | | Resin D Amount Used | | Resin E Amount Used | | Resin F Amount Used | |
|---|---|---|---|---|---|---|---|---|---|---|---|---|
| | g | mol | g | mol | g | mol | g | mol | g | mol | g | mol |
| Raw Material Monomers | | | | | | | | | | | | |
| Alcohol Component | | | | | | | | | | | | |
| 2,3-Butanediol | 900 | 10 | 1800 | 20 | 900 | 10 | 900 | 10 | 900 | 10 | 900 | 10 |
| 1,2-Propanediol | 761 | 10 | — | — | 761 | 10 | 761 | 10 | 761 | 10 | 761 | 10 |
| Carboxylic Acid Component | | | | | | | | | | | | |
| Alkenylsuccinic Anhydride (ASAN) | 1072 | 4 | 1072 | 4 | 1072 | 4 | 1072 | 4 | 268 | 1 | 2144 | 8 |
| Terephthalic Acid | 1992 | 12 | 1992 | 12 | 2324 | 14 | 1992 | 12 | 2490 | 15 | 1328 | 8 |
| Trimellitic Anhydride | 576 | 3 | 576 | 3 | 384 | 2 | 576 | 3 | 576 | 3 | 576 | 3 |
| Esterification Catalyst | | | | | | | | | | | | |
| Dibutyltin Oxide | — | — | — | — | — | — | — | — | 25.0 | — | — | — |
| Tin(II) 2-Ethylhexanoate | 26.5 | — | 27.2 | — | 27.2 | — | — | — | — | — | 28.5 | — |
| Titanium Compound[1] | — | — | — | — | — | — | 26.5 | — | — | — | — | — |
| Total Amount of Raw Material Monomers (g) | 5301 | | 5440 | | 5441 | | 5301 | | 4995 | | 5709 | |
| Amount of Alcohol A Contained in Alcohol Component (% by mol) | 50.0 | | 100.0 | | 50.0 | | 50.0 | | 50.0 | | 50.0 | |
| Amount of ASAN Contained in Carboxylic Acid Component (% by mol) | 21.1 | | 21.1 | | 20.0 | | 21.1 | | 5.3 | | 42.1 | |
| Alcohol A/(Raw Material Monomers Other Than Alcohol A) × 100 (parts by weight) | 20.4 | | 49.5 | | 19.8 | | 20.4 | | 22.0 | | 18.7 | |
| Softening Point (° C.) | 120.5 | | 119.6 | | 102.4 | | 148.6 | | 123.2 | | 124.1 | |
| Glass Transition Temperature (° C.) | 58.7 | | 64.2 | | 54.1 | | 59.1 | | 61.2 | | 52.9 | |
| Acid Value (mgKOH/g) | 25.3 | | 30.4 | | 24.6 | | 18.4 | | 28.4 | | 18.4 | |

[1] Titanium Diisopropylate bis(Triethanolaminate)

TABLE 2-2

| | Resin G Amount Used | | Resin H Amount Used | | Resin I Amount Used | |
|---|---|---|---|---|---|---|
| | g | mol | g | mol | g | mol |
| Raw Material Monomers | | | | | | |
| Alcohol Component | | | | | | |
| Ethylene Glycol | 620 | 10 | — | — | 620 | 10 |
| Neopentyl Glycol | 1040 | 10 | — | — | 1040 | 10 |
| BPA-PO[1] | — | — | 1750 | 5 | — | — |
| BPA-EO[2] | — | — | 1625 | 5 | — | — |
| Carboxylic Acid Component | | | | | | |
| Alkenylsuccinic Anhydride A (ASAN) | 1072 | 4 | 536 | 2 | — | — |
| Terephthalic Acid | 1992 | 12 | 996 | 6 | 2324 | 14 |
| Trimellitic Anhydride | 576 | 3 | 288 | 1.5 | 960 | 5 |
| Esterification Catalyst | | | | | | |
| Tin(II) 2-Ethylhexanoate | 26.5 | — | 26.0 | — | 24.7 | — |
| Total Amount of Raw Material Monomers (g) | 5300 | | 5195 | | 4944 | |
| Amount of ASAN Contained in Carboxylic Acid Component (% by mol) | 21.1 | | 21.1 | | 0.0 | |
| Softening Point (° C.) | 115.4 | | 118.9 | | 116.2 | |
| Glass Transition Temperature (° C.) | 48.6 | | 58.4 | | 53.1 | |
| Acid Value (mgKOH/g) | 30.1 | | 23.4 | | 32.1 | |

[1] Polyoxypropylene(2.2)-2,2-bis(4-hydroxyphenyl)propane
[2] Polyoxyethylene(2.2)-2,2-bis(4-hydroxyphenyl)propane 2.3 Examples 1 to 9 and Comparative Examples 1 to 3

One hundred parts by weight of a resin binder as shown in Table 2-3, 6 parts by weight of a cyan pigment "Toner Cyan BG" (manufactured by Clariant GmbH, C. I. Pigment 15:3), 1 part by weight of a negatively chargeable charge control agent "BONTRON S-34" (manufactured by Orient Chemical Co., Ltd.), and 2 parts by weight of a releasing agent "HNP-9" (manufactured by Nippon Seiro, melting point: 75° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a toner particle having a volume-median particle size ($D_{50}$) shown in Table 2-3.

To 100 parts by weight of the resulting toner particle was added 1.0 part by weight of an external additive "Aerosil R-972" (manufactured by Nippon Aerosil Co., Ltd.), and the mixture was blended with a Henschel mixer, to provide each of the toners.

2.4 Example 10

The same procedures as in Example 1 were carried out except that 4 parts by weight of carbon black "MOGUL L" (manufactured by Cabot Corporation) was used in place of the cyan pigment as the colorant, to provide a toner.

2.5 Test Example 1

Low-Temperature Fixing Ability

The same procedures as in Test Example 1 of Item 1.5 were carried out in both the test method and the evaluation criteria to evaluate low-temperature fixing ability. The results are shown in Table 2-3.

2.6 Test Example 2

Storage Ability

The same procedures as in Test Example 2 of Item 1.6 were carried out in both the test method and the evaluation criteria to evaluate storage ability. The results are shown in Table 2-3.

2.7 Test Example 3

Optical Density under High-Temperature, High-Humidity Conditions

A toner was loaded to a nonmagnetic monocomponent developer device "PAGEPRESTO N-4" (manufactured by CASIO COMPUTER CO., LTD.) provided with a stainless steel developer roller, and 500 sheets of images were continuously printed under the environmental conditions of a temperature of 40° C. and relative humidity of 90%. Optical densities for images printed at 50th sheet and at 500th sheet were measured with a transmission Macbeth densitometer "TR-927," and a ratio of the optical densities between 50th sheet and 500th sheet, i.e. the value of optical density at 500th sheet/the value of optical density of 50th sheet), was calculated, and optical density under high-temperature, high-humidity conditions was evaluated in accordance with the following evaluation criteria. The results are shown in Table 2-3.

Evaluation Criteria

A: The ratio of optical densities is 0.90 or more.
B: The ratio of optical densities is 0.70 or more and less than 0.90.
C: The ratio of optical densities is less than 0.70.

TABLE 2-3

|  |  |  | Evaluation of Toner | | |
|---|---|---|---|---|---|
| No. 2- | Resin Binder* | $D_{50}$ | Low-Temp. Fixing Ability | Storage Ability | Optical Density Under High-Temp., High-Humidity Conditions |
| Ex. 1 | Resin A | 6.8 | A | A | A |
| Ex. 2 | Resin B | 6.6 | B | A | A |
| Ex. 3 | Resin C/Resin D (50/50) | 6.7 | A | B | A |
| Ex. 4 | Resin E | 6.8 | A | A | B |
| Ex. 5 | Resin F | 7.1 | A | B | A |
| Ex. 6 | Resin C/Resin I (50/50) | 6.9 | A | B | B |
| Ex. 7 | Resin C/Resin H (50/50) | 7.1 | B | B | B |
| Ex. 8 | Resin C | 6.5 | A | B | A |
| Ex. 9 | Resin D | 7.1 | B | A | A |
| Ex. 10 | Resin A | 6.8 | A | A | A |
| Comp. Ex. 1 | Resin G | 6.8 | A | D | B |
| Comp. Ex. 2 | Resin H | 6.7 | C | B | A |
| Comp. Ex. 3 | Resin I | 6.7 | A | D | C |

*Inside the parenthesis shows a weight ratio of the resins.

It can be seen from the above results that as compared to the toners of Examples 2-1 to 2-10, the toner of Comparative Example 2-1 containing a resin binder in which an aliphatic polyhydric alcohol other than the alcohol A is used is deficient in storage ability, even while having favorable low-temperature fixing ability, and that the toner of Comparative Example 2-2 containing a resin binder in which an aromatic polyhydric alcohol is used is deficient in low-temperature fixing ability, even while having favorable storage ability. Also, it can be seen that the toner of Comparative Example 2-3 containing a resin binder in which both the alcohol A or the succinic acid derivative is not used is deficient in storage ability and has a markedly lowered optical density under high-temperature, high humidity conditions.

Example 3

3.1 Production Example 1 of Resins

Resins A to D, F to H, and K

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and an esterification catalyst, as listed in Tables 3-1 to 3-3. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours, and further subjected to a reaction at 230° C. and 8.0 kPa for 1 hour. After cooling the reaction mixture to 160° C., a mixture of acrylic acid (a dually reactive monomer), raw material monomers for a styrenic resin and a polymerization initiator shown in Tables 3-1 to 3-3 was added dropwise thereto with a dropping funnel over 1 hour. After the dropwise addition, the addition polymerization reaction was matured for 1 hour, while keeping the mixture at 160° C. Thereafter, the mixture was heated to 210° C., trimellitic anhydride shown in Tables 3-1 to 3-3 was then supplied thereto, and the mixture was subjected to a reaction at 210° C. for 2 hours, and subjected to a reaction at 210° C. and 10 kPa until a desired softening point was reached, to provide a hybrid resin.

3.2 Production Example 2 of Resin

Resin E

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and fumaric acid and an esterification catalyst, as listed in Table 3-1, and the mixture was heated to 160° C. in a nitrogen atmosphere. Thereafter, a mixture of acrylic acid (a dually reactive monomer), raw material monomers for a vinyl resin and a polymerization initiator shown in Table 3-1 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. After cooling to 180° C., fumaric acid shown in Table 3-1 was supplied thereto, the mixture was heated from 180° C. to 210° C. at a rate of 10° C./hr, and thereafter subjected to a polycondensation reaction for 3 hours. Further, trimellitic anhydride shown in Table 3-1 was supplied thereto, and the mixture was subjected to a reaction at 210° C. for 2 hours, and subjected to a reaction at 210° C. and 10 kPa until a desired softening point was reached, to provide a hybrid resin.

3.3 Production Example 3 of Resins

Resins I, J, and L

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and an esterification catalyst, as listed in Table 3-2 or 3-3. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours. Further, trimellitic anhydride shown in Table 3-2 or 3-3 was supplied thereto, and the mixture was subjected to a reaction at 210° C., and subjected to a reaction at 10 kPa until a desired softening point was reached, to provide a polyester.

3.4 Production Example 4 of Resin

Resin M

A 5-liter four neck flask equipped with a dehydration tube equipped with a nitrogen inlet tube, a stirrer, and a thermocouple was charged with raw material monomers for a polyester other than trimellitic anhydride and an esterification catalyst, as listed in Table 3-3. The mixture was subjected to a polycondensation reaction at 230° C. for 10 hours in a nitrogen atmosphere, and further subjected to a reaction at 230° C. and 8.0 kPa for 1 hour. Further, trimellitic anhydride shown in Table 3-3 was supplied thereto, and the mixture was subjected to a reaction at 210° C., and subjected to a reaction at 10 kPa until a desired softening point was reached, to provide a polyester.

TABLE 3-1

| | Resin A Amount Used | | Resin B Amount Used | | Resin C Amount Used | | Resin D Amount Used | | Resin E Amount Used | |
|---|---|---|---|---|---|---|---|---|---|---|
| | g | mol | g | mol | g | mol | g | mol | g | mol |
| Raw Material Monomers for Polyester (PES) Alcohol Component | | | | | | | | | | |
| 2,3-Butanediol | 720 | 8 | 720 | 8 | 720 | 8 | 1440 | 16 | 720 | 8 |
| 1,2-Propanediol | 608 | 8 | 608 | 8 | 608 | 8 | — | — | 608 | 8 |
| Carboxylic Acid Component | | | | | | | | | | |
| Fumaric Acid | — | — | — | — | — | — | — | — | 278 | 2.4 |
| Terephthalic Acid | 1859 | 11.2 | 1859 | 11.2 | 1859 | 11.2 | 1859 | 11.2 | 1461 | 8.8 |
| Trimellitic Anhydride | 461 | 2.4 | 461 | 2.4 | 461 | 2.4 | 461 | 2.4 | 461 | 2.4 |
| Esterification Catalyst | | | | | | | | | | |
| Tin(II) 2-Ethylhexanoate | 18.5 | — | 18.5 | — | 18.5 | — | 18.0 | — | 17.9 | — |
| Dually Reactive Monomer | | | | | | | | | | |
| Acrylic Acid | 60 | 0.96 | 60 | 0.96 | 60 | 0.96 | 60 | 0.96 | 60 | 0.96 |
| Raw Material Monomers for Styrenic Resin (St) | | | | | | | | | | |
| Styrene | 779 | — | 779 | — | 779 | — | 755 | — | 753 | — |
| 2-Ethylhexyl Acrylate | 148 | — | 148 | — | 148 | — | 144 | — | 144 | — |
| Polymerization Initiator | | | | | | | | | | |
| Dibutyl Peroxide | 37 | — | 37 | — | 37 | — | 36 | — | 36 | — |
| Amount of Alcohol A Contained in Alcohol Component (% by mol) | 50 | | 50 | | 50 | | 100 | | 50 | |
| Alcohol A/(Raw Material Monomers Other Than Alcohol A) × 100 (parts by weight) | 24.1 | | 24.1 | | 24.1 | | 60.5 | | 25.1 | |
| Total Amount of PES/Total Amount of St (weight ratio) | 4 | | 4 | | 4 | | 4 | | 4 | |
| Softening Point (° C.) | 139.5 | | 120.3 | | 99.1 | | 136.8 | | 134.8 | |
| Glass Transition Temperature (° C.) | 66.5 | | 63.3 | | 60.2 | | 71.3 | | 63.1 | |
| Acid Value (mgKOH/g) | 33.0 | | 49.3 | | 56.2 | | 30.2 | | 54.1 | |

TABLE 3-2

|  | Resin F Amount Used | | Resin G Amount Used | | Resin H Amount Used | | Resin I Amount Used | | Resin J Amount Used | |
| --- | --- | --- | --- | --- | --- | --- | --- | --- | --- | --- |
|  | g | mol | g | mol | g | mol | g | mol | g | mol |
| Raw Material Monomers for Polyester (PES) Alcohol Component | | | | | | | | | | |
| 2,3-Butanediol | 720 | 8 | 810 | 9 | 540 | 6 | 900 | 10 | 900 | 10 |
| 1,2-Propanediol | 608 | 8 | 684 | 9 | 456 | 6 | 760 | 10 | 760 | 10 |
| Carboxylic Acid Component | | | | | | | | | | |
| Alkenylsuccinic Anhydride A | 281 | 1.05 | — | — | — | — | — | — | — | — |
| Terephthalic Acid | 1461 | 8.8 | 2092 | 12.6 | 1394 | 8.4 | 2324 | 14 | 2324 | 14 |
| Trimellitic Anhydride | 461 | 2.4 | 518 | 2.7 | 346 | 1.8 | 576 | 3 | 576 | 3 |
| Esterification Catalyst | | | | | | | | | | |
| Tin(II) 2-Ethylhexanoate | 18.0 | — | 20.9 | — | — | — | 22.8 | — | 22.8 | — |
| Titanium Compound[1)] | — | — | — | — | 13.5 | — | — | — | — | — |
| Dually Reactive Monomer | | | | | | | | | | |
| Acrylic Acid | 60 | 0.96 | 67 | 1.08 | 45 | 0.72 | — | — | — | — |
| Raw Material Monomers for Styrenic Resin (St) | | | | | | | | | | |
| Styrene | 754 | — | 377 | — | 1507 | — | — | — | — | — |
| 2-Ethylhexyl Acrylate | 144 | — | 72 | — | 287 | — | — | — | — | — |
| Polymerization Initiator | | | | | | | | | | |
| Dibutyl Peroxide | 36 | — | 18 | — | 72 | — | — | — | — | — |
| Amount of 2,3-BD Contained in Alcohol Component (% by mol) | 50 | | 50 | | 50 | | 50 | | 50 | |
| Alcohol A/(Raw Material Monomers Other Than Alcohol A) × 100 (parts by weight) | 25.1 | | 24.1 | | 24.1 | | 24.6 | | 24.6 | |
| Total Amount of PES/Total Amount of St (weight ratio) | 4 | | 9 | | 1.5 | | 0 | | 0 | |
| Softening Point (° C.) | 136.1 | | 138.3 | | 137.3 | | 140.5 | | 97.5 | |
| Glass Transition Temperature (° C.) | 61.9 | | 68.3 | | 62.6 | | 75.0 | | 59.6 | |
| Acid Value (mgKOH/g) | 48.5 | | 38.2 | | 30.1 | | 32.4 | | 56.1 | |

[1)]Titanium Diisopropylate bis(Triethanolaminate)

TABLE 3-3

|  | Resin K Amount Used | | Resin L Amount Used | | Resin M Amount Used | |
| --- | --- | --- | --- | --- | --- | --- |
|  | g | mol | g | mol | g | mol |
| Raw Material Monomers for Polyester (PES) Alcohol Component | | | | | | |
| Ethylene Glycol | 595 | 9.6 | 893 | 14.4 | — | — |
| Neopentyl Glycol | 666 | 6.4 | 998 | 9.6 | — | — |
| BPA-PO[1)] | — | — | — | — | 2450 | 7 |
| BPA-EO[2)] | — | — | — | — | 975 | 3 |
| Carboxylic Acid Component | | | | | | |
| Terephthalic Acid | 1726 | 10.4 | 2590 | 15.6 | 1079 | 6.5 |
| Trimellitic Anhydride | 614 | 3.2 | 922 | 4.8 | 384 | 2 |
| Esterification Catalyst | | | | | | |
| Tin(II) 2-Ethylhexanoate | 18.1 | — | 27.0 | — | 24.4 | — |
| Dually Reactive Monomer | | | | | | |
| Acrylic Acid | 26 | 0.42 | — | — | — | — |
| Raw Material Monomers for Styrenic Resin (St) | | | | | | |
| Styrene | 762 | — | — | — | — | — |
| 2-Ethylhexyl Acrylate | 145 | — | — | — | — | — |
| Polymerization Initiator | | | | | | |
| Dibutyl Peroxide | 36 | — | — | — | — | — |
| Total Amount of PES/Total Amount of St (weight ratio) | 4 | | 0 | | 0 | |
| Softening Point (° C.) | 123.1 | | 122.5 | | 119.6 | |
| Glass Transition Temperature (° C.) | 57.5 | | 59.4 | | 62.1 | |
| Acid Value (mgKOH/g) | 43.2 | | 41.0 | | 24.6 | |

[1)]Polyoxypropylene(2.2)-2,2-bis(4-hydroxyphenyl)propane
[2)]Polyoxyethylene(2.2)-2,2-bis(4-hydroxyphenyl)propane

3.5 Examples 1 to 11 and Comparative Examples 1 to 3

One hundred parts by weight of a resin binder as shown in Table 3-4, 4 parts by weight of a carbon black "MOGUL L" (manufactured by Cabot Corporation), 1 part by weight of a negatively chargeable charge control agent "BONTRON S-34" (manufactured by Orient Chemical Co., Ltd.), and 2 part by weight of a polypropylene wax "NP-105" (manufactured by MITSUI CHEMICALS, INC.: melting point 140° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a toner particle having a volume-median particle size ($D_{50}$) of 8.0 μM.

To 100 parts by weight of the resulting toner particle was added 1.0 part by weight of an external additive "Aerosil R-972" (manufactured by Nippon Aerosil Co., Ltd.), and the mixture was blended with a Henschel mixer, to provide each of the toners.

3.6 Test Example 1

Low-Temperature Fixing Ability

The same procedures as in Test Example 1 of Item 1.5 were carried out in both the test method and the evaluation criteria to evaluate low-temperature fixing ability. The results are shown in Table 3-4.

3.7 Test Example 2

Storage Ability

The same procedures as in Test Example 2 of Item 1.6 were carried out in both the test method and the evaluation criteria to evaluate storage ability. The results are shown in Table 3-4.

3.8 Test Example 3

Triboelectric Stability under High-Temperature, High-Humidity Conditions

A 50 ml polyethylene bottle was charged with 0.6 g of a toner and 19.4 g of a silicone ferrite carrier (manufactured by Kanto Denka Kogyo, average particle size: 90 μm) at a temperature of 32° C. and relative humidity of 85%, and the contents were mixed with a ball-mill at a rate of 250 r/min, and triboelectric charges of the toner were determined with a Q/M meter (manufactured by EPPING).

After a given period of mixing time, a mixture of a toner and a carrier in defined amounts was supplied into a cell provided in the Q/M meter, and only the toner was aspirated for 90 seconds through a sieve having a sieve opening of 32 μm (made of stainless steel, twilled, wire diameter: 0.0035 mm). The voltage change generated on the carrier at this time was monitored and the value of [Total Electric Charges (μC) After 90 Seconds/Weight (g) of Toner Aspirated] was obtained as triboelectric charges (μC/g). A ratio of triboelectric charges after a 60-second mixing time to triboelectric charges after a 600-second mixing time, i.e. triboelectric charges after 60-second mixing time/triboelectric charges after 600-second mixing time, were calculated, and triboelectric stability was evaluated in accordance with the following criteria. The results are shown in Table 3-4.

Evaluation Criteria

A: 0.8 or more

B: 0.6 or more and less than 0.8

C: less than 0.6

TABLE 3-4

| | | Evaluation of Toner | | |
|---|---|---|---|---|
| No. 3- | Resin Binder* | Low-Temp. Fixing Ability | Storage Ability | Triboelectric Stability Under High-Temperature, High-Humidity Conditions |
| Ex. 1 | Resin A/Resin C (50/50) | A | A | A |
| Ex. 2 | Resin B | B | A | A |
| Ex. 3 | Resin D/Resin C (50/50) | A | A | A |
| Ex. 4 | Resin E/Resin C (50/50) | A | B | A |
| Ex. 5 | Resin F/Resin C (50/50) | A | B | A |
| Ex. 6 | Resin G/Resin C (50/50) | A | A | B |
| Ex. 7 | Resin H/Resin C (50/50) | A | B | A |
| Ex. 8 | Resin I/Resin C (50/50) | A | A | B |
| Ex. 9 | Resin A/Resin J (50/50) | A | B | B |
| Ex. 10 | Resin A | B | A | A |
| Ex. 11 | Resin C | A | B | A |
| Comp. Ex. 1 | Resin K | A | D | B |
| Comp. Ex. 2 | Resin L | A | D | C |
| Comp. Ex. 3 | Resin M | C | B | C |

*Inside the parenthesis shows a weight ratio of the resins.

It can be seen from the above results that as compared to the toners of Examples 3-1 to 3-11, the toner of Comparative Example 3-1 containing a resin binder in which an aliphatic polyhydric alcohol other than the alcohol A is used is deficient in storage ability, even while having favorable low-temperature fixing ability, and that the toner of Comparative Example 3-2 containing as a resin binder only a polycondensation resin in which an aliphatic polyhydric alcohol other than the alcohol A is used is deficient in storage ability and triboelectric stability under high-temperature, high humidity conditions, even while having favorable low-temperature fixing ability. Also, it can be seen that the toner of Comparative Example 3-3 containing as a resin binder only a polycondensation resin in which an aromatic polyhydric alcohol is used is deficient in all of low-temperature fixing ability, storage ability and triboelectric stability under high-temperature, high humidity conditions.

Example 4

4.1 Production Example 1 of Crystalline Polyesters

Resins A, B, and D to F

A 5-liter four-neck flask equipped with a nitrogen inlet tube, a dehydration tube, a stirrer, and a thermocouple was charged with raw material monomers other than trimellitic anhydride, an esterification catalyst and a polymerization inhibitor, as listed in Table 4-1. The mixture was subjected to a reaction at 160° C. over 5 hours, and thereafter heated to 200° C. Further, trimellitic anhydride shown in Table 4-1 was supplied thereto, and the mixture was subjected to a reaction for 20 minutes, to provide a crystalline polyester.

4.2 Production Example 2 of Crystalline Polyester

Resin C

A 5-liter four-neck flask equipped with a nitrogen inlet tube, a dehydration tube, a stirrer, and a thermocouple was charged with raw material monomers other than trimellitic anhydride and an esterification catalyst, as listed in Table 4-1. The mixture was subjected to a reaction at 180° C. over 5 hours, and thereafter heated to 200° C. Further, trimellitic anhydride shown in Table 4-1 was supplied thereto, and the mixture was subjected to a reaction at the same temperature for 20 minutes, to provide a crystalline polyester.

4.3 Production Example 1 of Amorphous Polyesters

Resins G and H

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride and an esterification catalyst, as listed in Table 4-2. The mixture was kept at 180° C. for 1 hour in a nitrogen atmosphere, heated at from 180° C. to 230° C. at a rate of 10° C./hr, and thereafter subjected to a polycondensation reaction at 230° C. for 10 hours. Further, trimellitic anhydride shown in Table 4-2 was supplied thereto, and the mixture was subjected to a reaction at the same temperature and 10 kPa until a desired softening point was reached, to provide an amorphous polyester.

4.4 Production Example 2 of Amorphous Polyester

Resin I

A 5-liter four-neck flask equipped with a nitrogen inlet tube, a dehydration tube, a stirrer, and a thermocouple was charged with raw material monomers other than trimellitic anhydride, an esterification catalyst, and a polymerization inhibitor, as listed in Table 4-2. The mixture was subjected to a reaction at 180° C. over 5 hours, and thereafter heated to 210° C. at a rate of 10° C./hr. Thereafter, the mixture was subjected to a reaction at 8.3 kPa for 1 hour. Further, trimellitic anhydride shown in Table 4-2 was supplied thereto, and the mixture was subjected to a reaction at the same temperature and 10 kPa until a desired softening point was reached, to provide an amorphous polyester.

TABLE 4-1

| Crystalline Polyester | Resin A Amount Used | | Resin B Amount Used | | Resin C Amount Used | | Resin D Amount Used | | Resin E Amount Used | | Resin F Amount Used | |
|---|---|---|---|---|---|---|---|---|---|---|---|---|
|  | g | mol | g | mol | g | mol | g | mol | g | mol | g | mol |
| Raw Material Monomers |  |  |  |  |  |  |  |  |  |  |  |  |
| Alcohol Component |  |  |  |  |  |  |  |  |  |  |  |  |
| 2,3-Butanediol | 180 | 2 | 540 | 6 | 144 | 1.6 | 180 | 2 | 180 | 2 | — | — |
| 1,6-Hexanediol | 2124 | 18 | 1652 | 14 | 1699 | 14.4 | 2124 | 18 | 2124 | 18 | 2360 | 20 |
| Carboxylic Acid Component |  |  |  |  |  |  |  |  |  |  |  |  |
| Fumaric Acid | 2088 | 18 | 2088 | 18 | — | — | 1972 | 17 | 2320 | 20 | 1670 | 14.4 |
| Alkenylsuccinic Anhydride A | — | — | — | — | — | — | 268 | 1 | — | — | — | — |
| Terephthalic Acid | — | — | — | — | 2390 | 14.4 | — | — | — | — | — | — |
| Trimellitic Anhydride | 192 | 1 | 192 | 1 | 154 | 0.8 | 192 | 1 | — | — | 192 | 1 |
| Esterification Catalyst |  |  |  |  |  |  |  |  |  |  |  |  |
| Tin(II) 2-Ethylhexanoate | 22.9 | — | 22.4 | — | 21.9 | — | 23.7 | — | 23.1 | — | 21.1 | — |
| Polymerization Inhibitor |  |  |  |  |  |  |  |  |  |  |  |  |
| tert-Butyl Catechol | 2.3 | — | 2.2 | — | — | — | 2.4 | — | 2.3 | — | 2.1 | — |
| Total Amount of Raw Material Monomers (g) | 4584 |  | 4472 |  | 4387 |  | 4736 |  | 4624 |  | 4222 |  |
| Amount of Alcohol A Contained in Alcohol Component (% by mol) | 10 |  | 30 |  | 10 |  | 10 |  | 10 |  | 0 |  |
| Alcohol A/(Raw Material Monomers Other Than Alcohol A) × 100 (parts by weight) | 4.1 |  | 13.7 |  | 3.4 |  | 4.0 |  | 4.1 |  | 0 |  |
| Softening Point (° C.) | 117.2 |  | 115.4 |  | 125.2 |  | 112.5 |  | 117.5 |  | 111.6 |  |
| Temperature of Maximum Endothermic Peak (° C.) | 104.3 |  | 99.6 |  | 135.2 |  | 100.5 |  | 111.2 |  | 113.5 |  |
| Softening Point/Temperature of Maximum Endothermic Peak | 1.12 |  | 1.16 |  | 0.93 |  | 1.12 |  | 1.06 |  | 0.98 |  |

TABLE 4-2

| Amorphous Polyester | Resin G Amount Used | | Resin H Amount Used | | Resin I Amount Used | |
|---|---|---|---|---|---|---|
| | g | mol | g | mol | g | mol |
| Raw Material Monomers | | | | | | |
| Alcohol Component | | | | | | |
| 2,3-Butanediol | 1800 | 20 | — | — | — | — |
| Ethylene Glycol | — | — | 744 | 12 | — | — |
| Neopentyl Glycol | — | — | 832 | 8 | — | — |
| BPA-PO[1)] | — | — | — | — | 2450 | 7 |
| BPA-EO[2)] | — | — | — | — | 975 | 3 |
| Carboxylic Acid Component | | | | | | |
| Fumaric Acid | — | — | — | — | 870 | 7.5 |
| Terephthalic Acid | 2158 | 13 | 2158 | 13 | — | — |
| Trimellitic Anhydride | 768 | 4 | 768 | 4 | 480 | 2.5 |
| Esterification Catalyst | | | | | | |
| Tin(II) 2-Ethylhexanoate | 23.6 | — | 22.5 | — | 23.9 | — |
| Polymerization Inhibitor | | | | | | |
| tert-Butyl Catechol | — | — | — | — | 2.4 | — |
| Total Amount of Raw Material Monomers (g) | 4726 | | 4502 | | 4775 | |
| Amount of Alcohol A Contained in Alcohol Component (% by mol) | 100 | | 0 | | 0 | |
| Alcohol A/(Raw Material Monomers Other Than Alcohol A) × 100 (parts by weight) | 61.5 | | 0 | | 0 | |
| Softening Point (° C.) | 136.1 | | 138.6 | | 140 | |
| Temperature of Maximum Endothermic Peak (° C.) | 38.4 | | 35.7 | | 28.7 | |
| Softening Point/Temperature of Maximum Endothermic Peak | 3.54 | | 3.88 | | 4.88 | |
| Glass Transition Temperature (° C.) | 73.5 | | 63.2 | | 62.1 | |
| Acid Value (mgKOH/g) | 32.4 | | 43.2 | | 24.6 | |

[1)]Polyoxypropylene(2.2)-2,2-bis(4-hydroxyphenyl)propane
[2)]Polyoxyethylene(2.2)-2,2-bis(4-hydroxyphenyl)propane

4.5 Examples 1 to 8 and Comparative Examples 1 and 2

One hundred parts by weight of a resin binder as shown in Table 4-3, 4 parts by weight of a carbon black "MOGUL L" (manufactured by Cabot Corporation), 1 part by weight of a negatively chargeable charge control agent "BONTRON S-34" (manufactured by Orient Chemical Co., Ltd.), and 2 parts by weight of a polypropylene wax "NP-105" (manufactured by MITSUI CHEMICALS, INC., melting point: 140° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a toner particle having a volume-median particle size ($D_{50}$) of 8.0 μm.

To 100 parts by weight of the resulting toner particle was added 1.0 part by weight of an external additive "Aerosil R-972" (manufactured by Nippon Aerosil Co., Ltd.), and the mixture was blended with a Henschel mixer, to provide each of the toners.

4.6 Test Example 1

Low-Temperature Fixing Ability

The same procedures as in Test Example 1 of Item 1.5 were carried out in the test method to evaluate low-temperature fixing ability, provided that the evaluation criteria are as follows. The results are shown in Table 4-3.

Evaluation Criteria

A: The lowest fixing temperature is less than 140° C.
B: The lowest fixing temperature is 140° C. or more and less than 150° C.
C: The lowest fixing temperature is 150° C. or more and less than 170° C.
D: The lowest fixing temperature is 170° C. or more.

4.7 Test Example 2

Storage Ability

The same procedures as in Test Example 2 of Item 1.6 were carried out in both the test method and the evaluation criteria to evaluate storage ability. The results are shown in Table 4-3.

TABLE 4-3

| | | Evaluation of Toner | |
|---|---|---|---|
| No. 4- | Resin Binder* | Low-Temperature Fixing Ability | Storage Ability |
| Ex. 1 | Resin A/Resin G (20/80) | A | A |
| Ex. 2 | Resin A/Resin H (20/80) | A | B |
| Ex. 3 | Resin A/Resin I (20/80) | B | B |
| Ex. 4 | Resin B/Resin G (20/80) | B | A |
| Ex. 5 | Resin C/Resin G (20/80) | B | A |
| Ex. 6 | Resin D/Resin G (20/80) | A | B |
| Ex. 7 | Resin E/Resin G (20/80) | A | B |
| Ex. 8 | Resin F/Resin G (20/80) | A | B |
| Comp. Ex. 1 | Resin F/Resin H (20/80) | B | D |
| Comp. Ex. 2 | Resin F/Resin I (20/80) | D | D |

*Inside the parenthesis shows a weight ratio of the resins.

It can be seen from the above results that as compared to the toners of Comparative Examples 4-1 and 4-2, the toners of Examples 4-1 to 4-8 in which at least either one of the amorphous polyester and the crystalline polyester contains an alcohol A as a resin binder have both favorable low-temperature fixing ability and storage ability. Also, when storage ability of Examples 4-6 to 4-8 is compared, storage ability is in the same rank B, with Examples 4-6 and 4-7 being slightly more excellent.

Example 5

5.1 Production Example 1 of Resins

Resins A to G, and J

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride, an esterification catalyst and pyrogallic acid, as listed in Table 5-1 or 5-2. The mixture was kept at 180° C. for 1 hour in a nitrogen atmosphere, and heated from 180° to 230° C. at a rate of 10° C./hr, and thereafter the mixture was subjected to a polycondensation reaction at 230° C. for 10 hours, and further subjected to a reaction at 230° C. and 8.0 kPa for 1 hour. After cooling the reaction mixture to 210° C., trimellitic anhydride shown in Table 5-1 or 5-2 was supplied thereto, and then the mixture was subjected to a reaction at 210° C. for 2 hours, and subjected to a reaction at 210° C. and 10 kPa until a desired softening point was reached, to provide a polyester. Here, pyrogallic acid was not used in Resins G and J.

5.2 Production Example 2 of Resin

Resin H

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride, an esterification catalyst, and pyrogallic acid, as listed in Table 5-2. The mixture was kept at 180° C. for 1 hour in a nitrogen atmosphere, and heated from 180° to 230° C. at a rate of 10° C./hr, and thereafter the heated mixture was subjected to a polycondensation reaction at 230° C. for 10 hours, and further subjected to a reaction at 230° C. and 8.0 kPa for 1 hour. After cooling the reaction mixture to 160° C., a mixture of a dually reactive monomer (acrylic acid), raw material monomers for a vinyl resin, and a polymerization initiator as listed in Table 5-2 was added dropwise thereto with a dropping funnel over 1 hour. After the dropwise addition, the addition polymerization reaction was matured for 1 hour, while keeping the mixture at 160° C. Thereafter, the mixture was heated to 210° C., trimellitic anhydride shown in Table 5-2 was then supplied thereto, and the mixture was subjected to a reaction at 210° C. for 2 hours, and subjected to a reaction at 210° C. and 10 kPa until a desired softening point was reached, to provide a hybrid resin.

5.3 Production Example 3 of Resin

Resin I

A 5-liter four neck flask equipped with a nitrogen inlet tube, a dehydration tube, a stirrer, and a thermocouple was charged with raw material monomers other than trimellitic anhydride, an esterification catalyst, pyrogallic acid and a polymerization inhibitor (tert-butyl catechol), as listed in Table 5-2. The mixture was subjected to a reaction at 160° C. over 5 hours, and then heated to 200° C. Further, trimellitic anhydride shown in Table 5-2 was supplied thereto, and the mixture was subjected to a reaction for 20 minutes, to provide a crystalline polyester. Resin I had a temperature of maximum endothermic peak of 112.8° C.

5.4 Production Example 4 of Resin

Resin K

A 5-liter four neck flask equipped with a dehydration tube equipped with a nitrogen inlet tube, a stirrer, and a thermocouple was charged with raw material monomers other than trimellitic anhydride and an esterification catalyst, as listed in Table 5-2. The mixture was subjected to a polycondensation reaction at 230° C. for 10 hours in a nitrogen atmosphere, and further subjected to a reaction at 230° C. and 8.0 kPa for 1 hour. Further, trimellitic anhydride shown in Table 5-2 was subjected to a reaction at 210° C. and 10 kPa until a desired softening point was reached, to provide a polyester.

TABLE 5-1

| | Resin A Amount Used | | Resin B Amount Used | | Resin C Amount Used | | Resin D Amount Used | | Resin E Amount Used | | Resin F Amount Used | | Resin G Amount Used |
|---|---|---|---|---|---|---|---|---|---|---|---|---|---|
| | g | mol | g | mol | g | mol | g | mol | g | mol | g | mol | |
| Raw Material Monomers Alcohol Component | | | | | | | | | | | | | |
| 2,3-Butanediol | 900 | 10 | 900 | 10 | 900 | 10 | 1800 | 20 | 900 | 10 | 900 | 10 | 900 10 |
| 1,2-Propanediol | 760 | 10 | 760 | 10 | 760 | 10 | 0 | 0 | 760 | 10 | 760 | 10 | 760 10 |
| Carboxylic Acid Component | | | | | | | | | | | | | |
| Alkenylsuccinic Anhydride A | — | — | — | — | — | — | — | — | 804 | 3 | — | — | — — |
| Terephthalic Acid | 2324 | 14 | 2324 | 14 | 1992 | 12 | 2324 | 14 | 1826 | 11 | 2324 | 14 | 2324 14 |
| Trimellitic Anhydride | 576 | 3 | 576 | 3 | 576 | 3 | 576 | 3 | 576 | 3 | 576 | 3 | 576 3 |
| Esterification Catalyst | | | | | | | | | | | | | |
| Tin(II) 2-Ethylhexanoate | 22.8 | — | 22.8 | — | 21.1 | — | 23.5 | — | 24.3 | — | — | — | 22.8 — |
| Titanium Compound[1)] | — | — | — | — | — | — | — | — | — | — | 22.8 | — | — — |
| Pyrogallic Acid | 2.3 | — | 2.3 | — | 2.1 | — | 2.4 | — | 2.4 | — | 2.3 | — | — — |
| Amount of Alcohol A Contained in Alcohol Component (% by mol) | 50 | | 50 | | 50 | | 100 | | 50 | | 50 | | 50 |
| Alcohol A/(Raw Material Monomers Other Than Alcohol A) × 100 (parts by weight) | 24.6 | | 24.6 | | 27.0 | | 62.1 | | 22.7 | | 24.6 | | 24.6 |
| Softening Point (° C.) | 139.5 | | 120.3 | | 99.1 | | 136.8 | | 134.8 | | 136.1 | | 138.3 |
| Glass Transition Temperature (° C.) | 70.3 | | 65.3 | | 63.2 | | 74.2 | | 63.1 | | 67.8 | | 67.5 |
| Acid Value (mgKOH/g) | 33.0 | | 42.1 | | 30.2 | | 30.2 | | 27.4 | | 38.5 | | 35.9 |

[1)]Titanium Diisopropylate bis(Triethanolaminate)

TABLE 5-2

|  | Resin H Amount Used | | Resin I Amount Used | | Resin J Amount Used | | Resin K Amount Used | |
| --- | --- | --- | --- | --- | --- | --- | --- | --- |
|  | g | mol | g | mol | g | mol | g | mol |
| Raw Material Monomers Alcohol Component | | | | | | | | |
| 2,3-Butanediol | 720 | 8 | 180 | 2 | — | — | — | — |
| 1,2-Propanediol | 608 | 8 | — | — | — | — | — | — |
| 1,6-Hexanediol | — | — | 2124 | 18 | — | — | — | — |
| Ethylene Glycol | — | — | — | — | 744 | 12 | — | — |
| Neopentyl Glycol | — | — | — | — | 832 | 8 | — | — |
| BPA-PO[1] | — | — | — | — | — | — | 2450 | 7 |
| BPA-EO[2] | — | — | — | — | — | — | 975 | 3 |
| Carboxylic Acid Component | | | | | | | | |
| Fumaric Acid | — | — | 2088 | 18 | — | — | — | — |
| Terephthalic Acid | 1859 | 11.2 | — | — | 2158 | 13 | 1079 | 6.5 |
| Trimellitic Anhydride | 461 | 2.4 | 192 | 1 | 768 | 4 | 384 | 2 |
| Esterification Catalyst | | | | | | | | |
| Tin(II) 2-Ethylhexanoate | 18.5 | — | 22.9 | — | 22.5 | — | 24.4 | — |
| Pyrogallic Acid | 1.9 | — | 2.3 | — | — | — | — | — |
| Polymerization Inhibitor | | | | | | | | |
| tert-Butyl Catechol | — | — | 2.3 | — | — | — | — | — |
| Dually Reactive Monomer | | | | | | | | |
| Acrylic Acid | 60 | 0.96 | — | — | — | — | — | — |
| Raw Material Monomers for Vinyl Resin | | | | | | | | |
| Styrene | 779 | — | — | — | — | — | — | — |
| 2-Etylhexyl Acrylate | 148 | — | — | — | — | — | — | — |
| Polymerization Initiator | | | | | | | | |
| Dibutyl Peroxide | 37 | — | — | — | — | — | — | — |
| Amount of Alcohol A Contained in Alcohol Component (% by mol) | 50 | | 10 | | 0 | | 0 | |
| Alcohol A/(Raw Material Monomers Other Than Alcohol A) × 100 (parts by weight) | 24.1 | | 7.9 | | 0 | | 0 | |
| Softening Point (° C.) | 136.1 | | 113.5 | | 122.5 | | 124.3 | |
| Glass Transition Temperature (° C.) | 61.9 | | — | | 60.2 | | 62.1 | |
| Acid Value (mgKOH/g) | 48.5 | | — | | 46.9 | | 24.6 | |

[1] Polyoxypropylene(2.2)-2,2-bis(4-hydroxyphenyl)propane
[2] Polyoxyethylene(2.2)-2,2-bis(4-hydroxyphenyl)propane

5.5 Examples 1 to 7 and Comparative Examples 1 to 3

One hundred parts by weight of a resin binder as shown in Table 5-3, 4 parts by weight of a carbon black "MOGUL L" (manufactured by Cabot Corporation), 1 part by weight of a negatively chargeable charge control agent "BONTRON S-34" (manufactured by Orient Chemical Co., Ltd.), and 2 parts by weight of a polypropylene wax "NP-105" (manufactured by MITSUI CHEMICALS, INC., melting point: 140° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a toner particle having a volume-median particle size ($D_{50}$) of 8.0 μm.

To 100 parts by weight of the resulting toner particle was added 1.0 part by weight of an external additive "Aerosil R-972" (manufactured by Nippon Aerosil Co., Ltd.), and the mixture was blended with a Henschel mixer, to provide each of the toners.

5.6 Test Example 1

Low-Temperature Fixing Ability

The same procedures as in Test Example 1 of Item 1.5 were carried out in both the test method and the evaluation criteria to evaluate low-temperature fixing ability. The results are shown in Table 5-3.

5.7 Test Example 2

Storage Ability

The same procedures as in Test Example 2 of Item 1.6 were carried out in both the test method and the evaluation criteria to evaluate storage ability. The results are shown in Table 5-3.

5.8 Test Example 3

Durability

A toner was loaded to a printer "PAGEPRESTO N-4" (manufactured by CASIO COMPUTER CO., LTD., fixing: contact-fixing method, development method: nonmagnetic monocomponent development method, diameter of developer roller: 2.3 cm), and printing was conducted continuously on obliquely striped patterns having a print coverage of 5.5% under the environmental conditions of 32° C. and humidity of 85%. During the course of printing, black solid images were printed for every 500 sheets, and the presence or absence of the lines on the formed images was confirmed. At the point where the generation of the lines was confirmed, printing was stopped. The test was conducted up to 5,000 sheets at the maximum. Durability was evaluated by defining the number of printed sheets at the point where the generation of lines was visually confirmed on the images as the number of sheets at which lines were generated by fusion or fixing of toner on a developer roller, in accordance with the following evaluation criteria. In other words, it can be judged that the larger the number of sheets without generation of lines, the higher the durability of toner. The results are shown in Table 5-3.

Evaluation Criteria

A: No lines are generated up until printing 5,000 sheets.
B: Lines are generated on printing 2,000 sheets or more and less than 5,000 sheets.
C: Lines are generated on printing less than 2,000 sheets.

TABLE 5-3

| No. 5- | Resin Binder* | Evaluation of Toner | | |
|---|---|---|---|---|
| | | Low-Temp. Fixing Ability | Storage Ability | Durability |
| Ex. 1 | Resin A/Resin C (50/50) | A | A | A |
| Ex. 2 | Resin B | A | A | B |
| Ex. 3 | Resin D/Resin C (50/50) | A | A | A |
| Ex. 4 | Resin E/Resin C (50/50) | A | A | A |
| Ex. 5 | Resin F/Resin C (50/50) | A | A | B |
| Ex. 6 | Resin H/Resin C (50/50) | A | A | A |
| Ex. 7 | Resin A/Resin I (80/20) | A | B | B |
| Comp. Ex. 1 | Resin J | A | D | B |
| Comp. Ex. 2 | Resin K | C | B | B |
| Comp. Ex. 3 | Resin G/Resin J (50/50) | A | B | C |

*Inside the parenthesis shows a weight ratio of the resins.

It can be seen from the above results that as compared to the toners of Examples 5-1 to 5-7, the toner of Comparative Example 5-1 containing a resin binder in which an aliphatic polyhydric alcohol other than the alcohol A is used is deficient in storage ability and durability, even while having favorable low-temperature fixing ability, and that the toner of Comparative Example 5-2 containing a resin binder in which an aromatic polyhydric alcohol is used has markedly lowered low-temperature fixing ability and durability. Also, it can be seen that the toner of Comparative Example 5-3 in which a resin using a pyrogallol compound is used together is deficient in durability.

Example 6

6.1 Production Example 1 of Amorphous Hybrid Resins

Resins H1, H2, and H3

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and an esterification catalyst, as listed in Table 6-1. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours, and further subjected to a reaction at 230° C. and 8.0 kPa for 1 hour. After cooling the reaction mixture to 160° C., a mixture of acrylic acid (a dually reactive monomer), raw material monomers for a styrenic resin, and a polymerization initiator, as listed in Table 6-1 was added dropwise thereto with a dropping funnel over 1 hour. After the dropwise addition, the addition polymerization reaction was matured for 1 hour, while keeping the mixture at 160° C. Thereafter, the mixture was heated to 210° C., trimellitic anhydride shown in Table 6-1 was then supplied thereto, and the mixture was subjected to a reaction at 210° C. for 2 hours, and subjected to a reaction at 210° C. and 10 kPa until a desired softening point was reached, to provide an amorphous hybrid resin.

6.2 Production Example 2 of Amorphous Hybrid Resin

Resin H4

A 5-liter four neck flask equipped with a dehydration tube equipped with a nitrogen inlet tube, a stirrer, and a thermocouple was charged with raw material monomers for a polyester other than trimellitic anhydride and an esterification catalyst, as listed in Table 6-1. The mixture was heated to 160° C. in a nitrogen atmosphere. Thereafter, a mixture of acrylic acid (a dually reactive monomer), raw material monomers for a vinyl resin, and a polymerization initiator, as listed in Table 6-1 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Further, trimellitic anhydride shown in Table 6-1 was supplied thereto, and the mixture was subjected to a reaction at 210° C. for 2 hours, and subjected to a reaction at 210° C. and 10 kPa until a desired softening point was reached, to provide an amorphous hybrid resin.

6.3 Production Example 1 of Amorphous Polyesters

Resins A1, A2, and A4

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and an esterification catalyst, as listed in Table 6-2. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours. Further, trimellitic anhydride shown in Table 6-2 was supplied thereto, and the mixture was subjected to a reaction at 210° C., and subjected to a reaction at 10 kPa until a desired softening point was reached, to provide an amorphous polyester.

6.4 Production Example 2 of Amorphous Polyesters

Resins A3 and A5

A 5-liter four neck flask equipped with a dehydration tube equipped with a nitrogen inlet tube, a stirrer, and a thermocouple was charged with raw material monomers for a polyester other than trimellitic anhydride and an esterification catalyst, as listed in Table 6-2. The mixture was subjected to a polycondensation reaction at 230° C. for 10 hours in a nitrogen atmosphere, and further subjected to a reaction at 230° C. and 8.0 kPa for 1 hour. Further, trimellitic anhydride shown in Table 6-2 was supplied thereto, and the mixture was subjected to a reaction at 210° C., and subjected to a reaction at 10 kPa until a desired softening point was reached, to provide an amorphous polyester.

6.5 Production Example 1 of Crystalline Polyesters

Resins C1 and C2

A 5-liter four neck flask equipped with a nitrogen inlet tube, a dehydration tube, a stirrer, and a thermocouple was charged with raw material monomers other than trimellitic anhydride, an esterification catalyst, and a polymerization inhibitor, as listed in Table 6-3. The mixture was subjected to a reaction at 160° C. over 5 hours, and heated to 200° C. Further, trimellitic anhydride shown in Table 6-3 was supplied thereto, and the mixture was subjected to a reaction for 20 minutes, to provide a crystalline polyester.

TABLE 6-1

| | Resin H1 Amount Used | | Resin H2 Amount Used | | Resin H3 Amount Used | | Resin H4 Amount Used | |
|---|---|---|---|---|---|---|---|---|
| Amorphous Hybrid Resin | g | mol | g | mol | g | mol | g | mol |
| Raw Material Monomers for Polyester (PES) | | | | | | | | |
| Alcohol Component | | | | | | | | |
| 2,3-Butanediol | 720 | 8 | 720 | 8 | — | — | — | — |
| 1,2-Propanediol | 608 | 8 | 608 | 8 | — | — | — | — |
| Ethylene Glycol | — | — | — | — | 595 | 9.6 | — | — |
| Neopentyl Glycol | — | — | — | — | 666 | 6.4 | — | — |
| 1,6-Hexanediol | — | — | — | — | — | — | — | — |
| BPA-PO[1] | — | — | — | — | — | — | 1715 | 4.9 |
| BPA-EO[2] | — | — | — | — | — | — | 683 | 2.1 |
| Carboxylic Acid Component | | | | | | | | |
| Alkenylsuccinic Anhydride A (ASAN) | — | — | 643 | 2.4 | — | — | — | — |
| Terephthalic Acid | 1859 | 11.2 | 1461 | 8.8 | 1726 | 10.4 | 755 | 4.55 |
| Trimellitic Anhydride | 461 | 2.4 | 461 | 2.4 | 614 | 3.2 | 269 | 1.4 |
| Esterification Catalyst | | | | | | | | |
| Tin(II) 2-Ethylhexanoate | 18.5 | — | 19.8 | — | 18.1 | — | 17.2 | — |
| Dually Reactive Monomer | | | | | | | | |
| Acrylic Acid | 60 | 0.96 | 60 | 0.96 | 26 | 0.42 | 26 | 0.42 |
| Raw Material Monomers for Styrenic Resin (St) | | | | | | | | |
| Styrene | 779 | — | 830 | — | 762 | — | 724 | — |
| 2-Etylhexyl Acrylate | 148 | — | 158 | — | 145 | — | 138 | — |
| Polymerization Initiator | | | | | | | | |
| Dibutyl Peroxide | 37 | — | 40 | — | 36 | — | 34 | — |
| Amount of Alcohol A Contained in Alcohol Component (% by mol) | 50 | | 50 | | 0 | | 0 | |
| Alcohol A/(Raw Material Monomers Other Than Alcohol A) × 100 (parts by weight) | 24.6 | | 22.7 | | 0 | | 0 | |
| Amount of ASAN Contained in Carboxylic Acid Component (% by mol) | 0 | | 17.6 | | 0 | | 0 | |
| Total Amount of PES/Total Amount of St (weight ratio) | 4 | | 4 | | 4 | | 4 | |
| Softening Point (° C.) | 139.5 | | 136.1 | | 140.3 | | 134.9 | |
| Temperature of Maximum Endothermic Peak (° C.) | 70.4 | | 66.7 | | 64.2 | | 66.1 | |
| Softening Point/Temperature of Maximum Endothermic Peak | 2.0 | | 2.0 | | 2.2 | | 2.0 | |
| Glass Transition Temperature (° C.) | 66.5 | | 61.9 | | 59.6 | | 62.1 | |
| Acid Value (mgKOH/g) | 33 | | 48.5 | | 33.5 | | 20.3 | |
| Hydroxyl Value (mgKOH/g) | 30.1 | | 38.4 | | 29.6 | | 22.4 | |

[1] Polyoxypropylene(2.2)-2,2-bis(4-hydroxyphenyl)propane
[2] Polyoxyethylene(2.2)-2,2-bis(4-hydroxyphenyl)propane

TABLE 6-2

| Amorphous Polyester | Resin A1 Amount Used | | Resin A2 Amount Used | | Resin A3 Amount Used | | Resin A4 Amount Used | | Resin A5 Amount Used | |
|---|---|---|---|---|---|---|---|---|---|---|
| | g | mol | g | mol | g | mol | g | mol | g | mol |
| Raw Material Monomers Alcohol Component | | | | | | | | | | |
| 2,3-Butanediol | 720 | 8 | — | — | — | — | — | — | — | — |
| 1,2-Propanediol | 608 | 8 | — | — | — | — | — | — | — | — |
| Ethylene Glycol | — | — | 595 | 9.6 | — | — | 744 | 12 | — | — |
| Neopentyl Glycol | — | — | 666 | 6.4 | — | — | 832 | 8 | — | — |
| BPA-PO[1)] | — | — | — | — | 1715 | 4.9 | — | — | 2450 | 7 |
| BPA-EO[2)] | — | — | — | — | 683 | 2.1 | — | — | 975 | 3 |
| Carboxylic Acid Component | | | | | | | | | | |
| Alkenylsuccinic Anhydride A (ASAN) | 858 | 3.2 | 643 | 2.4 | 281 | 1.05 | — | — | — | — |
| Terephthalic Acid | 1328 | 8 | 1328 | 8 | 581 | 3.5 | 2158 | 13 | 1079 | 6.5 |
| Trimellitic Anhydride | 461 | 2.4 | 614 | 3.2 | 269 | 1.4 | 768 | 4 | 384 | 2 |
| Esterification Catalyst | | | | | | | | | | |
| Tin(II) 2-Ethylhexanoate | 19.9 | — | 19.2 | — | 17.6 | — | 22.5 | — | 24.4 | — |
| Amount of Alcohol A Contained in Alcohol Component (% by mol) | 50 | | 0 | | 0 | | 0 | | 0 | |
| Alcohol A/(Raw Material Monomers Other Than Alcohol A) × 100 (parts by weight) | 22.0 | | 0 | | 0 | | 0 | | 0 | |
| Amount of ASAN Contained in Carboxylic Acid Component (% by mol) | 23.5 | | 17.6 | | 17.6 | | 0 | | 0 | |
| Softening Point (° C.) | 136.8 | | 136.5 | | 134.9 | | 130.2 | | 135.6 | |
| Temperature of Maximum Endothermic Peak (° C.) | 68.5 | | 60.9 | | 65.3 | | 66.1 | | 68.1 | |
| Softening Point/Temperature of Maximum Endothermic Peak | 2.0 | | 2.2 | | 2.1 | | 2.0 | | 2.0 | |
| Glass Transition Temperature (° C.) | 61.6 | | 56.3 | | 62.1 | | 62.1 | | 64.2 | |
| Acid Value (mgKOH/g) | 30.2 | | 29.4 | | 20.3 | | 35 | | 24.6 | |
| Hydroxyl Value (mgKOH/g) | 43.2 | | 25.6 | | 22.4 | | 45.2 | | 21.2 | |

[1)]Polyoxypropylene(2.2)-2,2-bis(4-hydroxyphenyl)propane
[2)]Polyoxyethylene(2.2)-2,2-bis(4-hydroxyphenyl)propane

TABLE 6-3

| Crystalline Polyester | Resin C1 Amount Used | | Resin C2 Amount Used | |
|---|---|---|---|---|
| | g | mol | g | mol |
| Raw Material Monomers Alcohol Component | | | | |
| 2,3-Butanediol | 180 | 2 | — | — |
| 1,6-Hexanediol | 2124 | 18 | 2360 | 20 |
| Carboxylic Acid Component | | | | |
| Fumaric Acid | 2088 | 18 | 2088 | 18 |
| Trimellitic Anhydride | 192 | 1 | 192 | 1 |
| Esterification Catalyst | | | | |
| Tin(II) 2-Ethylhexanoate | 22.9 | — | 23.2 | — |
| Polymerization Inhibitor | | | | |
| tert-Butyl Catechol | 2.3 | — | 2.3 | — |
| Amount of Alcohol A Contained in Alcohol Component (% by mol) | 10 | | 0 | |
| Alcohol A/(Raw Material Monomers Other Than Alcohol A) × 100 (parts by weight) | 7.9 | | 0 | |
| Softening Point (° C.) | 117.2 | | 111.6 | |
| Temperature of Maximum Endothermic Peak (° C.) | 104.3 | | 113.5 | |
| Softening Point/Temperature of Maximum Endothermic Peak | 1.12 | | 0.98 | |

6.6 Examples 1 to 13 and Comparative Examples 1 to 6

One hundred parts by weight of a resin binder as shown in Table 6-4, 4 parts by weight of a carbon black "MOGUL L" (manufactured by Cabot Corporation), 1 part by weight of a negatively chargeable charge control agent "BONTRON S-34" (manufactured by Orient Chemical Co., Ltd.), and 2 parts by weight of a polypropylene wax "NP-105" (manufactured by MITSUI CHEMICALS, INC., melting point: 140° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a toner particle having a volume-median particle size ($D_{50}$) of 8.0 μm.

To 100 parts by weight of the resulting toner particle was added 1.0 part by weight of an external additive "Aerosil R-972" (manufactured by Nippon Aerosil Co., Ltd.), and the mixture was blended with a Henschel mixer, to provide each of the toners.

6.7 Test Example 1

Low-Temperature Fixing Ability

The same procedures as in Test Example 1 of Item 1.5 were carried out in both the test method and the evaluation criteria to evaluate low-temperature fixing ability, provided that the evaluation criteria are as follows. The results are shown in Table 6-4.

Evaluation Criteria

A: The lowest fixing temperature is less than 140° C.
B: The lowest fixing temperature is 140° C. or more and less than 150° C.
C: The lowest fixing temperature is 150° C. or more and less than 170° C.
D: The lowest fixing temperature is 170° C. or more.

6.8 Test Example 2

Storage Ability

The same procedures as in Test Example 2 of Item 1.6 were carried out in both the test method and the evaluation criteria to evaluate storage ability. The results are shown in Table 6-4.

6.9 Test Example 3

Triboelectric Stability under High-Temperature, High-Humidity Conditions

A 50 ml polyethylene bottle was charged with 0.6 g of a toner and 19.4 g of a silicone ferrite carrier (manufactured by Kanto Denka Kogyo, average particle size: 90 μm) at a temperature of 32° C. and relative humidity of 85%, and the contents were mixed with a ball-mill at a rate of 250 r/min, and triboelectric charges of the toner were determined with a Q/M meter (manufactured by EPPING) in according with the following method.

After a given period of mixing time, a mixture of a toner and a carrier in defined amounts was supplied into a cell provided in the Q/M meter, and only the toner was aspirated for 90 seconds through a sieve having a sieve opening of 32 μm (made of stainless steel, twilled, wire diameter: 0.0035 mm). The voltage change generated on the carrier at this time was monitored and the value of [Total Electric Charges (μC) After 90 Seconds/Weight (g) of Toner Aspirated] was obtained as triboelectric charges (μC/g). A ratio of triboelectric charges after a 60-second mixing time to triboelectric charges after a 600-second mixing time, i.e. triboelectric charges after 60-second mixing time/triboelectric charges after 600-second mixing time, were calculated, and triboelectric stability was evaluated in accordance with the following criteria. The results are shown in Table 6-4.

Evaluation Criteria

A: 0.9 or more
B: 0.6 or more and less than 0.9
C: less than 0.6

TABLE 6-4

| No. 6- | Resin Binder* | Evaluation of Toner | | |
|---|---|---|---|---|
| | | Low-Temp. Fixing Ability | Storage Ability | Triboelectric Stability Under High-Temperature, High-Humidity Conditions |
| Ex. 1 | Resin H1/Resin C1 (80/20) | A | A | A |
| Ex. 2 | Resin H1/Resin C2 (80/20) | A | B | A |
| Ex. 3 | Resin H2/Resin C2 (80/20) | A | B | A |
| Ex. 4 | Resin A1/Resin C1 (80/20) | A | A | B |
| Ex. 5 | Resin A1/Resin C2 (80/20) | A | B | B |
| Ex. 6 | Resin H3/Resin C1 (80/20) | A | B | A |
| Ex. 7 | Resin H4/Resin C1 (80/20) | B | B | A |
| Ex. 8 | Resin A2/Resin C1 (80/20) | A | B | B |
| Ex. 9 | Resin A3/Resin C1 (80/20) | B | B | B |
| Ex. 10 | Resin H1/Resin A1/Resin C1 (40/40/20) | A | A | A |
| Ex. 11 | Resin H1/Resin A1/Resin C2 (40/40/20) | A | B | A |
| Ex. 12 | Resin H1/Resin A2/Resin C1 (40/40/20) | A | B | B |
| Ex. 13 | Resin H3/Resin A1/Resin C1 (40/40/20) | A | B | A |
| Comp. Ex. 1 | Resin H3/Resin C2 (80/20) | A | D | B |
| Comp. Ex. 2 | Resin H4/Resin C2 (80/20) | D | D | B |
| Comp. Ex. 3 | Resin A2/Resin C2 (80/20) | A | D | B |
| Comp. Ex. 4 | Resin A3/Resin C2 (80/20) | D | C | B |
| Comp. Ex. 5 | Resin A4/Resin C2 (80/20) | B | D | C |
| Comp. Ex. 6 | Resin A5/Resin C2 (80/20) | D | C | C |

*Inside the parenthesis shows a weight ratio of the resins.

It can be seen from the above results that as compared to the toners of Comparative Examples 6-1 to 6-6, the toners of Examples 6-1 to 6-13 are excellent in all of low-temperature fixing ability, storage ability and triboelectric stability under high-temperature, high humidity conditions.

Example 7

7.1 Production Example 1 of Resins

Resins A to D

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride and an esterification catalyst as listed in Table 7-1. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours, and further subjected to a reaction at 230° C. and 8.0 kPa for 1 hour. After cooling the reaction mixture to 210° C., trimellitic anhydride shown in Table 7-1 was supplied thereto, and the mixture was subjected to a reaction at 210° C. for 2 hours, and subjected to a reaction at 210° C. and 10 kPa until a desired softening point was reached, to provide a polyester.

7.2 Production Example 2 of Resins

Resins E and F

A 5-liter four neck flask equipped with, a dehydration tube equipped with a nitrogen inlet tube, a stirrer, and a thermocouple was charged with raw material monomers for a polyester other than trimellitic anhydride and an esterification catalyst as listed in Table 7-1. The mixture was subjected to a polycondensation reaction at 230° C. for 10 hours in a nitrogen atmosphere, and further subjected to a reaction at 230° C. and 8.0 kPa for 1 hour. Further, trimellitic anhydride shown in Table 7-1 was supplied thereto, and the mixture was subjected to a reaction at 210° C., and subjected to a reaction at 10 kPa until a desired softening point was

TABLE 7-1

|  | Resin A Amount Used | | Resin B Amount Used | | Resin C Amount Used | | Resin D Amount Used | | Resin E Amount Used | | Resin F Amount Used | |
| --- | --- | --- | --- | --- | --- | --- | --- | --- | --- | --- | --- | --- |
|  | g | mol | g | mol | g | mol | g | mol | g | mol | g | mol |
| Raw Material Monomers | | | | | | | | | | | | |
| Alcohol Component | | | | | | | | | | | | |
| 2,3-Butanediol | 900 | 10 | 1800 | 20 | — | — | — | — | — | — | — | — |
| 1,2-Propanediol | 760 | 10 | — | — | — | — | — | — | — | — | — | — |
| Ethylene Glycol | — | — | — | — | 744 | 12 | 744 | 12 | — | — | — | — |
| Neopentyl Glycol | — | — | — | — | 832 | 8 | 832 | 8 | — | — | — | — |
| BPA-PO[1] | — | — | — | — | — | — | — | — | 2450 | 7 | 2450 | 7 |
| BPA-EO[2] | — | — | — | — | — | — | — | — | 975 | 3 | 975 | 3 |
| Carboxylic Acid Component | | | | | | | | | | | | |
| Terephthalic Acid | 2324 | 14 | 2324 | 14 | 2158 | 13 | 2158 | 13 | 1079 | 6.5 | 1079 | 6.5 |
| Trimellitic Anhydride | 576 | 3 | 576 | 3 | 768 | 4 | 768 | 4 | 384 | 2 | 384 | 2 |
| Esterification Catalyst | | | | | | | | | | | | |
| Tin(II) 2-Ethylhexanoate | 22.8 | — | 23.5 | — | 22.5 | — | 22.5 | — | 24.4 | — | 24.4 | — |
| Total Amount of Raw Material Monomers (g) | 4560 | | 4700 | | 4502 | | 4502 | | 4888 | | 4888 | |
| Amount of Alcohol A Contained in Alcohol Component (% by mol) | 50 | | 100 | | 0 | | 0 | | 0 | | 0 | |
| Alcohol A/(Raw Material Monomers Other Than Alcohol A) × 100 (parts by weight) | 24.6 | | 62.1 | | 0 | | 0 | | 0 | | 0 | |
| Softening Point (° C.) | 137.3 | | 100.8 | | 138.2 | | 123.1 | | 138.9 | | 98.6 | |
| Glass Transition Temperature (° C.) | 67.9 | | 60.4 | | 62.3 | | 57.5 | | 67.8 | | 60.2 | |
| Acid Value (mgKOH/g) | 30.1 | | 49.3 | | 34.8 | | 43.2 | | 20.5 | | 29.5 | |

[1]Polyoxypropylene(2.2)-2,2-bis(4-hydroxyphenyl)propane
[2]Polyoxyethylene(2.2)-2,2-bis(4-hydroxyphenyl)propane

7.3 Examples 1 to 5 and Comparative Examples 1 to 6

One hundred parts by weight of a resin binder and a charge control resin as shown in Table 7-2, 4 parts by weight of a colorant "Regal 330R" (manufactured by Cabot Corporation), and 2 parts by weight of a polypropylene wax "NP-105" (manufactured by MITSUI CHEMICALS, INC., melting point: 140° C.) were mixed with a Henschel mixer. The mixture was melt-kneaded with a twin-screw extruder, and cooled, and the melt-kneaded product was then roughly pulverized with a hammer-mill to a size of 1 mm or so. The resulting roughly pulverized product was finely pulverized with an air jet-type pulverizer, and classified, to provide a toner particle having a volume-median particle size ($D_{50}$) of 7.5 μm.

To 100 parts by weight of the resulting toner particle was added 1.0 part by weight of an external additive "Aerosil R-972" (manufactured by Nippon Aerosil Co., Ltd.), and the mixture was blended with a Henschel mixer, to provide each of the toners.

7.4 Test Example 1

Low-Temperature Fixing Ability

The same procedures as in Test Example 1 of Item 1.5 were carried out in both the test method and the evaluation criteria to evaluate low-temperature fixing ability.

The results are shown in Table 7-2.

7.5 Test Example 2
Storage Ability

The same procedures as in Test Example 2 of Item 1.6 were carried out in both the test method and the evaluation criteria to evaluate storage ability. The results are shown in Table 7-2.

7.6 Test Example 3

Triboelectric Chargeability

A toner was loaded to a printer "HL-2040" manufactured by Brother Industries Ltd., and an image having a print coverage of 5% was printed for 10,000 sheets continuously. During the course of printing, black solid images were printed for every 1,000 sheets, and the images obtained were observed visually, to evaluate solid image quality as triboelectric chargeability in accordance with the following evaluation criteria. The results are shown in Table 7-2. The larger the number of sheets until the lowering of optical density is caused, the more excellent the solid image quality.

Evaluation Criteria

A: The lowering in optical density did not take place up to printing 10,000 sheets.
B: The lowering in optical density was observed during printing between 5,000 sheets and 10,000 sheets.
C: The lowering in optical density was observed during printing between 3,000 sheets and 5,000 sheets.
D: The lowering in optical density was observed at less than 3,000 sheets.

aliphatic polyhydric alcohol other than alcohol A is used or a polyester in which an aromatic polyhydric alcohol is used does not have improvement of triboelectric chargeability, even if a charge control resin is blended.

Example 8
8.1 Production Example 1 of Resins

Resins A to E

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and an esterification catalyst, as listed in Table 8-1. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours, and further subjected to a reaction at 230° C. and 8.0 kPa for 1 hour. After cooling the reaction mixture to 210° C., trimellitic anhydride shown in Table 8-1 was supplied thereto, and the mixture was subjected to a reaction at 210° C. for 2 hours, and subjected to a reaction at 210° C. and 10 kPa until a desired softening point was reached, to provide a polyester.

8.2 Production Example 2 of Resin
Resin F

A 5-liter four neck flask equipped with a dehydration tube equipped with a nitrogen inlet tube, a stirrer, and a thermocouple was charged with raw material monomers for a polyester other than trimellitic anhydride and an esterification

TABLE 7-2

| No. 7- | Resin Binder[1] | Charge Control Resin[2] | Low-Temp. Fixing Ability | Storage Ability | Triboelectric Chargeability |
|---|---|---|---|---|---|
| Ex. 1 | Resin A/Resin B (50/50) | CCR A = 7 | A | A | A |
| Ex. 2 | Resin A/Resin B (50/50) | CCR B = 7 | A | A | B |
| Ex. 3 | Resin A | CCR A = 7 | B | A | A |
| Ex. 4 | Resin A/Resin B (50/50) | CCR A = 25 | B | B | B |
| Ex. 5 | Resin A/Resin B (50/50) | CCR A = 5 | A | A | B |
| Comp. Ex. 1 | Resin A/Resin B (50/50) | — | A | A | C |
| Comp. Ex. 2 | Resin C/Resin D (50/50) | — | A | D | C |
| Comp. Ex. 3 | Resin C | — | A | D | C |
| Comp. Ex. 4 | Resin E/Resin F (50/50) | — | C | B | C |
| Comp. Ex. 5 | Resin C/Resin D (50/50) | CCR A = 7 | A | D | C |
| Comp. Ex. 6 | Resin E/Resin F (50/50) | CCR A = 7 | C | B | C |

[1]Inside the parenthesis shows a weight ratio of the resins.
[2]The amount of a charge control resin used shows a weight ratio based on 100 parts by weight of resin binder.
CCR A: FCA-701PT (manufactured by FUJIKURAKASEI CO., LTD., quaternary ammonium salt group-containing styrene-acrylic copolymer, softening point: 123° C.)
CCR B: FCA-201PS (manufactured by FUJIKURAKASEI CO., LTD., quaternary ammonium salt group-containing styrene-acrylic copolymer, softening point: 111° C.)

It can be seen from the above results that as compared to the toners of Comparative Examples 7-1 to 7-6, the toners of Examples 7-1 to 7-5 are excellent in all of low-temperature fixing ability, storage ability, and triboelectric chargeability. Especially, it can be seen from the comparison of Comparative Examples 7-1 and 7-4 with Comparative Examples 7-3 and 7-5 that the toner containing a polyester in which an catalyst, as listed in Table 8-1. The mixture was subjected to a polycondensation reaction at 230° C. for 10 hours in a nitrogen atmosphere, and further subjected to a reaction at 230° C. and 8.0 kPa for 1 hour. Further, trimellitic anhydride shown in Table 8-1 was subjected to a reaction at 210° C., and subjected to a reaction at 10 kPa until a desired softening point was reached, to provide a polyester.

TABLE 8-1

|  | Resin A Amount Used | | Resin B Amount Used | | Resin C Amount Used | | Resin D Amount Used | | Resin E Amount Used | | Resin F Amount Used | |
| --- | --- | --- | --- | --- | --- | --- | --- | --- | --- | --- | --- | --- |
|  | g | mol | g | mol | g | mol | g | mol | g | mol | g | mol |
| Raw Material Monomers | | | | | | | | | | | | |
| Alcohol Component | | | | | | | | | | | | |
| 2,3-Butanediol | 900 | 10 | 900 | 10 | 900 | 10 | 1800 | 20 | — | — | — | — |
| 1,2-Propanediol | 760 | 10 | 760 | 10 | 760 | 10 | — | — | — | — | — | — |
| Ethylene Glycol | — | — | — | — | — | — | — | — | 744 | 12 | — | — |
| Neopentyl Glycol | — | — | — | — | — | — | — | — | 832 | 8 | — | — |
| BPA-PO[1] | — | — | — | — | — | — | — | — | — | — | 2450 | 7 |
| BPA-EO[2] | — | — | — | — | — | — | — | — | — | — | 975 | 3 |
| Carboxylic Acid Component | | | | | | | | | | | | |
| Alkenylsuccinic Anhydride A | — | — | — | — | 1072 | 4 | — | — | — | — | — | — |
| Terephthalic Acid | 2324 | 14 | 2324 | 14 | 1660 | 10 | 2324 | 14 | 2158 | 13 | 1079 | 6.5 |
| Trimellitic Anhydride | 576 | 3 | 576 | 3 | 576 | 3 | 576 | 3 | 768 | 4 | 384 | 2 |
| Esterification Catalyst | | | | | | | | | | | | |
| Tin(II) 2-Ethylhexanoate | 22.8 | — | 22.8 | — | 24.8 | — | 23.5 | — | 22.5 | — | 24.4 | — |
| Total Amount of Raw Material Monomers (g) | 4560 | | 4560 | | 4968 | | 4700 | | 4502 | | 4888 | |
| Amount of Alcohol A Contained in Alcohol Component (% by mol) | 50 | | 50 | | 50 | | 100 | | 0 | | 0 | |
| Alcohol A/(Raw Material Monomers Other Than Alcohol A) × 100 (parts by weight) | 24.6 | | 24.6 | | 22.1 | | 62.1 | | 0 | | 0 | |
| Softening Point (° C.) | 137.3 | | 100.8 | | 138.2 | | 118 | | 123.1 | | 120.3 | |
| Glass Transition Temperature (° C.) | 67.9 | | 61.2 | | 62.3 | | 73.1 | | 60.2 | | 61.0 | |
| Acid Value (mgKOH/g) | 30.1 | | 49.3 | | 34.8 | | 35.2 | | 43.2 | | 20.5 | |

[1] Polyoxypropylene(2.2)-2,2-bis(4-hydroxyphenyl)propane
[2] Polyoxyethylene(2.2)-2,2-bis(4-hydroxyphenyl)propane

8.3 Examples 1 to 5 and Comparative Examples 1 to 4

One hundred parts by weight of a resin binder as shown in Table 8-2, 6 parts by weight of a magenta pigment "Super Magenta R" (manufactured by DIC Corporation, P.R. 122), 1 part by weight of a negatively chargeable charge control agent "BONTRON S-34" (manufactured by Orient Chemical Co., Ltd.), and 2 parts by weight of a paraffin wax "HNP-9" (manufactured by Nippon Seiro, melting point: 75° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a toner particle having a volume-median particle size ($D_{50}$) of 8.0 μM.

To 100 parts by weight of the resulting toner particle was added 1.0 part by weight of each of external additives shown in Table 8-2, and the mixture was blended with a Henschel mixer for 3 minutes, to provide each of the toners.

8.4 Test Example 1

Low-Temperature Fixing Ability

The same procedures as in Test Example 1 of Item 1.5 were carried out in both the test method and the evaluation criteria to evaluate low-temperature fixing ability. The results are shown in Table 8-2.

8.5 Test Example 2

Storage Ability

The same procedures as in Test Example 2 of Item 1.6 were carried out in both the test method and the evaluation criteria to evaluate storage ability. The results are shown in Table 8-2.

8.6 Test Example 3

Transferability

A toner was loaded in a color printer "MICROLINE 5400" (manufactured by Oki Data Corporation) and solid image was printed out. The amount of toner on the photoconductor of the solid image was adjusted to 0.40 to 0.50 mg/cm$^2$, and the machine was stopped in the course of printing of the solid image. A mending tape was adhered to a photoconductor which passed through a transfer member, so that a toner remaining on the photoconductor without being transferred was transferred to the mending tape, and the mending tape was removed from the photoconductor. The removed mending tape and an unused mending tape were determined with "CR-321" (manufactured by Minolta), and the transferability was evaluated on the basis of the difference in hues (ΔE) calculated from the following formula. The results are shown in Table 8-2.

$$\Delta E = \sqrt{(L_1^* - L_2^*)^2 + (a_1^* - a_2^*)^2 + (b_1^* - b_2^*)^2} \quad \text{[Math 2]}$$

wherein $L_1^*$, $a_1^*$ and $b_1^*$ are each of the measurement values in the removed mending tape, and each of $L_2^*$, $a_2^*$ and $b_2^*$ are each of the measurement values in the unused mending tape.

Evaluation Criteria

A: Difference in hues ΔE is less than 3.0.
B: Difference in hues ΔE is 3.0 or more and less than 4.0.
C: Difference in hues ΔE is 4.0 or more.

TABLE 8-2

| No. 8- | Resin Binder[1] | External Additive[2] | Evaluation of Toner Low-Temp. Fixing Ability | Storage Ability | Transferability |
|---|---|---|---|---|---|
| Ex. 1 | Resin A/Resin B (50/50) | External Additive A | A | A | A |
| Ex. 2 | Resin A/Resin B (50/50) | External Additive B | A | A | B |
| Ex. 3 | Resin A/Resin D (50/50) | External Additive A | A | A | A |
| Ex. 4 | Resin C/Resin B (50/50) | External Additive A | A | B | B |
| Ex. 5 | Resin D | External Additive A | B | A | A |
| Comp. Ex. 1 | Resin E | External Additive A | A | D | C |
| Comp. Ex. 2 | Resin F | External Additive A | C | B | C |
| Comp. Ex. 3 | Resin A/Resin B(50/50) | External Additive C | A | A | C |
| Comp. Ex. 4 | Resin A/Resin B(50/50) | External Additive D | A | A | C |

[1] Inside the parenthesis shows a weight ratio of the resins.
[2] External Additive A: Hydrophobic silica "NAX-50" (manufactured by Nippon Aerosil Co., Ltd., average particle size 35 nm, hydrophobic treatment agent: HMDS) External Additive B: Hydrophobic silica "TG-C243" (manufactured by Cabot Corporation, average particle size 100 nm, hydrophobic treatment agent: OTES + HMDS) External Additive C: Hydrophobic silica "R-972" (manufactured by Nippon Aerosil Co., Ltd., average particle size 16 nm, hydrophobic treatment agent: DMDS) External Additive D: Hydrophobic silica "TSX-55" (manufactured by Shin-Etsu Chemical Co. Ltd., average particle size 300 nm, hydrophobic treatment agent: HMDS)

It can be seen from the above results that as compared to the toners of Examples 8-1 to 8-5, the toner of Comparative Example 8-1 containing a resin binder in which an aliphatic polyhydric alcohol other than the alcohol A is used is deficient in storage ability and transferability, even while having favorable low-temperature fixing ability, and that the toner of Comparative Example 8-2 containing a resin binder in which an aromatic polyhydric alcohol is used is insufficient in all the properties. Also, it can be seen that both of the toner of Comparative Example 8-3 in which an external additive having a too small average particle size is used and the toner of Comparative Example 8-4 in which an external additive having a too large average particle size is used have markedly lowered transferability.

Example 9

9.1 Production Example 1 of Resins

Resins A, B, and D to F

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and an esterification catalyst, as listed in Table 9-1. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours, and further subjected to a reaction under a reduced pressure at 230° C. and 40 kPa for 1 hour. After cooling the reaction mixture to 210° C., trimellitic anhydride shown in Table 9-1 was supplied thereto, and the mixture was subjected to a reaction at 210° C. and normal pressure for 2 hours, and subjected to a reaction at 210° C. and 10 kPa until a desired softening point was reached, to provide a polyester.

9.2 Production Example 2 of Resin

Resin C

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers for a polyester other than fumaric acid and trimellitic anhydride, and an esterification catalyst as listed in Table 9-1. The mixture was kept at 180° C. for 1 hour in a nitrogen atmosphere, and heated from 180° to 230° C. at a rate of 10° C./hr, and the heated mixture was then subjected to a polycondensation reaction at 230° C. for 10 hours, and further subjected to a reaction under a reduced pressure at 230° C. and 40 kPa for 1 hour. After cooling the reaction mixture to 180° C., fumaric acid, trimellitic anhydride, and tert-butyl catechol shown in Table 9-1 were supplied thereto. The mixture was heated to 210° C. over 4 hours, and the heated mixture was subjected to a reaction at 210° C. and normal pressure for 2 hours, and subjected to a reaction at 210° C. and 10 kPa until a desired softening point was reached, to provide a polyester.

9.3 Production Example 3 of Resin

Resin G

A 5-liter four neck flask equipped with a dehydration tube equipped with a nitrogen inlet tube, a stirrer, and a thermocouple was charged with raw material monomers for a polyester other than trimellitic anhydride, and an esterification catalyst as listed in Table 9-1. The mixture was subjected to a polycondensation reaction at 230° C. for 10 hours in a nitrogen atmosphere, and further subjected to a reaction at 230° C. and 8.0 kPa for 1 hour. Further, trimellitic anhydride shown in Table 9-1 was allowed to react at 210° C., and the mixture was subjected to a reaction at 10 kPa until a desired softening point was reached, to provide a polyester.

TABLE 9-1

| | Resin A Amount Used | | Resin B Amount Used | | Resin C Amount Used | | Resin D Amount Used | | Resin E Amount Used | | Resin F Amount Used | | Resin G Amount Used | |
|---|---|---|---|---|---|---|---|---|---|---|---|---|---|---|
| | g | mol | g | mol | g | mol | g | mol | g | mol | g | mol | g | mol |
| Raw Material Monomers Alcohol Component | | | | | | | | | | | | | | |
| 2,3-Butanediol | 900 | 10 | 900 | 10 | 900 | 10 | 1800 | 20 | 900 | 10 | — | — | — | — |
| 1,2-Propanediol | 760 | 10 | 760 | 10 | 760 | 10 | — | — | 760 | 10 | — | — | — | — |
| Ethylene Glycol | — | — | — | — | — | — | — | — | — | — | 620 | 10 | — | — |
| Neopentyl Glycol | — | — | — | — | — | — | — | — | — | — | 1040 | 10 | — | — |
| BPA-PO[1)] | — | — | — | — | — | — | — | — | — | — | — | — | 2450 | 7 |
| BPA-EO[2)] | — | — | — | — | — | — | — | — | — | — | — | — | 975 | 3 |
| Carboxylic Acid Component | | | | | | | | | | | | | | |
| Fumaric Acid | — | — | — | — | 464 | 4 | — | — | — | — | — | — | — | — |
| Alkenylsuccinic Anhydride A | — | — | 1072 | 4 | — | — | — | — | — | — | — | — | — | — |
| Terephthalic Acid | 2656 | 16 | 1992 | 12 | 1992 | 12 | 2656 | 16 | 2324 | 14 | 2158 | 13 | 996 | 6 |
| Trimellitic Anhydride | 384 | 2 | 384 | 2 | 384 | 2 | 384 | 2 | 576 | 3 | 768 | 4 | 384 | 2 |
| Esterification Catalyst | | | | | | | | | | | | | | |
| Tin(II) 2-Ethylhexanoate | 23.5 | — | 25.5 | — | 22.5 | — | 24.2 | — | — | — | 22.9 | — | 24.0 | — |
| Titanium Compound[3)] | — | — | — | — | — | — | — | — | 22.8 | — | — | — | — | — |
| Polymerization Inhibitor | | | | | | | | | | | | | | |
| tert-Butyl Catechol | — | — | — | — | 2.7 | — | — | — | — | — | — | — | — | — |
| Total Amount of Raw Material Monomers (g) | 4700 | | 5108 | | 4500 | | 4840 | | 4560 | | 4586 | | 4805 | |
| Amount of Alcohol A Contained in Alcohol Component (% by mol) | 50 | | 50 | | 50 | | 100 | | 50 | | 0 | | 0 | |
| Alcohol A/(Raw Material Monomers Other Than Alcohol A) × 100 (parts by weight) | 23.7 | | 21.4 | | 25.0 | | 59.2 | | 24.6 | | 0 | | 0 | |
| Softening Point (° C.) | 130.2 | | 126.7 | | 125.3 | | 127.7 | | 101.2 | | 123.1 | | 125.4 | |
| Glass Transition Temperature (° C.) | 65.4 | | 59.4 | | 63.6 | | 72.6 | | 59.6 | | 60.2 | | 63.4 | |
| Acid Value (mgKOH/g) | 35.7 | | 26.4 | | 30.1 | | 40.2 | | 41.2 | | 43.2 | | 25.6 | |

[1)]Polyoxypropylene(2.2)-2,2-bis(4-hydroxyphenyl)propane
[2)]Polyoxyethylene(2.2)-2,2-bis(4-hydroxyphenyl)propane
[3)]Titanium Diisopropylate bis(Triethanolamininate)

9.4 Examples 1 to 13 and Comparative Examples 1 to 4

One hundred parts by weight of a resin binder as shown in Table 9-2, 6 parts by weight of a cyan pigment "Toner Cyan BG" (manufactured by Clariant GmbH, C.I. Pigment Blue 15:3), a charge control agent as shown in Table 9-2, and 2 parts by weight of a paraffin wax "HNP-9" (manufactured by Nippon Seiro, melting point: 75° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The resulting melt-kneaded product was cooled and roughly pulverized, and thereafter pulverized with a jet mill, and a pulverized product was classified, to provide a toner particle having a volume-median particle size ($D_{50}$) as shown in Table 9-2.

To 100 parts by weight of the resulting toner particle was added 1.0 part by weight of an external additive "Aerosil R-972" (manufactured by Nippon Aerosil Co., Ltd.), and the mixture was blended with a Henschel mixer for 3 minutes, to provide each of the toners.

9.5 Test Example 1

Low-Temperature Fixing Ability

The same procedures as in Test Example 1 of Item 1.5 were carried out in both the test method and the evaluation criteria to evaluate low-temperature fixing ability. The results are shown in Table 9-2.

9.6 Test Example 2

Storage Ability

The same procedures as in Test Example 2 of Item 1.6 were carried out in both the test method and the evaluation criteria to evaluate storage ability. The results are shown in Table 9-2.

9.7 Test Example 3

Initial Rise in Triboelectric Chargeability

A 50 ml polyethylene bottle was charged with 0.6 g of a toner and 19.4 g of a silicone ferrite carrier (manufactured by Kanto Denka Kogyo, average particle size: 90 and the components were mixed with a ball-mill at a rate of 250 r/min, and triboelectric charges of the toners at the time of 1 minute and 10 minutes were determined with a q/m meter (manufactured by EPPING). After a given period of mixing time, a developer in defined amounts was supplied into a cell provided in the q/m meter, and only the toner was aspirated for 90 seconds through a sieve having a sieve opening of 32 μm (made of stainless steel, twilled, wire diameter: 0.0035 mm). The voltage change generated on the carrier at this time was monitored and initial rise in triboelectric chargeability was evaluated in accordance with the following evaluation criteria. The results are shown in Table 9-2.

Evaluation Criteria

A value for (triboelectric charges at a mixing time of 1 minute)/(triboelectric charges at a mixing time of 10 minutes) is:
A: 0.95 or more
B: 0.9 or more and less than 0.95
C: less than 0.9

Example 10

10.1 Production Examples 1 to 6 of Resins

A 5-liter four neck flask equipped with a nitrogen inlet tube, a dehydration tube equipped with a fractional distillation tube through which hot water at 100° C. was allowed to flow, a stirrer, and a thermocouple was charged with an alcohol component, a carboxylic acid component other than trimellitic anhydride and an esterification catalyst as listed in Table 10-1. The mixture was kept at 180° C. for 1 hour in a nitrogen atmosphere, and heated from 180° to 230° C. at a rate of 5° C./hr, and the heated mixture was then subjected to a polycondensation reaction at 220° C. for 10 hours, and further subjected to a reaction at 230° C. and 8.0 kPa for 1 hour. After cooling the reaction mixture to 210° C., trimellitic anhydride shown in Table 10-1 was supplied thereto, and the mixture was subjected to a reaction at 210° C. for 2 hours, and subjected to a reaction at 210° C. and 10 kPa until a desired softening point was reached, to provide polyesters (Resins A to F).

10.2 Production Example 7 of Resin

A 5-liter four neck flask equipped with a nitrogen inlet tube, a dehydration tube, a stirrer, and a thermocouple was charged with an alcohol component, a carboxylic acid component other than fumaric acid and trimellitic anhydride, and an esterification catalyst as listed in Table 10-1. The mixture was subjected to a reaction at 230° C. for 8 hours in a nitrogen atmosphere, and then cooled to 180° C., and fumaric acid was then supplied thereto. The mixture was kept at 180° C. for 1 hour, and heated from 180° to 210° C. at a rate of 10° C./hr, and the heated mixture was then subjected to a polycondensation reaction at 210° C. for 2 hours, and further subjected to

TABLE 9-2

| | | | | Evaluation of Toner | | |
|---|---|---|---|---|---|---|
| No. 9- | Resin Binder[1] | Charge Control Agent[2] | $D_{50}$ (μm) | Low-Temp. Fixing Ability | Storage Ability | Initial Rise in Triboelectric Chargeability |
| Ex. 1 | Resin A/Resin E(50/50) | C-1(1.5) | 7.0 | A | A | A |
| Ex. 2 | Resin A/Resin E(50/50) | C-2(1.5) | 7.2 | A | A | A |
| Ex. 3 | Resin A/Resin E(50/50) | C-3(1.5) | 7.1 | A | A | A |
| Ex. 4 | Resin A/Resin E(50/50) | C-4(1.5) | 6.8 | A | A | A |
| Ex. 5 | Resin A/Resin E(50/50) | C-1(0.5) | 6.9 | A | A | B |
| Ex. 6 | Resin A/Resin E(50/50) | C-1(3.0) | 7.0 | A | A | B |
| Ex. 7 | Resin B/Resin E(50/50) | C-1(1.5) | 7.0 | A | B | A |
| Ex. 8 | Resin C/Resin E(50/50) | C-1(1.5) | 7.3 | A | B | A |
| Ex. 9 | Resin D/Resin E(50/50) | C-1(1.5) | 7.4 | B | A | A |
| Ex. 10 | Resin A | C-1(1.5) | 7.1 | A | A | A |
| Ex. 11 | Resin E | C-1(1.5) | 7.1 | A | B | A |
| Ex. 12 | Resin F/Resin E(50/50) | C-1(1.5) | 7.0 | A | B | B |
| Ex. 13 | Resin G/Resin E(50/50) | C-1(1.5) | 6.9 | B | B | B |
| Comp. Ex. 1 | Resin F | C-1(1.5) | 7.0 | A | D | C |
| Comp. Ex. 2 | Resin G | C-1(1.5) | 7.2 | C | B | C |
| Comp. Ex. 3 | Resin A/Resin E(50/50) | C-5(1.5) | 7.1 | A | A | C |
| Comp. Ex. 4 | Resin G | C-5(1.5) | 7.2 | C | B | B |

[1] Inside the parenthesis shows a weight ratio of the resins.
[2] Inside the parenthesis shows an amount of a charge control agent used based on 100 parts by weight of the resin binder.
C-1: Chromium complex of a salicylic acid compound "BONTRON E-81" (manufactured by Orient Chemical Co., Ltd.)
C-2: Zinc complex of salicylic acid compound "BONTRON E-84" (manufactured by Orient Chemical Co., Ltd.)
C-3: Boron complex of a benzylic acid compound "LR-147" (manufactured by Nippon Carlit, Ltd.)
C-4: Aluminum complex of a benzylic acid compound "LR-297" (manufactured by Nippon Carlit, Ltd.)
C-5: Metal azo complex "T-77" (manufactured by Hodogaya Chemical Co., Ltd.)

It can be seen from the above results that as compared to the toners of Examples 9-1 to 9-13, the toner of Comparative Example 9-1 containing a resin binder in which an aliphatic polyhydric alcohol other than an alcohol A is used is deficient in storage ability and initial rise in triboelectric chargeability, even while having a favorable low-temperature fixing ability, and that the toner of Comparative Example 9-2 containing a resin binder in which an aromatic polyhydric alcohol is used is insufficient in all the properties. Also, it can be seen that the toner of Comparative Example 9-3 containing a charge control agent comprising a metal azo complex has a markedly lowered initial rise of triboelectric chargeability. It can be seen from the comparison of Comparative Example 9-2 and Comparative Example 9-4 that the toner containing a resin binder in which an alcohol A is not used has improved initial rise in triboelectric chargeability by a metal azo complex.

a reaction at 210° C. and 8.0 kPa for 1 hour. After cooling the reaction mixture to 205° C., trimellitic anhydride shown in Table 10-1 was supplied thereto, and the mixture was subjected to a reaction at 205° C. for 1 hour, and subjected to a reaction at 205° C. and 10 kPa until a desired softening point was reached, to provide a polyester (Resin G).

Next, an aqueous solution of a 1 g portion of calcium chloride was added to this mixture as an aggregating agent, and the pH of the dispersion was adjusted to 7 with an aqueous sodium carbonate solution (concentration: 10% by weight). Thereafter, the dispersion was stirred with a homomixer at a rotational speed of 5,000 r/min at room temperature

TABLE 10-1

| | Resin A | Resin B | Resin C | Resin D | Resin E | Resin F | Resin G |
|---|---|---|---|---|---|---|---|
| Alcohol Component | | | | | | | |
| 2,3-Butanediol (Alcohol A) | 848.7 g | 993.6 g | 449.7 g | 533.6 g | 1685.5 g | — | — |
| 1,2-Propanediol | 514.0 g | 268.1 g | 569.7 g | 837.1 g | — | — | — |
| Neopentyl Glycol | — | — | 259.5 g | — | — | 855.6 g | — |
| Ethylene Glycol | 132.2 g | — | 103.1 g | — | — | 530.9 g | — |
| BPA-PO[1)] | — | — | — | — | — | — | 3174.8 g |
| Carboxylic Acid Component | | | | | | | |
| Terephthalic Acid | 2808.2 g | 1830.6 g | 1795.1 g | 1966.4 g | 1552.7 g | 2620 g | — |
| Isophthalic Acid | — | 844.9 g | 414.3 g | — | — | — | — |
| Trimellitic Anhydride | 102.4 g | 162.9 g | 159.7 g | 426.8 g | 718.4 g | 193.4 g | 142.4 g |
| Purified Rosin | — | — | — | 842.7 g | — | — | — |
| Itaconic Acid | — | — | — | 220.2 g | 243.4 g | — | — |
| Fumaric Acid | — | — | — | — | — | — | 391.6 g |
| Esterification Catalyst | | | | | | | |
| Tin 2-Ethylhexanoate | 12.6 g | 16.8 g | — | — | — | — | — |
| Dibutyltin Oxide | — | — | 8.4 g | — | 8.4 g | 8.4 g | 8.4 g |
| tetra-n-Butyl Titanate | — | — | — | 25.2 g | — | — | — |
| Amount of Alcohol A Contained in Alcohol Component (% by mol) | 51.5 | 75.8 | 30.0 | 35.0 | 100 | 0 | 0 |
| Alcohol A/(Raw Material Monomers Other Than Alcohol A) × 100 (parts by weight) | 23.8 | 32.0 | 13.6 | 12.4 | 67.0 | 0 | 0 |
| Glass Transition Temperature (° C.) | 68.6 | 60.6 | 64.6 | 58.2 | 73.6 | 53.1 | 63.6 |
| Acid Value (mgKOH/g) | 21.5 | 25.2 | 15.3 | 28.2 | 79.5 | 7.8 | 19.2 |
| Hydroxyl Value (mgKOH/g) | 23.8 | 30.3 | 33.2 | 39.9 | 56.1 | 49.2 | 32.8 |

[1)]Polyoxypropylene(2.0)-2,2-bis(4-hydroxyphenyl)propane

10.3 Example 1

A 5-liter stainless steel vessel was charged with 100 g of Resin A, 100 g of Resin B and 100 g of nonionic surfactant (polyoxyethylene lauryl ether (EO=9 mol added), cloud point: 98° C., HLB: 15.3), and the mixture was melted at 170° C., while stirring with a paddle-shaped stirrer at a rate of 200 r/min. The contents were stabilized at 95° C., a temperature lower than cloud point of the nonionic surfactant by 3° C., and 75.5 g of an aqueous sodium hydroxide solution (concentration: 5% by weight) was added dropwise to the mixture as a neutralizing agent while stirring with a paddle-shaped stirrer at a rate of 200 r/min. Subsequently, deionized water was added dropwise thereto at a rate of 6 g/min while stirring with a paddle-shaped stirrer at a rate of 300 r/m, totaling in an amount of 1624.5 g of deionized water. During this time, the temperature of the system was kept at 95° C. The mixture was passed through a 200-mesh wire gauze (opening: 105 μm), to provide a resin dispersion containing fine resin particles. The resin particles (primary particles) in the resulting resin dispersion had a volume-median particle size ($D_{50}$) of 0.45 μm and a solid content of 12.0% by weight, and no resin components remaining on the wire gauze.

Four hundred grams of the resulting resin dispersion (concentration: 12.3% by weight), 40 g of an aqueous dispersion of a cyan pigment (concentration: 5% by weight), and 7 g of an aqueous dispersion of a paraffin wax (HNP-9, manufactured by Nippon Seiro, melting point: 78° C.) (concentration: 35% by weight, nonionic surfactant: 5% by weight of EMULGEN 108 (manufactured by KAO Corporation), dispersion diameter of the wax (volume-median particle size: 0.30 μm) were mixed in a 1-liter vessel at room temperature.

for 1 hour. As a consequence, the resulting mixed dispersion was transferred to a 1-liter autoclave, heated to 90° C., and stirred at 500 r/min for 6 hours, to form aggregated particles.

Thereafter, the dispersion was heated to 100° C., and stirred for an additional 1 hour, to unify the aggregated particles, and thereafter the steps of aspiration, filtering, washing and drying were carried out to provide a colored powder of fine resin particles. The colored powder of fine resin particles had a volume-median particle size of 6.8 μm and a water content of 0.3% by weight.

To 100 parts by weight of the resulting colored powder of fine resin particles was added 1.0 part by weight of a hydrophobic silica (TS530, manufactured by Wacker Chemicals, number-average particle size: 8 nm). The mixture was mixed with a Henschel mixer, and subjected to an external addition treatment to provide a cyan toner. The resulting cyan toner had a volume-median particle size ($D_{50}$) of 6.8 μm.

10.4 Example 2

Fifty parts by weight of Resin C, 50 parts by weights of Resin D, 4.0 parts by weight of a yellow colorant (Paliotol D1155, manufactured by BASF), 2.5 parts by weight of a charge control agent (BONTRON E-84, manufactured by Hodogaya Chemical Co., Ltd.), and 4 parts by weight of a paraffin wax (HNP-9, manufactured by Nippon Seiro, melting point: 78° C.) were previously mixed with a Henschel mixer, and thereafter the mixture was melt-kneaded with an open roller-type kneader, cooled and pulverized, to provide 1 mm chips of the kneaded product.

A 5-liter stainless steel vessel was charged with 200 g of resulting kneaded product and 100 g of a nonionic surfactant (polyoxyethylene lauryl ether (EO=9 mol added), cloud point: 98° C., HLB: 15.3), and the mixture was melted at 170° C. while stirring with a paddle-shaped stirrer at rate of 200 r/min. The content was stabilized at 95° C., a temperature lower than cloud point of the nonionic surfactant by 3° C., and 75.5 g of an aqueous sodium hydroxide solution (concentration: 5% by weight) was added dropwise to the mixture as a neutralizing agent while stirring with a paddle-shaped stirrer at a rate of 200 r/min. Subsequently, deionized water was added dropwise thereto at a rate of 6 g/min while stirring with a paddle-shaped stirrer at a rate of 300 r/m, totaling in an amount of 1624.5 g of deionized water. During this time, the temperature of the system was kept at 95° C., and the mixture was passed through a 200-mesh wire gauze (opening: 105 μm), to provide a resin dispersion containing fine resin particles. The resin particles (primary particles) in the resulting resin dispersion had a volume-median particle size ($D_{50}$) of 0.45 μm and a solid content of 12.0% by weight, and no resin components remaining on the wire gauze.

Next, an aqueous solution of a 1 g portion of calcium chloride was added to this mixture as an aggregating agent, and the pH of the solution was adjusted to 7 with an aqueous sodium carbonate solution (concentration: 10% by weight). Thereafter, the mixture solution was stirred with a homomixer at a rotational speed of 5,000 r/min at room temperature for 1 hour. The generated mixed dispersion was transferred to a 1-liter autoclave, heated to 105° C., and stirred at 500 r/min for 6 hours, to form aggregated particles.

Thereafter, the dispersion was heated to 125° C., and stirred for an additional 1 hour, to unify the aggregated particles, and thereafter the steps of aspiration, filtering, washing and drying were carried out to provide colored powder of fine resin particles. The colored powder of fine resin particles had a volume-median particle size ($D_{50}$) of 6.7 μm and a water content of 0.3% by weight.

To 100 parts by weight of the resulting colored powder of fine resin particles was added 1.0 part by weight of a hydrophobic silica (TS530, manufactured by Wacker Chemicals, number-average particle size: 8 nm). The mixture was mixed with a Henschel mixer and subjected to an external addition treatment, to provide a yellow toner. The resulting yellow toner had a volume-median particle size ($D_{50}$) of 6.8 μm.

10.5 Example 3

A 5-L vessel equipped with a stirrer, a reflux condenser, a dropping funnel, a thermometer and a nitrogen inlet tube was charged with 600 g of methyl ethyl ketone, and then 200 g of Resin E was added thereto at room temperature to dissolve. Ten grams of triethylamine was added to the resulting solution to neutralize the solution, and subsequently 2,000 g of ion-exchanged water was added thereto. Thereafter, methyl ethyl ketone was distilled off at a stirring rate of 250 r/min at a temperature of 50° C. or less under a reduced pressure, to provide a self-dispersible aqueous dispersion of resin particles (resin content: 9.6% by weight (on a solid basis)). Polyester particles dispersed in the resulting resin dispersion had a weight-average particle size of 0.3 μm.

Fifty grams of copper phthalocyanine (manufactured by DAINICHISEIKA COLOR & CHEMICALS MFG. CO.), 5 g of a nonionic surfactant (EMULGEN 150, manufactured by KAO Corporation) and 200 g of ion-exchanged water were mixed, and the copper phthalocyanine was dissolved. The mixture was dispersed for 10 minutes with a homogenizer to provide a colorant-dispersed dispersion.

A mixture of 50 g of a paraffin wax (HNP0190, manufactured by Nippon Seiro, melting point: 85° C.), 5 g of a cationic surfactant (SANISOL B50, manufactured by KAO Corporation) and 200 g of ion-exchanged water was heated to 95° C., and the paraffin wax was dispersed with a homogenizer. Thereafter, the mixture was subjected a dispersion treatment with a pressure jetting homogenizer, to provide a wax dispersion in which the paraffin wax was dispersed in an average particle size of 550 nm.

Fifty grams of a charge control agent (BONTRON E-84, manufactured by Orient Chemical Co., Ltd.), 5 g of a nonionic surfactant (EMULGEN 150, manufactured by KAO Corporation) and 200 g of ion-exchanged water were mixed, the mixture was dispersed for 10 minutes using glass beads with a sand grinder, to prepare a charge control agent dispersion in which the charge control agent was dispersed in an average particle size of 500 nm. However, remnants of coarse particles in the dispersion were observed.

Four-hundred and ninety grams of the resulting resin particle dispersion, 20 g of a colorant dispersion, 15 g of a wax dispersion, 7 g of a charge control agent dispersion and 2 g of a cationic surfactant (SANISOL B50, manufactured by KAO Corporation) were mixed in a round-shaped stainless steel flask with a homogenizer. The mixture was dispersed, and thereafter heated to 48° C., while stirring the contents inside the flask in a heating oil bath. Further, after the dispersion was kept at 48° C. for 1 hour, it was confirmed that aggregated particles having a weight-average particle size of 7.0 μm were formed.

Three grams of an anionic surfactant (PELEX SS-L, manufactured by KAO Corporation) was added to the aggregated particle dispersion in which the aggregated particles were formed. Thereafter, the above-mentioned stainless steel flask was equipped with a reflux tube, and the dispersion was heated to 80° C. at a rate of 5° C./min while continuously stirring, and kept thereat for 5 hours, to unify and fuse the aggregated particles. Thereafter, the unified particles were cooled, filtered, and sufficiently washed with ion-exchanged water and dried, to provide colored powder of fine resin particles. The resulting colored powder of fine resin particles had a volume-median particle size ($D_{50}$) of 7.1 μm.

To 100 parts by weight of the resulting colored powder of fine resin particles was added 1.0 part by weight of a hydrophobic silica (TS530, manufactured by Wacker Chemicals, number-average particle size: 8 nm). The mixture was mixed with a Henschel mixer and subjected to an external addition treatment to provide a cyan toner. The resulting cyan toner had a volume-median particle size ($D_{50}$) of 7.1 μm.

10.6 Example 4

The same procedures as in Example 1 were carried out except that 50 parts by weight of Resin A and 50 parts by weight of Resin F were used in place of Resin A to provide a cyan toner. The resulting cyan toner had a volume-median particle size ($D_{50}$) of 6.7 μm.

10.7 Comparative Example 1

The same procedures as in Example 1 were carried out except that 100 parts by weight of Resin G were used in place of Resin A to provide a cyan toner. The resulting cyan toner had a volume-median particle size ($D_{50}$) of 6.8 μm.

10.8 Comparative Example 2

The same procedures as in Example 1 were carried out except that 100 parts by weight of Resin F were used in place of Resin A to provide a cyan toner. The resulting cyan toner had a volume-median particle size ($D_{50}$) of 6.7 μm.

10.9 Test Example 1

Hydrolytic Resistance

A 100-ml eggplant-shaped flask was charged with 1.0 g of a resin binder used in each of Examples and Comparative Examples shown in Table 10-2, 20 ml of a 0.1 mol/L methanol solution of potassium hydroxide was added thereto, and further 20 ml of distilled water was added thereto. The contents were heated in a water bath at 90° C. for 5 hours. After the termination of heating for 5 hours, the solution was neutralized with 0.1 mol/L of hydrochloric acid, and the solvent was then removed therefrom, and a residual resin was dried. A glass transition temperature (Tg) of the resulting resin was determined, and the Tg's before and after the test were compared to evaluate hydrolytic resistance in accordance with the following evaluation criteria.

Evaluation Criteria

A: A temperature difference in Tg's before and after the test is less than 1° C.
B: A temperature difference in Tg's before and after the test is 1° C. or more and less than 3° C.
C: A temperature difference in Tg's before and after the test is 3° C. or more and less than 6° C.
D: A temperature difference in Tg's before and after the test is 6° C. or more.

10.10 Test Example 2

Low-Temperature Fixing Ability

The same procedures as in Test Example 1 of Item 1.5 were carried out in both the test method and the evaluation criteria to evaluate low-temperature fixing ability, provided that the evaluation criteria are as follows. The results are shown in Table 10-2.

Evaluation Criteria

A: The lowest fixing temperature is less than 140° C.
B: The lowest fixing temperature is 140° C. or more and less than 160° C.
C: The lowest fixing temperature is 160° C. or more.

10.11 Test Example 3

Hot Offset Resistance

In Test Example 2, a temperature at which offset is initially confirmed is visually judged, upon sequentially raising a temperature of a fixing roller from 90° to 240° C., and hot offset resistance was evaluated in accordance with the following evaluation criteria. The results are shown in Table 10-2.
[Evaluation Criteria]
A: The hot offset generation temperature is 220° C. or more.
B: The hot offset generation temperature is 200° C. or more and less than 220° C.
C: The hot offset generation temperature is 180° C. or more and less than 200° C.
D: The hot offset generation temperature is less than 180° C.

10.12 Test Example 4

Storage Ability

The same procedures as in Test Example 2 of Item 1.6 were carried out in both the test method and the evaluation criteria to evaluate storage ability. The results are shown in Table 10-2.

TABLE 10-2

| No. 10- | Resin Binder (parts by weight) | Evaluation of Toner | | | |
|---|---|---|---|---|---|
| | | Hydrolytic Resistance | Low-Temp. Fixing Ability | Hot Offset Resistance | Storage Ability |
| Ex. 1 | Resin A/Resin B (50/50) | A | A | A | A |
| Ex. 2 | Resin C/Resin D (50/50) | B | A | B | B |
| Ex. 3 | Resin E | A | B | A | A |
| Ex. 4 | Resin A/Resin F (50/50) | B | A | B | B |
| Comp. Ex. 1 | Resin G | C | C | B | A |
| Comp. Ex. 2 | Resin F | D | A | C | D |

* Inside the parenthesis shows a weight ratio of the resins.

It can be seen from the above results that as compared to the toners of Comparative Examples 10-1 and 10-2, the toners of Examples 10-1 to 10-4 containing a polyester in which an aliphatic polyhydric alcohol having two or more secondary carbon atoms with a hydroxyl group bound thereto is used in a proper amount have favorable storage ability and low-temperature fixing ability.

Example 11

11.1 Production Example 1 of Resins

Resins A, B, D to H, and J

A 5-liter four-neck flask equipped with a thermometer, a stainless steel stirring rod, a reflux condenser, and a nitrogen inlet tube was charged with raw material monomers other than trimellitic anhydride and an esterification catalyst, as listed in Table 11-1 or 11-2. The mixture was heated in a mantle heater to 180° C. in a nitrogen atmosphere, and thereafter heated to 230° C. over 10 hours. Thereafter, having confirmed that a conversion rate at 230° C. reached 95% or higher, the reaction mixture was cooled to 210° C. Trimellitic anhydride shown in Table 11-1 or 11-2 was supplied thereto, and the mixture was subjected to a reaction at a normal pressure for 1 hour, and then subjected to a reaction at 40 kPa until a desired softening point was reached, to provide a polyester. Here, the conversion rate refers to a value calculated by: [amount of water generated in reaction/theoretical amount of generated water]×100.

11.2 Production Example 2 of Resin

Resin C

A 5-liter four-neck flask equipped with a thermometer, a stainless steel stirring rod, a reflux condenser, and a nitrogen inlet tube was charged with raw material monomers other than fumaric acid and trimellitic anhydride and an esterification catalyst, as listed in Table 11-1. The mixture was heated in a mantle heater to 180° C. in a nitrogen atmosphere, and thereafter heated to 230° C. over 10 hours. Thereafter, having confirmed that a conversion rate at 230° C. reached 95% or higher, the reaction mixture was cooled to 180° C. Trimellitic anhydride, fumaric acid and tert-butyl catechol listed in Table 11-1 were supplied thereto, and the mixture was heated to 210° C. over 3 hours, and then subjected to a reaction at 40 kPa until a desired softening point was reached, to provide a polyester.

11.3 Production Example 3 of Resin

Resin I

A 5-liter four-neck flask equipped with a thermometer, a stainless steel stirring rod, a reflux condenser, and a nitrogen inlet tube was charged with raw material monomers other than trimellitic anhydride and an esterification catalyst, as listed in Table 11-2. The mixture was heated in a mantle heater to 235° C. in a nitrogen atmosphere, and thereafter subjected to a reaction at 235° C. for 10 hours. Thereafter, the mixture was subjected to a reaction at 235° C. and 8 kPa for 1 hour, and cooled to 210° C. Trimellitic anhydride shown in Table 11-2 was supplied thereto, and the mixture was subjected to a reaction at normal pressure for 1 hour, and subjected to a reaction at 40 kPa until a desired softening point was reached, to provide a polyester.

TABLE 11-1

|  | Resin A Amount Used | | Resin B Amount Used | | Resin C Amount Used | | Resin D Amount Used | | Resin E Amount Used | |
| --- | --- | --- | --- | --- | --- | --- | --- | --- | --- | --- |
|  | g | mol | g | mol | g | mol | g | mol | g | mol |
| Raw Material Monomers Alcohol Component | | | | | | | | | | |
| 2,3-Butanediol | 900 | 10 | 1800 | 20 | 900 | 10 | — | — | 900 | 10 |
| 1,2-Propanediol | 761 | 10 | — | — | 761 | 10 | 1218 | 16 | 761 | 10 |
| 1,3-Propanediol | — | — | — | — | — | — | — | — | — | — |
| 2,4-Hexanediol | — | — | — | — | — | — | 472 | 1.3 | — | — |
| Carboxylic Acid Component | | | | | | | | | | |
| Alkenylsuccinic Anhydride A (ASAN) | 1340 | 5 | 1340 | 5 | 1340 | 5.0 | 1072 | 4 | 268 | 1 |
| Fumaric Acid | — | — | — | — | 348 | 1.3 | — | — | — | — |
| Terephthalic Acid | 2158 | 13 | 2158 | 13 | 1660 | 10 | 1992 | 12 | 2490 | 15 |
| Trimellitic Anhydride | 384 | 2 | 384 | 2 | 384 | 2 | 576 | 3 | 384 | 2 |
| Esterification Catalyst | | | | | | | | | | |
| Dibutyltin Oxide | — | — | — | — | — | — | — | — | 25.0 | — |
| Tin(II) 2-Ethylhexanoate | 27.7 | — | 28.4 | — | 27.0 | — | — | — | — | — |
| Titanium Compound[1] | — | — | — | — | — | — | 26.6 | — | — | — |
| Polymerization Initiator | | | | | | | | | | |
| tert-Butyl Catechol | — | — | — | — | 2.7 | — | — | — | — | — |
| Total Amount of Raw Material Monomers (g) | 5543 | | 5682 | | 5393 | | 5330 | | 4803 | |
| Amount of Alcohol A Contained in Alcohol Component (% by mol) | 50 | | 100 | | 50 | | 7.5 | | 50 | |
| Amount of ASAN Contained in Carboxylic Acid Component (% by mol) | 25.0 | | 25.0 | | 29.4 | | 21.1 | | 5.6 | |
| Alcohol A/(Raw Material Monomers Other Than Alcohol A) × 100 (parts by weight) | 19.4 | | 46.4 | | 20 | | 9.7 | | 23.1 | |
| Softening Point (° C.) | 112.3 | | 117.4 | | 101.1 | | 114.2 | | 110.6 | |
| Glass Transition Temperature (° C.) | 58.7 | | 59.7 | | 52.1 | | 59.1 | | 62.4 | |
| Acid Value (mgKOH/g) | 25.3 | | 31.4 | | 25.1 | | 18.4 | | 22.4 | |

[1]Titanium Diisopropylate bis(Triethanolaminate)

TABLE 11-2

|  | Resin F Amount Used | | Resin G Amount Used | | Resin H Amount Used | | Resin I Amount Used | | Resin J Amount Used | |
| --- | --- | --- | --- | --- | --- | --- | --- | --- | --- | --- |
|  | g | mol | g | mol | g | mol | g | mol | g | mol |
| Raw Material Monomers Alcohol Component | | | | | | | | | | |
| 2,3-Butanediol | 900 | 10 | 720 | 8 | — | — | — | — | — | — |
| 1,2-Propanediol | 761 | 10 | 457 | 6 | — | — | — | — | — | — |
| Ethylene Glycol | — | — | 372 | 6 | 620 | 10 | — | — | 620 | 10 |
| Neopentyl Glycol | — | — | — | — | 1040 | 10 | — | — | 1040 | 10 |

TABLE 11-2-continued

| | Resin F Amount Used | | Resin G Amount Used | | Resin H Amount Used | | Resin I Amount Used | | Resin J Amount Used | |
|---|---|---|---|---|---|---|---|---|---|---|
| | g | mol | g | mol | g | mol | g | mol | g | mol |
| BPA-PO[1)] | — | — | — | — | — | — | 1750 | 5 | — | — |
| BPA-EO[2)] | — | — | — | — | — | — | 1625 | 5 | — | — |
| Carboxylic Acid Component | | | | | | | | | | |
| Alkenylsuccinic Anhydride A (ASAN) | 2144 | 8 | 1340 | 5 | 1340 | 5 | — | — | — | — |
| Terephthalic Acid | 1328 | 8 | 2158 | 13 | 2158 | 13 | 1162 | 7 | 2490 | 15 |
| Trimellitic Anhydride | 576 | 3 | 384 | 2 | 384 | 2 | 288 | 1.5 | 768 | 4 |
| Esterification Catalyst | | | | | | | | | | |
| Tin(II) 2-Ethylhexanoate | 28.5 | — | 27.2 | — | 27.7 | — | 24.1 | — | 24.6 | — |
| Total Amount of Raw Material Monomers (g) | 5709 | | 5431 | | 5542 | | 4825 | | 4918 | |
| Amount of Alcohol A Contained in Alcohol Component (% by mol) | 50 | | 40 | | 0 | | 0 | | 0 | |
| Amount of ASAN Contained in Carboxylic Acid Component (% by mol) | 42.1 | | 25.0 | | 25.0 | | 0 | | 0 | |
| Alcohol A/(Raw Material Monomers Other Than Alcohol A) × 100 (parts by weight) | 18.7 | | 15.3 | | 0 | | 0 | | 0 | |
| Softening Point (° C.) | 114.5 | | 110.6 | | 105.4 | | 118.9 | | 108.6 | |
| Glass Transition Temperature (° C.) | 50.6 | | 52.1 | | 47.7 | | 56.3 | | 50.1 | |
| Acid Value (mgKOH/g) | 18.4 | | 26.3 | | 36.5 | | 19.8 | | 38.5 | |

[1)]Polyoxypropylene(2,2)-2,2-bis(4-hydroxyphenyl)propane
[2)]Polyoxyethylene(2,2)-2,2-bis(4-hydroxyphenyl)propane

11.4 Examples 1 to 12 and Comparative Examples 1 to 3

[Preparation of Resin Dispersion]

To a 5-L vessel equipped with a stirrer, a reflux condenser, a dropping funnel, a thermometer and a nitrogen inlet tube, 600 g of methyl ethyl ketone was supplied, and 200 g of a resin binder, as listed in Table 11-3, was added thereto at room temperature to dissolve. Ten grams of triethylamine was added to the resulting solution to neutralize the solution, and subsequently 2,000 g of ion-exchanged water was added thereto. Thereafter, the methyl ethyl ketone was distilled off from the mixture at a stirring rate of 250 r/min at a temperature of 50° C. or less under a reduced pressure, to provide a self-dispersible aqueous dispersion of resin particles (resin content: 9.6% by weight (on a solid basis)). Polyester particles (primary particles) dispersed in the resulting resin dispersion had an average particle size of 0.3 µm.

Preparation of Colorant Dispersion

Fifty grams of copper phthalocyanine (manufactured by DAINICHISEIKA COLOR & CHEMICALS MFG. CO.), 5 g of nonionic surfactant (EMULGEN 150, manufactured by KAO Corporation, polyoxyethylene lauryl ether, HLB: 18.4, cloud point: 100° C. or more) and 200 g of ion-exchanged water were mixed, and copper phthalocyanine was dissolved. The mixture was dispersed for 10 minutes with a homogenizer to provide a dispersed colorant dispersion.

Preparation of Releasing Agent Dispersion

A mixture of 50 g of a paraffin wax (HNP0190, manufactured by Nippon Seiro, melting point: 85° C.), 5 g of a cationic surfactant (SANISOL B50, manufactured by KAO Corporation) and 200 g of ion-exchanged water was heated to 95° C., and the paraffin wax was dispersed with a homogenizer. Thereafter, the mixture was subjected to a dispersion treatment with a pressure jetting homogenizer, to provide a releasing agent dispersion in which the paraffin wax was dispersed in an average particle size of 550 nm.

Preparation of Charge Control Agent Dispersion

Fifty grams of a charge control agent (BONTRON E-84, manufactured by Orient Chemical Co., Ltd.), 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and the mixture was dispersed for 10 minutes using glass beads with a sand grinder, to prepare a charge control agent dispersion in which the charge control agent was dispersed in an average particle size of 500 nm. However, remnants of coarse particles in the dispersion were observed.

Aggregating Step

Four-hundred and ninety grams of a resin particle dispersion, 20 g of colorant dispersion, 15 g of a releasing agent dispersion, 7 g of a charge control agent dispersion and 2 g of a cationic surfactant (SANISOL B50, manufactured by KAO Corporation) obtained were mixed in a round-shaped stainless steel flask with a homogenizer to disperse. Thereafter, the dispersion was heated to 48° C., while stirring the contents inside the flask in a heating oil bath. Further, after the dispersion was kept at 48° C. for 1 hour, it was confirmed that aggregated particles having a weight-average particle size of 6.0 µm were formed.

Unifying Step

Three grams of an anionic surfactant (PELEX SS-L, manufactured by KAO Corporation) was added to the aggregated particle dispersion in which the aggregated particles were formed, and thereafter the above-mentioned stainless steel flask was equipped with a reflux tube. The dispersion was heated to 80° C. at a rate of 5° C./min while continuously stirring, and kept thereat for 5 hours, to unify and fuse the aggregated particles. Thereafter, the unified particles were cooled, filtered, and sufficiently washed with ion-exchanged water and dried, to provide colored powder of fine resin particles. The resulting colored powder of fine resin particles had a volume-median particle size ($D_{50}$) of 6.3 p.m.

Surface-Treating Step

To 100 parts by weight of the resulting colored powder of fine resin particles was added 1.0 part by weight of hydrophobic silica (TS530, manufactured by Wacker Chemicals, number-average particle size: 8 nm), and the mixture was mixed with a Henschel mixer and subjected to an external addition treatment, to provide a cyan toner. The resulting cyan toner had a volume-median particle size ($D_{50}$) of 6.5 µm.

11.5 Example 13

Preparation of Resin Dispersion

One thousand and three-hundred grams of Resin A, 100 g of an anionic surfactant (NEOPELEX G-15, manufactured by KAO Corporation, sodium dodecylbenzenesulfonate (solid content 15% by weight)), 100 g of a nonionic surfactant (EMULGEN 430, manufactured by KAO Corporation, polyoxyethylene oleyl ether (EO=26 mol added), HLB: 16.2, cloud point: 100° C. or more) and 689 g of a 5% by weight aqueous potassium hydroxide solution were dispersed in a 5-liter stainless steel vessel at 25° C., while stirring with a paddle-shaped stirrer at rate of 200 r/min. The contents were stabilized at 95° C., and kept thereat for 2 hours while stirring with a paddle-shaped stirrer at a rate of 200 r/min. Subsequently, deionized water was added dropwise thereto at a rate of 15 g/min, while stirring with a paddle-shaped stirrer at a rate of 200 r/m, totaling in an amount of 2845 g of deionized water. During this dropwise addition, the temperature of the system was kept at 95° C. After the system was cooled, the mixture was passed through a 150-mesh wire gauze (opening: 105 µm), to provide a resin dispersion containing fine resin particles. The resin particles (primary particles) in the resulting resin dispersion had an average particle size of 0.15 µm and a solid content of 31% by weight, and no resin components remained on the wire gauze.

Preparation of Colorant Dispersion

Fifty grams of copper phthalocyanine (manufactured by DAINICHISEIKA COLOR & CHEMICALS MFG. CO.), 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and copper phthalocyanine was dissolved. The mixture was dispersed for 10 minutes with a homogenizer, to provide a colorant-dispersed dispersion.

Preparation of Releasing Agent Dispersion

A mixture of 50 g of a paraffin wax (HNP0190, manufactured by Nippon Seiro, melting point: 85° C.), 5 g of a cationic surfactant (SANISOL B50, manufactured by KAO Corporation) and 200 g of ion-exchanged water was heated to 95° C., and the paraffin wax was dispersed with a homogenizer. Thereafter, the mixture was subjected to a dispersion treatment with a pressure jetting homogenizer, to provide a releasing agent dispersion in which the paraffin wax was dispersed in an average particle size of 550 nm.

Preparation of Charge Control Agent Dispersion

Fifty grams of a charge control agent (BONTRON E-84, manufactured by Orient Chemical Co., Ltd.), 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and the mixture was dispersed for 10 minutes using glass beads with a sand grinder, to prepare a charge control agent dispersion in which the charge control agent was dispersed in an average particle size of 500 nm. However, remnants of coarse particles in the dispersion were observed.

Aggregating Step

Four-hundred and ninety grams of a resin particle dispersion, 20 g of colorant dispersion, 15 g of a releasing agent dispersion, 7 g of charge control agent dispersion and 2 g of a cationic surfactant (SANISOL B50, manufactured by KAO Corporation) obtained were mixed in a round-shaped stainless steel flask with a homogenizer (pH=7) to disperse. Thereafter, the mixture was heated to 48° C., while stirring the contents inside the flask in a heating oil bath. Further, after the dispersion was kept at 48° C. for 1 hour, it was confirmed that aggregated particles having a weight-average particle size of 6.0 µm were formed.

Unifying Step

Three grams of an anionic surfactant (PELEX SS-L, manufactured by KAO Corporation) was added to the aggregated particle dispersion in which the aggregated particles were formed, and thereafter the above-mentioned stainless steel flask was equipped with a reflux tube. The dispersion was heated to 80° C. at a rate of 5° C./min while continuously stirring, and kept for 5 hours, to unify and fuse the aggregated particles. Thereafter, the unified particles were cooled, filtered, and sufficiently washed with ion-exchanged water and dried, to provide colored powder of fine resin particles. The resulting colored powder of fine resin particles had a volume-median particle size ($D_{50}$) of 6.3 µm.

Surface-Treating Step

To 100 parts by weight of the resulting colored powder of fine resin particles was added 1.0 part by weight of a hydrophobic silica (TS530, manufactured by Wacker Chemicals, number-average particle size: 8 nm), and the mixture was mixed with a Henschel mixer and subjected to an external addition treatment, to provide a cyan toner. The resulting cyan toner had a volume-median particle size ($D_{50}$) of 6.9 µm.

11.6 Test Example 1

Hydrolytic Resistance

The same procedures as in Test Example 1 of Item 10.9 were carried out using a resin binder used in each of Examples and Comparative Examples as shown in Table 11-3 in both the test method and the evaluation criteria to evaluate hydrolytic resistance. The results are shown in Table 11-3.

11.7 Test Example 2

Low-Temperature Fixing Ability

The same procedures as in Test Example 1 of Item 1.5 were carried out in the both test method and the evaluation criteria to evaluate low-temperature fixing ability, provided that the evaluation criteria are as follows. The results are shown in Table 11-3.

Evaluation Criteria

A: The lowest fixing temperature is less than 140° C.
B: The lowest fixing temperature is 140° C. or more and less than 160° C.
C: The lowest fixing temperature is 160° C. or more.

11.8 Test Example 3

Hot Offset Resistance

The same procedures as in Test Example 3 of Item 10.11 were carried out in both the test method and evaluation criteria to evaluate hydrolytic resistance. The results are shown in Table 11-3.

11.9 Test Example 4

Storage Ability

The same procedures as in Test Example 2 of Item 1.6 were carried out in both the test method and the evaluation criteria to evaluate storage ability. The results are shown in Table 11-3.

11.10 Test Example 5

Resistance to Background Fogging Under High-Temperature, High Humidity Conditions A toner was loaded to "PAGEPRESTO N-4" (manufactured by CASIO COMPUTER CO., LTD., fixing: contact fixing method, nonmagnetic monocomponent development method, developer roller diameter: 2.3 cm) under the conditions of a temperature of 32° C. and humidity of 80%, and the steps up to transferring were carried out, and fixing was carried out with an external fixing device. A toner was loaded to this apparatus, and printing was carried out for 2,000 sheets. Thereafter, a solid image of a square having 2 cm each side was printed at a position 2 cm away from the top center of an A4 sheet (210 mm×297 mm), and background fogging was evaluated in accordance with the method shown below using the above A4 sheet.

(1) In a part where background fogging was generated by solid image printing at a position of additionally 2 cm below a distance corresponding to a circumference of a developer roller (7.2 cm) from the top center of the sheet, i.e. 9.2 cm from the top center, L* values, a* values, and b* values were determined at four (4) points taken along the sides of the square, 0.5 cm away from each of the four corners, within the square having 2 cm each side with a color-difference-meter "CR-321" (manufactured by Minolta), and an average for each value was calculated. (2) L* values, a* values, and b* values were determined at 4 points in the blank sheet portion at distances 4 cm and 8 cm to the left and to the right, away from the center located 10.2 cm away from the top end of the image in the same manner as in (1), and an average for each value was calculated.

A difference in the two values in (1) and (2) ($\Delta E$) was obtained by the following formula, and the extent of the generation of background fogging was evaluated in accordance with the following evaluation criteria. The results are shown in Table 11-3.

$$\Delta E = \sqrt{(L_1^* - L_2^*)^2 + (a_1^* - a_2^*)^2 + (b_1^* - b_2^*)^2} \quad \text{[Math 3]}$$

wherein $L_1^*$, $a_1^*$ and $b_1^*$ are each of the measurement values in the item (1), and each of $L_2^*$, $a_2^*$ and $b_2^*$ are each of the measurement values in the item (2).

Evaluation Criteria

A: $\Delta E$ is less than 0.5.
B: $\Delta E$ is 0.5 or more and less than 1.
C: $\Delta E$ is 1 or more.

TABLE 11-3

| No. 11- | Resin Binder* | $D_{50}$ | Evaluation of Toner | | | | |
|---|---|---|---|---|---|---|---|
| | | | Hydrolytic Resistance | Low-Temp. Fixing Ability | Hot Offset Resistance | Storage Ability | Resistance to Background Fogging under High-Temperature, High-Humidity Conditions |
| Ex. 1 | Resin A | 6.5 | A | A | A | A | A |
| Ex. 2 | Resin B | 6.6 | A | B | A | A | A |
| Ex. 3 | Resin C | 6.4 | A | A | B | B | A |
| Ex. 4 | Resin D | 6.8 | B | A | A | B | A |
| Ex. 5 | Resin E | 6.4 | A | A | A | A | B |
| Ex. 6 | Resin F | 6.0 | A | A | A | B | A |
| Ex. 7 | Resin G | 6.5 | B | A | B | B | A |
| Ex. 8 | Resin A/Resin C(50/50) | 6.3 | A | A | A | A | A |
| Ex. 9 | Resin A/Resin G(50/50) | 6.2 | B | A | A | B | A |
| Ex. 10 | Resin H/Resin C(50/50) | 6.1 | B | A | B | B | A |
| Ex. 11 | Resin I/Resin C(50/50) | 6.8 | B | B | B | B | B |
| Ex. 12 | Resin J/Resin C(50/50) | 6.6 | B | A | B | B | B |
| Ex. 13 | Resin A | 6.9 | A | A | A | A | A |
| Comp. Ex. 1 | Resin H | 6.4 | B | A | C | D | B |
| Comp. Ex. 2 | Resin I | 6.8 | D | C | C | B | C |
| Comp. Ex. 3 | Resin J | 6.7 | D | A | D | D | C |

*Inside the parenthesis shows a weight ratio of the resins.

It can be seen from the above results that as compared to the toners of Examples 11-1 to 11-13, the toner of Comparative Example 11-1 containing a polyester in which an aliphatic polyhydric alcohol other than an alcohol A is used is deficient in storage ability, while having a favorable low-temperature fixing ability. Also, the toner of Comparative Example 11-2 containing a polyester in which an alcohol A is not used, an aromatic polyhydric alcohol is used, but a succinic acid derivative is also not used, and the toner of Comparative Example 11-3 containing a polyester in which an aliphatic polyhydric alcohol other than an alcohol A is used and a succinic derivative is also not used are deficient in all of the properties.

Example 12

12.1 Production Example 1 of Resins

Resins A, B, D, F, G, I, and J

A 5-liter four-neck flask equipped with a thermometer, a stainless steel stirring rod, a reflux condenser, and a nitrogen inlet tube was charged with raw material monomers for a polyester other than trimellitic anhydride and an esterification catalyst, as listed in Table 12-1 or 12-2. The mixture was heated in a mantle heater to 180° C. in a nitrogen atmosphere, and then heated to 230° C. over 10 hours. Thereafter, having confirmed that a conversion rate at 230° C. reached 95% or higher, the reaction mixture was cooled to 160° C., and a mixed solution of raw material monomers for a styrenic resin, a dually reactive monomer and a polymerization initiator as listed in Table 12-1 or 12-2 was added dropwise thereto over 1 hour. Thereafter, the mixture was kept at 160° C. for 30 minutes, and heated to 210° C., and the heated mixture was subjected to a reaction at 8 kPa for 1 hour. Thereafter, trimellitic anhydride shown in Table 12-1 or 12-2 was added thereto, and the mixture was subjected to a reaction at 40 kPa until a desired softening point was reached, to provide a hybrid resin. Here, the conversion rate refers to a value calculated by:

[amount of water generated in reaction(mol)/theoretical amount of generated water]×100.

12.2 Production Example 2 of Resin

Resin C

A 5-liter four-neck flask equipped with a thermometer, a stainless steel stirring rod, a reflux condenser, and a nitrogen inlet tube was charged with raw material monomers for a polyester other than trimellitic anhydride, as listed in Table 12-1. The mixture was cooled in a mantle heater to 160° C. in a nitrogen atmosphere, and a mixed solution of raw material monomers for a styrenic resin, a dually reactive monomer and a polymerization initiator, as listed in Table 12-1 was added dropwise thereto over 1 hour. Thereafter, the mixture was kept at 160° C. for 30 minutes, then subjected with an esterification catalyst, heated to 180° C., and thereafter heated to 230° C. over 10 hours. Thereafter, having confirmed that a conversion rate at 230° C. reached 95% or higher, the reaction mixture was heated to 210° C., trimellitic anhydride shown in Table 12-1 was then added thereto, and the mixture was subjected to a reaction 40 kPa until a desired softening point was reached, to provide a hybrid resin.

12.3 Production Example 3 of Resin

Resin E

A 5-liter four-neck flask equipped with a thermometer, a stainless steel stirring rod, a reflux condenser, and a nitrogen inlet tube was charged with raw material monomers for a polyester other than trimellitic anhydride and an esterification catalyst, as listed in Table 12-1. The mixture was heated in a mantle heater to 180° C. in a nitrogen atmosphere, and then heated to 230° C. over 10 hours. Thereafter, having confirmed that a conversion rate at 230° C. reached 95% or higher, the reaction mixture was cooled to 160° C., and a wax was supplied thereto. Thereafter, a mixed solution of raw material monomers for a styrenic resin, a dually reactive monomer and a polymerization initiator as listed in Table 12-1 was added dropwise thereto over 1 hour. Thereafter, the mixture was kept at 160° C. for 30 minutes, and heated to 210° C., and the heated mixture was subjected to a reaction at 8 kPa for 1 hour. Thereafter, trimellitic anhydride shown in Table 12-1 was added thereto, and the mixture was subjected to a reaction at 40 kPa until a desired softening point was reached, to provide a hybrid resin.

12.4 Production Example 4 of Resin

Resin H

A 5-liter four-neck flask equipped with a thermometer, a stainless steel stirring rod, a reflux condenser, and a nitrogen inlet tube was charged with raw material monomers for a polyester other than fumaric acid and trimellitic anhydride and an esterification catalyst, as listed in Table 12-2. The mixture was heated in a mantle heater to 180° C. in a nitrogen atmosphere, and then heated to 230° C. over 10 hours. Thereafter, having confirmed that a conversion rate at 230° C. reached 95% or higher, the reaction mixture was cooled to 160° C., and a mixed solution of raw material monomers for a styrenic resin, a dually reactive monomer and a polymerization initiator as listed in Table 12-2 was added dropwise thereto over 1 hour. Thereafter, the mixture was kept at 160° C. for 30 minutes. trimellitic anhydride, fumaric acid and a polymerization inhibitor listed in Table 12-2 were supplied thereto, and the mixture was heated to 210° C. over 4 hours, and subjected to a reaction at 40 kPa until a desired softening point was reached, to provide a hybrid resin.

12.5 Production Example 5 of Resin

Resin K

A 5-liter four-neck flask equipped with a thermometer, a stainless steel stirring rod, a reflux condenser, and a nitrogen inlet tube was charged with raw material monomers for a polyester other than trimellitic anhydride and an esterification catalyst, as listed in Table 12-3. The mixture was heated in a mantle heater to 235° C. in a nitrogen atmosphere, and subjected to a reaction at 235° C. for 10 hours. Thereafter, the mixture was subjected to a reaction at 235° C. and 8 kPa for 1 hour, cooled to 210° C., and the trimellitic anhydride shown in Table 12-3 was supplied thereto. The mixture was subjected to a reaction at normal pressure for 1 hour, and subjected to a reaction at 40 kPa until a desired softening point was reached, to provide a polyester.

12.6 Production Example 6 of Resin

Resin L

A 5-liter four-neck flask equipped with a thermometer, a stainless steel stirring rod, a reflux condenser, and a nitrogen inlet tube was charged with raw material monomers for a polyester other than trimellitic anhydride and an esterification catalyst, as listed in Table 12-3. The mixture was heated in a mantle heater to 180° C. in a nitrogen atmosphere, and thereafter heated to 230° C. over 10 hours. Thereafter, having confirmed that a conversion rate at 230° C. reached 95% or higher, the reaction mixture was cooled to 210° C., and trimellitic anhydride shown in Table 12-3 was supplied thereto. The mixture was subjected to a reaction at normal pressure for 1 hour, and subjected to a reaction at 40 kPa until a desired softening point was reached, to provide a polyester.

TABLE 12-1

|  | Resin A Amount Used | | Resin B Amount Used | | Resin C Amount Used | | Resin D Amount Used | | Resin E Amount Used | |
| --- | --- | --- | --- | --- | --- | --- | --- | --- | --- | --- |
|  | g | mol | g | mol | g | mol | g | mol | g | mol |
| Raw Material Monomers for Polyester (PES) Alcohol Component | | | | | | | | | | |
| 2,3-Butanediol | 675 | 7.5 | 1350 | 15 | 675 | 7.5 | 675 | 7.5 | 675 | 7.5 |
| 1,2-Propanediol | 571 | 7.5 | — | — | 571 | 7.5 | 571 | 7.5 | 571 | 7.5 |
| Carboxylic Acid Component | | | | | | | | | | |
| Terephthalic Acid | 1743 | 10.5 | — | — | 1743 | 10.5 | 1743 | 10.5 | 1743 | 10.5 |
| Isophthalic Acid | — | — | 1743 | 10.5 | — | — | — | — | — | — |
| Trimellitic Anhydride | 432 | 2.25 | 432 | 2.25 | 432 | 2.25 | 432 | 2.25 | 432 | 2.25 |
| Esterification Catalyst | | | | | | | | | | |
| Dibutyltin Oxide | — | — | 17.6 | — | — | — | — | — | — | — |
| Tin(II) 2-Ethylhexanoate | 17.1 | — | — | — | — | — | 17.1 | — | 17.1 | — |
| Titanium Compound[1] | — | — | — | — | 17.1 | — | — | — | — | — |
| Dually Reactive Monomer | | | | | | | | | | |
| Acrylic Acid | 46.5 | 0.75 | 46.5 | 0.75 | 74.4 | 1.2 | 46.5 | 0.75 | 46.5 | 0.75 |
| Raw Material Monomers for Styrenic Resin (St) | | | | | | | | | | |
| Styrene | 718 | — | 718 | — | 1149 | — | 522 | — | 718 | — |
| 2-Ethylhexyl Acrylate | 137 | — | 137 | — | 219 | — | 100 | — | 137 | — |
| Polymerization Initiator | | | | | | | | | | |
| Dibutyl Peroxide | 34 | — | 34 | — | 55 | — | 25 | — | 34 | — |
| Wax | | | | | | | | | | |
| Paraffin Wax[2] | — | — | — | — | — | — | — | — | 214 | — |
| Amount of Alcohol A Contained in Alcohol Component (% by mol) | 50 | | 100 | | 50 | | 50 | | 50 | |
| Alcohol A/(Raw Material Monomers Other Than Alcohol A) × 100 (parts by weight) | 24.2 | | 60.8 | | 23.9 | | 24.2 | | 24.2 | |
| Total Amount of PES/Total Amount of St (weight ratio) | 4 | | 4 | | 2.5 | | 5.5 | | 4 | |
| Softening Point (° C.) | 113.4 | | 130.8 | | 114.8 | | 109.7 | | 105.4 | |
| Glass Transition Temperature (° C.) | 61.6 | | 67.8 | | 58.1 | | 60.7 | | 55.4 | |
| Acid Value (mgKOH/g) | 28.4 | | 24.5 | | 20.2 | | 25.9 | | 21.9 | |

[1]Titanium Diisopropylate bis(Triethanoaminate)
[2]HNP-9: manufactured by Nippon Seiro, melting point 70° C.

TABLE 12-2

|  | Resin F Amount Used | | Resin G Amount Used | | Resin H Amount Used | | Resin I Amount Used | | Resin J Amount Used | |
| --- | --- | --- | --- | --- | --- | --- | --- | --- | --- | --- |
|  | g | mol | g | mol | g | mol | g | mol | g | mol |
| Raw Material Monomers for Polyester (PES) Alcohol Component | | | | | | | | | | |
| 2,3-Butanediol | 1080 | 12 | 1080 | 12 | 585 | 6.5 | 675 | 7.5 | — | — |
| 1,2-Propanediol | — | — | — | — | 495 | 6.5 | 571 | 7.5 | — | — |
| 1,3-Propanediol | — | — | 228 | 3 | — | — | — | — | — | — |
| 2,4-Hexanediol | 354 | 3 | — | — | — | — | — | — | — | — |
| Ethylene Glycol | — | — | — | — | — | — | — | — | 465 | 7.5 |
| Neopentyl Glycol | — | — | — | — | — | — | — | — | 780 | 7.5 |
| Carboxylic Acid Component | | | | | | | | | | |
| Alkenylsuccinic Anhydride A | 804 | 3 | — | — | — | — | 402 | 1.5 | 804 | 3 |
| Terephthalic Acid | 1494 | 9 | 1743 | 10.5 | 1079 | 6.5 | 1494 | 9 | 1494 | 9 |

TABLE 12-2-continued

|  | Resin F Amount Used | | Resin G Amount Used | | Resin H Amount Used | | Resin I Amount Used | | Resin J Amount Used | |
| --- | --- | --- | --- | --- | --- | --- | --- | --- | --- | --- |
|  | g | mol | g | mol | g | mol | g | mol | g | mol |
| Fumaric Acid | — | — | — | — | 302 | 1.8 | — | — | — | — |
| Trimellitic Anhydride | 432 | 2.25 | 432 | 2.25 | 374 | 1.95 | 432 | 2.25 | 432 | 2.25 |
| Esterification Catalyst |  |  |  |  |  |  |  |  |  |  |
| Dibutyltin Oxide | — | — | 17.4 | — | — | — | — | — | — | — |
| Tin(II) 2-Ethylhexanoate | 20.8 | — | — | — | — | — | 17.9 | — | 19.9 | — |
| Titanium Compound[1] | — | — | — | — | 17.5 | — | — | — | — | — |
| Dually Reactive Monomer |  |  |  |  |  |  |  |  |  |  |
| Acrylic Acid | 46.5 | 0.75 | 46.5 | 0.75 | 40.3 | 0.65 | 46.5 | 0.75 | 46.5 | 0.75 |
| Raw Material Monomers for Styrenic Resin (St) |  |  |  |  |  |  |  |  |  |  |
| Styrene | 874 | — | 718 | — | 952 | — | 751 | — | 835 | — |
| 2-Ethylhexyl Acrylate | 167 | — | 137 | — | 181 | — | 143 | — | 159 | — |
| Polymerization Initiator |  |  |  |  |  |  |  |  |  |  |
| Dibutyl Peroxide | 42 | — | 34 | — | 45 | — | 36 | — | 40 | — |
| Wax |  |  |  |  |  |  |  |  |  |  |
| HNP-9[2] | — | — | — | — | — | — | — | — | 248 | — |
| Amount of Alcohol A Contained in Alcohol Component (% by mol) | 100 | | 80 | | 50 | | 50 | | 0 | |
| Alcohol A/(Raw Material Monomers Other Than Alcohol A) × 100 (parts by weight) | 51.6 | | 44.1 | | 25.5 | | 42.2 | | 0 | |
| Total Amount of PES/Total Amount of St (weight ratio) | 4 | | 4 | | 2.5 | | 4 | | 4 | |
| Softening Point (° C.) | 107.7 | | 105.6 | | 110 | | 118.9 | | 105.9 | |
| Glass Transition Temperature (° C.) | 56.4 | | 57.3 | | 61.1 | | 59.3 | | 55.9 | |
| Acid Value (mgKOH/g) | 24 | | 27.4 | | 26.9 | | 25.4 | | 24.6 | |

[1] Titanium Diisopropylate bis(Triethanolaminate)
[2] HNP-9: manufactured by Nippon Seiro, melting point 70° C.

TABLE 12-3

|  | Resin K Amount Used | | Resin L Amount Used | |
| --- | --- | --- | --- | --- |
|  | g | mol | g | mol |
| Raw Material Monomers for Polyester (PES) |  |  |  |  |
| Alcohol Component |  |  |  |  |
| Ethylene Glycol | — | — | 558 | 5.4 |
| Neopentyl Glycol | — | — | 936 | 9 |
| BPA-PO[1] | 1225 | 3.5 | — | — |
| BPA-EO[2] | 1138 | 3.5 | — | — |
| Carboxylic Acid Component |  |  |  |  |
| Alkenylsuccinic Anhydride A | 375 | 1.4 | 965 | 3.6 |
| Terephthalic Acid | 697 | 4.2 | 1793 | 10.8 |
| Trimellitic Anhydride | 202 | 1.05 | 518 | 2.7 |
| Esterification Catalyst |  |  |  |  |
| Tin(II) 2-Ethylhexanoate | 18.2 | — | 23.9 | — |
| Softening Point (° C.) | 108.9 | | 107.4 | |
| Glass Transition Temperature (° C.) | 60.4 | | 56.7 | |
| Acid Value (mgKOH/g) | 16.8 | | 29.5 | |

[1] Polyoxypropylene(2.2)-2,2-bis(4-hydroxyphenyl)propane
[2] Polyoxyethylene(2.2)-2,2-bis(4-hydroxyphenyl)propane

12.7 Examples 1 to 12 and Comparative Examples 1 to 3

Preparation of Resin Dispersion

A 5-liter vessel equipped with a stirrer, a reflux condenser, a dropping funnel, a thermometer and a nitrogen inlet tube was charged with 600 g of a methyl ethyl ketone, and 200 g of a resin binder listed in Table 12-4 was added thereto at room temperature to dissolve. Ten grams of triethylamine was added to the resulting solution to neutralize the solution, and subsequently 2,000 g of ion-exchanged water was added thereto. Thereafter, methyl ethyl ketone was distilled off from the mixture at a stirring rate of 250 r/min at 50° C. or less under a reduced pressure, to provide a self-dispersible aqueous dispersion of resin particles (resin content: 9.6% by weight (on a solid basis)). Polyester particles (primary particles) dispersed in the resulting resin dispersion had an average particle size of 0.3 μm.

Preparation of Colorant Dispersion

Fifty grams of copper phthalocyanine (manufactured by DAINICHISEIKA COLOR & CHEMICALS MFG. CO.), 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and copper phthalocyanine was dissolved. The mixture was dispersed for 10 minutes with a homogenizer to provide a colorant-dispersed dispersion.

Preparation of Releasing Agent Dispersion

A mixture of 50 g of a paraffin wax (HNP0190, manufactured by Nippon Seiro, melting point: 85° C.), 5 g of a cationic surfactant (SANISOL B50, manufactured by KAO Corporation) and 200 g of ion-exchanged water was heated to 95° C., and the paraffin wax was dispersed with a homogenizer. Thereafter, the mixture was subjected to a dispersion treatment with a pressure jetting homogenizer, to provide a releasing agent dispersion in which the paraffin wax was dispersed in an average particle size of 550 nm.

Preparation of Charge Control Agent Dispersion

Fifty grams of a charge control agent (BONTRON E-84, manufactured by Orient Chemical Co., Ltd.), 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed. The mixture was dispersed for 10 minutes using glass beads with a sand grinder, to prepare a charge control agent dispersion in which the charge control agent was dispersed in an average particle size of 500 nm. However, remnants of coarse particles in the dispersion were observed.

Aggregating Step

Four-hundred and ninety grams of a resin particle dispersion, 20 g of a colorant dispersion, 15 g of a releasing agent dispersion, 7 g of a charge control agent dispersion and 2 g of a cationic surfactant (SANISOL B50, manufactured by KAO Corporation) obtained were mixed in a round-shaped stainless steel flask with a homogenizer to disperse. Thereafter, the dispersion was heated to 48° C., while stirring the contents inside the flask in a heating oil bath. Further, after the dispersion was kept at 48° C. for 1 hour, it was confirmed that aggregated particles having an average particle size of 6.0 μm were formed.

Unifying Step

Three grams of an anionic surfactant (PELEX SS-L, manufactured by KAO Corporation) was added to the aggregated particle dispersion in which the aggregated particles were formed, and thereafter the above-mentioned stainless steel flask was equipped with a reflux tube. The dispersion was heated to 80° C. at a rate of 5° C./min while continuously stirring, and kept thereat for 5 hours, to unify and fuse the aggregated particles. Thereafter, the unified particles was cooled, filtered, and sufficiently washed with ion-exchanged water and dried, to provide colored powder of fine resin particles. The resulting colored powder of fine resin particles had having a volume-median particle size ($D_{50}$) of 6.3 μm.

Surface-Treating Step

To 100 parts by weight of the resulting colored powder of fine resin particles was added 1.0 part by weight of a hydrophobic silica (TS530, manufactured by Wacker Chemicals, number-average particle size: 8 nm). The mixture was mixed with a Henschel mixer and subjected to an external addition treatment, to provide a cyan toner. The resulting cyan toner had a volume-median particle size ($D_{50}$) of 6.5 μm.

12.8 Example 13

Preparation of Resin Dispersion

One thousand and three-hundred grams of Resin A, 100 g of an anionic surfactant (NEOPELEX G-15, manufactured by KAO Corporation, sodium dodecylbenzenesulfonate (solid content 15% by weight)), 100 g of a nonionic surfactant (EMULGEN 430, manufactured by KAO Corporation, polyoxyethylene oleyl ether (EO=26 mol added), HLB: 16.2, cloud point: 100° C. or more) and 689 g of a 5% by weight aqueous potassium hydroxide solution were dispersed in the 5-liter stainless steel vessel at 25° C., while stirring with a paddle-shaped stirrer at rate of 200 r/min. The contents were stabilized at 95° C., and kept for 2 hours while stirring with a paddle-shaped stirrer at a rate of 200 r/min. Subsequently, deionized water was added dropwise thereto at a rate of 15 g/min, while stirring with a paddle-shaped stirrer at a rate of 200 r/m, totaling in an amount of 2845 g of the deionized water. During this time, the temperature of the system was kept at 95° C. After the system was cooled, the mixture was passed through a 150-mesh wire gauze (opening: 105 μm), to provide a resin dispersion containing fine resin particles. The resin particles (primary particles) in the resulting resin dispersion had an average particle size of 0.15 μm and a solid content of 31% by weight, and no resin component were remained on the wire gauze.

Preparation of Colorant Dispersion

Fifty grams of copper phthalocyanine (manufactured by DAINICHISEIKA COLOR & CHEMICALS MFG. CO.), 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and copper phthalocyanine was dissolved. The mixture was dispersed for 10 minutes with a homogenizer, to provide a colorant-dispersed dispersion.

Preparation of Releasing Agent Dispersion

A mixture of 50 g of a paraffin wax (HNP0190, manufactured by Nippon Seiro, melting point: 85° C.), 5 g of a cationic surfactant (SANISOL B50, manufactured by KAO Corporation) and 200 g of ion-exchanged water was heated to 95° C., and the paraffin wax was dispersed with a homogenizer. Thereafter, the mixture was subjected to a dispersion treatment with a pressure jetting homogenizer, to provide a releasing agent dispersion in which the paraffin wax was dispersed in an average particle size of 550 nm.

Preparation of Charge Control Agent Dispersion

Fifty grams of a charge control agent (BONTRON E-84, manufactured by Orient Chemical Co., Ltd.), 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and the mixture was dispersed for 10 minutes using glass beads with a sand grinder, to prepare a charge control agent dispersion in which the charge control agent was dispersed in an average particle size of 500 nm. However, remnants of coarse particles in the dispersion were observed.

Aggregating Step

Four-hundred and ninety grams of a resin particle dispersion, 20 g of colorant dispersion, 15 g of a releasing agent dispersion, 7 g of charge control agent dispersion and 2 g of a cationic surfactant (SANISOL B50, manufactured by KAO Corporation) obtained were mixed in a round-shaped stainless steel flask with a homogenizer (pH=7) to disperse. Thereafter, the mixture was heated to 48° C., while stirring the contents inside the flask in a heating oil bath. Further, after the dispersion was kept at 48° C. for 1 hour, it was confirmed that aggregated particles having an average particle size of 6.0 μM were formed.

Unifying Step

Three grams of an anionic surfactant (PELEX SS-L, manufactured by KAO Corporation) was added to an aggregated particle dispersion in which the aggregated particles were formed, and thereafter the above-mentioned stainless steel flask was equipped with a reflux tube. The dispersion was heated to 80° C. at a rate of 5° C./min while continuously stirring, and kept for 5 hours, to unify and fuse the aggregated particles. Thereafter, the unified particles were cooled, filtered, and sufficiently washed with ion-exchanged water and dried, to provide colored powder of fine resin particles. The resulting colored powder of fine resin particles had a volume-median particle size ($D_{50}$) of 6.3 μm.

Surface-Treating Step

To 100 parts by weight of the resulting colored powder of fine resin particles was added 1.0 part by weight of a hydrophobic silica (TS530, manufactured by Wacker Chemicals, number-average particle size: 8 nm), and the mixture was mixed with a Henschel mixer and subjected to an external addition treatment, to provide a cyan toner. The resulting cyan toner had a volume-median particle size ($D_{50}$) of 6.9 μm.

12.9 Test Example 1

Hydrolytic Resistance

The same procedures as in Test Example 1 of Item 10.9 were carried out using a resin binder used in each of Examples and Comparative Examples as shown in Table 12-4 in both the test method and the evaluation criteria to evaluate hydrolytic resistance. The results are shown in Table 12-4.

12.10 Test Example 2

Low-Temperature Fixing Ability

The same procedures as in Test Example 1 of Item 1.5 were carried out in both the test method and the evaluation criteria to evaluate low-temperature fixing ability, provided that the evaluation criteria are as follows. The results are shown in Table 12-4.

Evaluation Criteria

A: The lowest fixing temperature is less than 140° C.
B: The lowest fixing temperature is 140° C. or more and less than 160° C.
C: The lowest fixing temperature is 160° C. or more.

12.11 Test Example 3

Hot Offset Resistance

The same procedures as in Test Example 3 of Item 10.11 were carried out in both the test method and the evaluation criteria to evaluate hot offset resistance. The results are shown in Table 12-4.

12.12 Test Example 4

Storage Ability

The same procedures as in Test Example 2 of Item 1.6 were carried out in both the test method and the evaluation criteria to evaluate storage ability. The results are shown in Table 12-4.

12.13 Test Example 5

Durability

A toner was loaded to a nonmagnetic monocomponent development device "Oki Microline 5400" (manufactured by Oki Data Corporation), and images of a diagonally striped pattern with a print coverage of 5.5% were subjected to durability test under the conditions of a temperature of 32° C. and humidity of 85%. During the course of printing, black solid images were printed out for every 500 sheets to check for any lines formed on fixed images. The number of sheet up to a point where the lines are visually observed on the fixed images is defined as the number of durably printed sheets, and durability was evaluated in accordance with the following evaluation criteria. The results are shown in Table 12-4.

Evaluation Criteria

A: The number of durably printed sheets is 5,000 sheets or more.
B: The number of durably printed sheets is 2,000 sheets or more and less than 5,000 sheets.
C: The number of durably printed sheets is less than 2,000 sheets.

TABLE 12-4

| | | | Evaluation of Toner | | | | |
|---|---|---|---|---|---|---|---|
| No. 12- | Resin Binder* | $D_{50}$ | Hydrolytic Resistance | Low-Temp. Fixing Ability | Hot Offset Resistance | Storage Ability | Durability |
| Ex. 1 | Resin A | 6.5 | A | A | A | A | A |
| Ex. 2 | Resin B | 6.4 | A | B | A | A | A |
| Ex. 3 | Resin C | 6.4 | A | A | B | B | A |
| Ex. 4 | Resin D | 6.7 | A | A | A | A | B |
| Ex. 5 | Resin E | 6.4 | A | A | A | B | A |
| Ex. 6 | Resin F | 6.8 | A | B | A | B | A |
| Ex. 7 | Resin G | 6.5 | B | A | A | B | A |
| Ex. 8 | Resin H | 6.2 | B | A | B | B | A |
| Ex. 9 | Resin I | 6.2 | A | A | A | A | A |
| Ex. 10 | Resin A/Resin B(50/50) | 6.9 | A | A | A | A | A |
| Ex. 11 | Resin A/Resin J(50/50) | 6.7 | B | A | B | B | B |
| Ex. 12 | Resin A/Resin K(50/50) | 6.6 | B | B | B | B | B |
| Ex. 13 | Resin A | 6.9 | A | A | A | A | A |

TABLE 12-4-continued

| | | | Evaluation of Toner | | | | |
|---|---|---|---|---|---|---|---|
| No. 12- | Resin Binder* | $D_{50}$ | Hydrolytic Resistance | Low-Temp. Fixing Ability | Hot Offset Resistance | Storage Ability | Durability |
| Comp. Ex. 1 | Resin J | 6.4 | C | A | C | C | B |
| Comp. Ex. 2 | Resin K | 6.8 | C | C | C | C | C |
| Comp. Ex. 3 | Resin L | 6.7 | D | A | C | C | C |

*Inside the parenthesis shows a weight ratio of the resins.

It can be seen from the above results that as compared to the toners of Examples 12-1 to 12-3, the toner of Comparative Example 12-1 containing a hybrid resin in which an aliphatic polyhydric alcohol is used is deficient in properties other than durability, while having favorable durability. Also, it can be seen that the toner of Comparative Example 12-2 containing the polyester in which an aromatic polyhydric alcohol is used without using alcohol A is deficient in all the properties, and that the toner of Comparative Example 12-3 containing the polyester in which an aliphatic polyhydric alcohol other than an alcohol A is used is deficient in properties other than low-temperature fixing ability, while having favorable low-temperature fixing ability.

INDUSTRIAL APPLICABILITY

According to the present invention, the toner for electrophotography of the present invention is suitably used in developing latent images formed in electrophotography, electrostatic recording method, electrostatic printing method or the like.

The invention claimed is:

1. A resin binder comprising a polycondensation resin obtained by polycondensing
an alcohol component comprising an alcohol A which is an aliphatic polyhydric alcohol having two or more secondary carbon atoms with a hydroxyl group bound thereto and an alcohol B, and
a carboxylic acid component,
wherein the alcohol B is 1,2-propanediol or 1,3-propanediol,
wherein the alcohol B is present in an amount of from 0.1 to 5 mol per mol of alcohol A, and
wherein the polycondensation resin has an acid value of from 5 to 90 mg KOH/g.

2. The resin binder according to claim 1, wherein the carboxylic acid component comprises at least one succinic acid compound selected from the group consisting of an alkyl succinate having from 9 to 14 carbon atoms in the alkyl group and a alkenyl succinate having from 9 to 14 carbon atoms in the alkenyl group.

3. The resin binder according to claim 1, wherein the alcohol A upon the polycondensation of the alcohol component and the carboxylic acid component is present in an amount of from 6 to 100 parts by weight, based on 100 parts by weight of a total amount of the alcohol component other than the alcohol A and the carboxylic acid.

4. The resin binder according to claim 1, wherein the alcohol A is an aliphatic polyhydric alcohol having 4 to 8 carbon atoms, which has one or more pairs of secondary carbon atoms in which the secondary carbon atoms with a hydroxyl group bound thereto are adjacent to each other.

5. The resin binder according to claim 1, wherein said polycondensing is carried out in the presence of
an esterification catalyst and
a pyrogallol compound having a benzene ring of which three hydrogen atoms adjacent to each other are substituted with hydroxyl groups.

6. A toner for electrophotography, comprising the resin binder as defined in claim 1.

7. The toner for electrophotography according to claim 6, further comprising a charge control resin comprising a styrenic resin.

8. The toner for electrophotography according to claim 6, further comprising an external additive having an average particle size of from 20 to 250 nm.

9. A toner for electrophotography comprising the resin binder as defined in claim 1, wherein the resin binder comprises a high-softening point resin having a softening point of from 125° to 160° C. and a low-softening point resin having a softening point of from 90 to 120° C.

10. The toner according to claim 9, further comprising at least one of
a metal compound of a salicylic acid compound represented by the formula (IV):

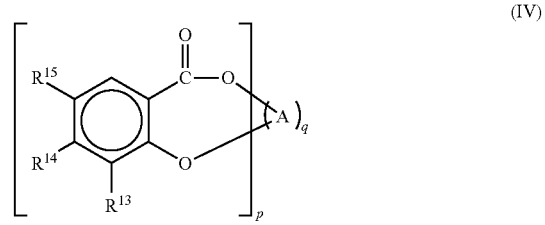

(IV)

wherein each of $R^{13}$, $R^{14}$, and $R^{15}$ is independently a hydrogen atom, a linear or branched, alkyl group having 1 to 10 carbon atoms or alkenyl group having 2 to 10 carbon atoms; A is chromium, zinc, calcium, zirconium or aluminum; p is an integer of 2 or more; and q is an integer of 1 or more; and
a metal compound of a benzilic acid compound, which is a compound represented by the formula (V):

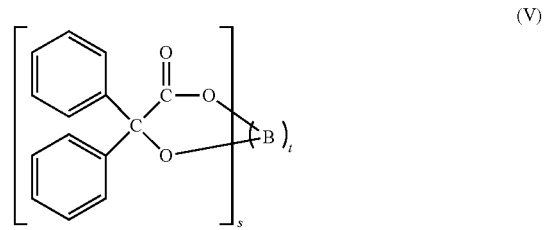

(V)

wherein B is boron or aluminum; s is an integer of 2 or more; and t is an integer of 1 or more.

11. The toner according to claim 6, further comprising at least one of a metal compound of a salicylic acid compound represented by the formula (IV):

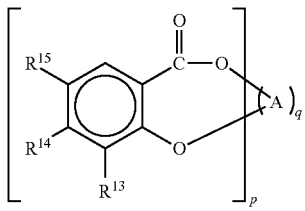

(IV)

wherein each of $R^{13}$, $R^{14}$, and $R^{15}$ is independently a hydrogen atom, a linear or branched, alkyl group having 1 to 10 carbon atoms or alkenyl group having 2 to 10 carbon atoms; A is chromium, zinc, calcium, zirconium or aluminum; p is an integer of 2 or more; and q is an integer of 1 or more; and a metal compound of a benzilic acid compound, which is a compound represented by the formula (V):

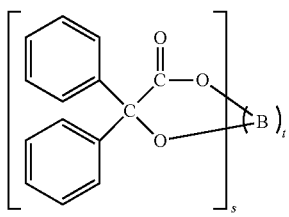

(V)

wherein B is boron or aluminum; s is an integer of 2 or more; and t is an integer of 1 or more.

12. The toner according to claim 7, further comprising at least one of a metal compound of a salicylic acid compound represented by the formula (IV):

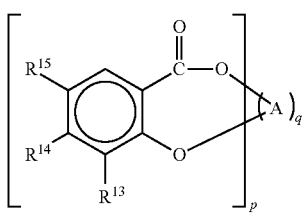

(IV)

wherein each of $R^{13}$, $R^{14}$, and $R^{15}$ is independently a hydrogen atom, a linear or branched, alkyl group having 1 to 10 carbon atoms or alkenyl group having 2 to 10 carbon atoms; A is chromium, zinc, calcium, zirconium or aluminum; p is an integer of 2 or more; and q is an integer of 1 or more; and a metal compound of a benzilic acid compound, which is a compound represented by the formula (V):

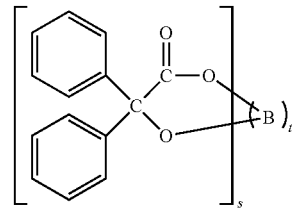

(V)

wherein B is boron or aluminum; s is an integer of 2 or more; and t is an integer of 1 or more.

13. The toner according to claim 8, further comprising at least one of a metal compound of a salicylic acid compound represented by the formula (IV):

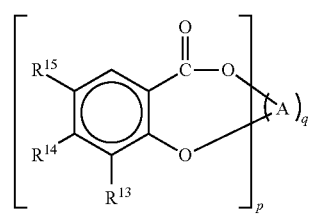

(IV)

wherein each of $R^{13}$, $R^{14}$, and $R^{15}$ is independently a hydrogen atom, a linear or branched, alkyl group having 1 to 10 carbon atoms or alkenyl group having 2 to 10 carbon atoms; A is chromium, zinc, calcium, zirconium or aluminum; p is an integer of 2 or more; and q is an integer of 1 or more; and a metal compound of a benzilic acid compound, which is a compound represented by the formula (V):

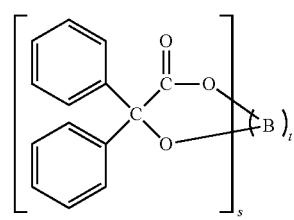

(V)

wherein B is boron or aluminum; s is an integer of 2 or more; and t is an integer of 1 or more.

14. The resin binder according to claim 1, wherein the alcohol B is present in an amount of from 0.1 to 1 mol per mol of the alcohol A.

15. The resin binder according to claim 1, wherein the alcohol B is present in an amount of from 0.1 to 3 mol per one mol of the alcohol A.

16. The resin binder according to claim 1, wherein the alcohol B is present in an amount of from 0.3 to 3 mol per one mol of the alcohol A.

17. The resin binder according to claim 1, wherein the alcohol A is 2,3-butanediol.

* * * * *